(12) United States Patent
Noureldin et al.

(10) Patent No.: US 8,311,682 B2
(45) Date of Patent: Nov. 13, 2012

(54) SYSTEMS, PROGRAM PRODUCT, AND METHODS FOR SYNTHESIZING HEAT EXCHANGER NETWORKS THAT ACCOUNT FOR FUTURE HIGHER LEVELS OF DISTURBANCES AND UNCERTAINTY, AND IDENTIFYING OPTIMAL TOPOLOGY FOR FUTURE RETROFIT

(75) Inventors: Mahmoud Bahy Noureldin, Dhahran (SA); Majid Mohammed Al-Gwaiz, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 201 days.

(21) Appl. No.: 12/898,475

(22) Filed: Oct. 5, 2010

(65) Prior Publication Data
US 2011/0054715 A1 Mar. 3, 2011

Related U.S. Application Data

(63) Continuation-in-part of application No. 12/715,255, filed on Mar. 1, 2010, now Pat. No. 7,873,443, which is a continuation of application No. 11/768,084, filed on Jun. 25, 2007, now Pat. No. 7,698,022, application No. 12/898,475, which is a continuation-in-part of application No. 12/767,217, filed on Apr. 26, 2010, now Pat. No. 8,032,262, and a continuation-in-part of application No. 12/767,275, filed on Apr. 26, 2010, now Pat. No. 8,116,920, and a continuation-in-part of application No. 12/767,315, filed on Apr. 26, 2010, and a continuation-in-part of application No. 12/575,743, filed on Oct. 8, 2009, now Pat. No. 7,729,809.

(60) Provisional application No. 61/356,900, filed on Jun. 21, 2010, provisional application No. 61/256,754, filed on Oct. 30, 2009, provisional application No. 60/816,234, filed on Jun. 23, 2006.

(51) Int. Cl.
*G06F 19/00* (2011.01)
(52) U.S. Cl. .......... 700/299; 700/278; 700/291; 60/206; 60/266; 60/267; 165/10
(58) Field of Classification Search .................. 700/299, 700/300, 291, 178; 165/101, 203, 279; 60/206, 60/266, 267
See application file for complete search history.

(56) References Cited

U.S. PATENT DOCUMENTS
4,142,108 A 2/1979 Matthews
(Continued)

FOREIGN PATENT DOCUMENTS
CN 101206754 A1 6/2008
(Continued)

OTHER PUBLICATIONS

Gundersen et al., "The Synthesis of Cost Optimal Heat Exchanger Networks," Computers and Chemical Engineering, vol. 12, pp. 503-530 (1988).
(Continued)

*Primary Examiner* — Michael D Masinick
(74) *Attorney, Agent, or Firm* — Bracewell & Giuliani LLP

(57) ABSTRACT

A system, methods, and user-friendly program product to optimize energy recovery for a process or cluster of processes under all possible combinations of given process changes and stream-specific minimum temperature approach values without enumeration, are provided. The systems, methods, and program product can include steps/operations to identify a set of common-structure heat exchanger network designs which allow for construction of a physically exchanger network easily retrofittable to accommodate time-dependent new operating modes, disturbances, and uncertainty schemes.

63 Claims, 21 Drawing Sheets

U.S. PATENT DOCUMENTS

| | | | |
|---|---|---|---|
| 5,259,444 A * | 11/1993 | Wilson | 165/8 |
| 5,517,428 A | 5/1996 | Williams | |
| 6,785,633 B2 | 8/2004 | Patanian et al. | |
| 7,103,452 B2 | 9/2006 | Retsina | |
| 7,125,540 B1 | 10/2006 | Wegeng et al. | |
| 7,698,022 B2 * | 4/2010 | Noureldin et al. | 700/291 |
| 7,729,809 B2 | 6/2010 | Noureldin | |
| 7,873,443 B2 * | 1/2011 | Noureldin et al. | 700/291 |
| 8,032,262 B2 * | 10/2011 | Noureldin | 700/299 |
| 8,099,966 B2 * | 1/2012 | Mossberg et al. | 62/5 |
| 8,116,918 B2 * | 2/2012 | Noureldin et al. | 700/291 |
| 8,116,920 B2 * | 2/2012 | Noureldin | 700/299 |
| 8,150,559 B2 * | 4/2012 | Noureldin | 700/299 |
| 8,150,560 B2 * | 4/2012 | Noureldin | 700/299 |
| 2008/0163625 A1 | 7/2008 | O'Brien | |

FOREIGN PATENT DOCUMENTS

| | | |
|---|---|---|
| JP | 2003016113 | 7/2001 |
| JP | 2002122005 | 4/2002 |
| JP | 2004272347 A | 9/2004 |
| NZ | 527244 | 7/2003 |
| WO | 01/80054 A2 | 2/2001 |
| WO | 2005010783 A1 | 2/2005 |

OTHER PUBLICATIONS

Furman et al., "A Critical Review and Annotated Bibliography for Heat Exchanger Network Synthesis in the 20th Century," Industrial Engineering & Chemistry Research vol. 41, pp. 2335-2370 (2002).
"Pinch Analysis:For the Efficient Use of Energy, Water & Hydrogen", Oil Refining Industry—Example of Pinch Application, http://canmetenergy-canmetenergie.nrcan.gc.ca/eng/industrial_processes/industrial_sys (no date).
"Understanding Process and Design Interactions", Aspentech (2002).
March, "Introduction to Pinch" (no date).
Ravagnani et al., "Heat exchanger network synthesis and optimization using genetic algorithm", 25 Appl. Thermal Eng. (2005), pp. 1003-1017.
De Ruyck et al., "Broadening the capabilities of pinch analysis through virtual heat exchanger networks", 44 Energy Conserv. & Mgmt (2003), pp. 2321-2329.
Lagaros et al., "Multi-objective design optimization using cascade evolutionary computations", 194 Comput. Methods Appl. Mech. Eng. (2005), pp. 3496-3515.
Petchers, "Heat Recovery", Combined Heating, Cooling and Power Handbook: Technologies and Applications, Ch. 8, The Fairmont Press, Inc., Lilburn, GA (2003).
Serna et al., "An area targeting algorithm for the synthesis of heat exchanger networks", 59 Chem Eng. Sci. (2004), pp. 2517-2520.
Press, "Minimization or Maximization of Functions", Ch. 10 (no date).
Lakshmanan et al., "Pinch location and minimum temperature approach for discontinuous composite curves", 26 (6) Computers & Chem Eng (2002), pp. 779-783.
Matijaseviae et al., "Energy recovery by pinch technology", 22 Appl. Therm Eng. (2002), pp. 477-484.
"Optimization Application: Pinch Technology Analysis", Ch. 9, Optimum Design and Design Strategy (no date), pp. 414-433.
Yeramsetty et al., "Synthesis of cost-optimal heat exchanger networks using differential evolution", 32 Computers & Chem. Eng. (2008), pp. 1861-1876.
Partial File History of U.S. Appl. No. 12/767,217, filed Apr. 26, 2010.
Partial File History of U.S. Appl. No. 12/767,275, filed Apr. 26, 2010.
Partial File History of U.S. Appl. No. 12/767,315, filed Apr. 26, 2010.
Partial File History of U.S. Appl. No. 11/768,084, filed Jun. 25, 2007 (excludes art cited above).
Partial File History of U.S. Appl. No. 12/575,743, filed Oct. 8, 2009 (excludes art cited above).
Partial File History of U.S. Appl. No. 12/715,255, filed Mar. 1, 2010 (excludes art cited above).

* cited by examiner

Streams

| Stream Names | Ts | | Tt | | F | | cp | |
|---|---|---|---|---|---|---|---|---|
| | min | max | min | max | min | max | min | max |
| H1 | 310 | 310 | 50 | 50 | 1 | 1.8 | 1 | 1 |
| H2 | 450 | 450 | 280 | 280 | 2 | 2 | 1 | 1 |
| C1 | 40 | 40 | 120 | 120 | 3 | 3 | 1 | 1 |
| C2 | 115 | 120 | 290 | 290 | 2 | 2 | 1 | 1 |

P2P Exchangers

| Exchanger Names | ΔT | U | |
|---|---|---|---|
| | min | min | max |
| E1 | 10 | 0.1 | 0.8 |
| E2 | 10 | 0.1 | 0.8 |
| E3 | 10 | 0.1 | 0.8 |

Utilities Exchangers

| Utility Exchanger | Type | ΔT | Temperature | | U | | Q | |
|---|---|---|---|---|---|---|---|---|
| | | min | min | max | min | max | min | max |
| CU1 | Cooling | 10 | 40 | 40 | 0.1 | 0.1 | 10 | 228 |

Network

| Line Name | Nodes | | Stream |
|---|---|---|---|
| | From | To | |
| 1 | H2_Start | E1_Hot | H2 |
| 2 | E1_Hot | H2_End | H2 |
| 3 | C2_Start | E1_Cold | C2 |
| 4 | E1_Cold | E2_Cold | C2 |
| 5 | E2_Cold | C2_End | C2 |
| 6 | H1_Start | E2_Hot | H1 |
| 7 | E2_Hot | E3_Hot | H1 |
| 8 | E3_Hot | CU1 | H1 |
| 9 | CU1 | H1_End | H1 |
| 10 | C1_Start | E3_Cold | C1 |
| 11 | E3_Cold | C1_End | C1 |

P2P Exchangers

| Exchanger Names | Q | | A | | Tin Hot | | Tout Hot | | Tin Cold | | Tout Cold | |
|---|---|---|---|---|---|---|---|---|---|---|---|---|
| | min | max | min | max | min | max | min | max | min | max | min | max |
| E1 | 340 | 340 | 20.61 | 21.25 | 450 | 450 | 280 | 280 | 115 | 120 | 285 | 290 |
| E2 | 0 | 10 | 0 | 5.754 | 310 | 310 | 300 | 310 | 285 | 290 | 290 | 290 |
| E3 | 240 | 240 | 14.83 | 33.74 | 300 | 310 | 60 | 176.7 | 40 | 40 | 120 | 120 |

Utilities Exchangers

| Utility Exchanger | A | |
|---|---|---|
| | min | max |
| CU1 | 6.934 | 49.08 |

Network

| Line Name | Temperature | | Fcp | |
|---|---|---|---|---|
| | min | max | min | max |
| 1 | 450 | 450 | 2 | 2 |
| 2 | 280 | 280 | 2 | 2 |
| 3 | 115 | 120 | 2 | 2 |
| 4 | 285 | 290 | 2 | 2 |
| 5 | 290 | 290 | 2 | 2 |
| 6 | 310 | 310 | 1 | 1.8 |
| 7 | 300 | 310 | 1 | 1.8 |
| 8 | 60 | 176.6667 | 1 | 1.8 |
| 9 | 50 | 50 | 1 | 1.8 |
| 10 | 40 | 40 | 3 | 3 |
| 11 | 120 | 120 | 3 | 3 |

*FIG. 24.*

SYSTEMS, PROGRAM PRODUCT, AND METHODS FOR SYNTHESIZING HEAT EXCHANGER NETWORKS THAT ACCOUNT FOR FUTURE HIGHER LEVELS OF DISTURBANCES AND UNCERTAINTY, AND IDENTIFYING OPTIMAL TOPOLOGY FOR FUTURE RETROFIT

RELATED APPLICATIONS

This patent application is a non-provisional patent application of U.S. Provisional Patent Application No. 61/356,900, filed Jun. 21, 2010, titled "Systematic Synthesis Method and Program Product For Heat Exchanger Network Life-Cycle Switchability and Flexibility Under All Possible Combinations of Process Variations" and U.S. Provisional Application No. 61/256,754, filed Oct. 30, 2009, titled "System, Method, and Program Product for Synthesizing Non-Constrained and Constrained Heat Exchanger Networks and Identifying Optimal Topoloy for Future Retrofit," and is a continuation-in-part of U.S. patent application Ser. No. 12/715,255, filed Mar. 1, 2010 now U.S. Pat. No. 7,873,443, titled "System, Method, and Program Product for Targeting and Optimal Driving Force Distribution in Energy Recovery Systems" which is a continuation of U.S. patent application Ser. No. 11/768,084, filed on Jun. 25, 2007, now U.S. Pat. No. 7,698,022, titled "System, Method, and Program Product for Targeting and Optimal Driving Force Distribution in Energy Recovery Systems," which claims priority to and the benefit of U.S. Provisional Patent Application No. 60/816,234, filed Jun. 23, 2006, titled "Method and Program Product for Targeting and Optimal Driving Force Distribution in Energy Recovery Systems," U.S. patent application Ser. No. 12/767,217, filed Apr. 26, 2010 now U.S. Pat. No. 8,032,262, titled "System, Method, and Program Product for Synthesizing Non-Constrained and Constrained Heat Exchanger Networks," U.S. patent application Ser. No. 12/767,275, filed Apr. 26, 2010 now U.S. Pat. No. 8,116,920, titled "System, Method, and Program Product for Synthesizing Non-Thermodynamically Constrained Heat Exchanger Networks," and U.S. patent application Ser. No. 12/767,315, filed Apr. 26, 2010, titled "System, Method, and Program Product for Synthesizing Heat Exchanger Networks and Identifying Optimal Topology for Future Retrofit," U.S. patent application Ser. No. 12/575,743, filed Oct. 8, 2009 now U.S. Pat. No. 7,729,809, titled "System, Method, and Program Product for Targeting and Identification of Optimal Process Variables in Constrained Energy Recovery Systems," each incorporated herein by reference in its entirety.

BACKGROUND OF THE INVENTION

1. Field of the Invention

This present invention relates to the field of energy recovery systems, program product, and related methods.

2. Description of the Related Art

Many different types of processes consume multiple steam levels and electricity to obtain an output result, or to produce a required product or compound. For large-scale processes that, for example, consume significant amounts of fuel and steam, it is preferable to optimize the consumption of energy through careful operation, design or reconfiguration of the plant and the equipment used. Further, in some industrial manufacturing processes, specific streams of material flows need to be supplied to different types of equipment and machinery at specific temperatures. These material flows may need to be heated or cooled from an original starting or supply temperature to a target temperature. This, in turn, requires the consumption of steam to heat specific streams and consumption of water, for example, to cool down specific streams.

The total energy employed or consumed by the industrial manufacturing processes can be optimized to a global minimal level, for example, through careful placement and configuration of specific material streams with respect to one another. There may be, for example, the potential for hot streams that require cooling to be placed in proximity with cold streams that require heating. Streams having thermal energy already present that need to be removed (waste heat) or streams that need to have heat added can be associated with one another to optimize the energy consumption of the process. A network of heat exchangers can be synthesized to provide a medium for utilizing this waste heat to provide heat to those streams that need to have heat added. This heat exchanger network can be a very important sub-system in any new plant.

As such, the heat exchanger network synthesis problem has arguably been one of the most studied problems in the field of process synthesis in the last four decades. The systematic synthesis of heat exchangers network, however, has proven to be a challenging task. During the last three decades a considerable number of methods have been proposed and utilized in commercial software and/or academia. These methods are referenced in the two famous review papers of T. Gundersen and L. Naess, "The Synthesis of Cost Optimal Heat Exchanger Networks," Computers and Chemical Engineering, vol. 12, pp. 503-530 (1988), and of Kevin C. Furman and Nikolaos V. Sahinidis, "A Critical Review and Annotated Bibliography for Heat Exchanger Network Synthesis in the $20^{th}$ Century," Industrial Engineering & Chemistry Research vol. 41, pp. 2335-2370 (2002).

The state-of-the-art software widely used in industry for initial synthesis of the heat exchange network (HEN) includes, for example, an AspenTech Inc. product known as Aspen Pinch, a Hyprotech Inc. product known as HX-NET (acquired by AspenTech), a KBC product known as Pinch Express, and a UMIST product known as Sprint, which attempt to address the heat exchanger network synthesis problem using the well known pinch design method, followed by an optimization capability that optimizes the initial design created by the pinch design method through use of streams split flows in streams branches and manipulates heat exchanger duty by utilizing the global network heat recovery minimum approach temperature as an optimization variable, in a non-linear program to recover more waste heat, shift loads among heat exchangers to remove small units, redistribute the load (duty) among units, and optimize surface area, of course, always within the constraints of the topology determined using the pinch design method. The pinch design method, followed by the optimization capability method, or combination of methods, has seen wide spread acceptance in the industrial community due to its non-black box approach. That is, the process engineer is in the feedback loop of the design of the heat exchangers network such that the process engineer can make design decisions that can change with the progress of the design. Recognized by the inventors, however, is that in all applications of near pinch and multiple pinches problems to the above software applications, their respective calculations render a larger than optimal number of heat exchange units. Also recognized is that, in addition, software applications that use the pinch design method or that use the pinch design method as a basis for its initial design followed by the optimization option for branches and duties can not handle certain situations/constraints/opportunities that can render better economics, for example, from energy, capital, or both points of view, which means that, some superior network designs will never be synthesized using such applications.

Other methodologies include mathematical programming-based methods. Although such methods have been in academia since the late eighties, they are still not widely used on a large scale in industrial applications for several reasons. For example, the computational requirements of such methods are substantial, especially for large problems, and the resultant solution, in general, can not guarantee globality. Additionally, besides the inherent disadvantage of the black box nature of such methods, the mathematical programming-based methods require assumptions regarding problem economics, the types of heat exchangers used in the network (shell & tube, twisted tube, plate and frame types, etc.), the need to know the several utilities types and temperatures beforehand, and the non-inclusive nature of the "transshipment model" used for streams matching and superstructure application, which explains why the pinch design method is still the leading method in industry, even with its inadequacies.

It has been recognized that heat exchanger network synthesis of both switchable and flexible heat exchanger networks under variations in process conditions, however, is more difficult than the nominal design. Nevertheless, although literature has been in existence since the late eighties which has identified a desire for flexibility in the heat exchanger network design, apart from the stochastic methods (trial and error approach) which also require unrealistic assumptions and which are very difficult to implement by regular process engineers, there still only remains the pinch-based approach and the mathematical programming-based methods.

As introduced above, the pinch-based approach remains the industry practice even though it is in-systematic and needs iteration without guarantee to reach, at the end, a feasible and cost effective design. In brief, the pinch-based approach uses the pinch design method as a basis to develop a heat exchanger network that can handle process variations. It sets up multiple operating cases in a step which is in-systematic and ad hoc. It then uses the pinch method to design individual networks for each case. It then tries to merge the individual designs to form a final one. Thereafter, it uses the disturbance and uncertainty scheme to test for feasibility of the network in the face of the disturbances and uncertainty. If the network is not feasible, it again in-systematically adds contingencies to try to make it feasible. If still not feasible, the approach sets new multiple operating cases and repeats the procedures iteratively. If the new loop renders a feasible network, optimize the network and recheck for feasibility. Again, if infeasibility arises, the problem is not solved and iteration in-systematically provides the only solution. Nevertheless, as noted above, even with the requirement for a substantial amount of ad hoc decisions and iteration, the pinch-based approach is still leading in most commercial software.

On the other hand, heat exchanger network synthesis under varying conditions for switchability and flexibility using mathematical programming is even more difficult to use and inherently has myopic assumptions. For example, the mathematical programming approach can be extremely difficult because the nominal design one-period problem itself is difficult to employ to try to solve industrial scale problems without extensively applying simplifying assumptions in the type of heat exchangers used, places of the service units, number of streams matching more than once, etc. As such, it is expected that applying such approach to a multi-period synthesis problem would be extremely difficult. It may be particularly difficult to implement, for example, because from industry point of view, the basic assumption regarding the disturbances and uncertainty schemes that define exactly each operating period at the design phase, is completely unrealistic.

Accordingly, recognized by the inventors is the need for an improved system, program product, method or technique that can address any or all of the above optimization issues, particularly during the design stage, and which can minimize energy and capital costs for waste heat recovery through application of a systematic process prior to the actual design, construction or modification of actual plant and equipment. Particularly, recognized is the need for a systematic heat exchanger network synthesis method with life-cycle switchability and flexibility under all possible anticipated combinations process variations that exhibits much better capabilities than the ad hoc in-systematic pinch approach and that can render in all cases, a network design including a number of the exchanger units that is less than or an equal to the number of heat exchanger units for the networks synthesized using the pinch design method, even when combined with heat exchanger duty and branch optimization options currently implemented in commercial software, for all types of problems to include pinched problems, problems with near pinch applications, as well as multiple pinches problems, that need both heating and cooling utilities, and problems that need only cooling or only heating utility (called threshold problems).

Also, recognized by the inventors is the need for improved methods, systems, and techniques that can address cases where the optimal solutions can be provided by matching a hot stream with a hot stream or a cold stream with a cold streams, or partially converting a hot stream to a cold stream or a cold stream to a hot stream. Further, recognized by the inventors is the need for improved methods, systems, and techniques which can provide a guarantee of feasibility under a given realistic disturbance scheme, which can produce heat exchangers networks within the optimal number of units, which addresses life cycle switchability and flexibility, and which can be used to calculate optimal target temperatures for streams within a realistic operating window range at the design phase under all possible combinations of anticipated disturbances and uncertainty.

It is further recognized by the inventors that it would be beneficial if the heat exchanger network design, according to such methods, systems, and program product, were also such that the network was configured to be "easily-retrofitable" in future times to allow for growth and/or for contingencies such as, for example, those due to dramatic changes in energy prices resulting in a need to operate under future time-dependent operating modes, disturbances and uncertainty schemes. Notably, it is not believed that the pinch design method could adopt retrofitability during the design stage as it does not have a systematic method to select an optimal set of supply temperatures, target temperatures, and/or stream specific minimum temperature, either in general, or based upon a trade-off between capital and energy costs, in particular, and because its pinch design philosophy starts the design of the network only after selecting an optimal initial conditions including supply temperatures, target temperatures, and network global minimum approach temperature using, for example, the "SUPERTARGET" method which targets for both energy consumption and the heat exchanger network area at the same time. Even by repeating such sequential philosophy using different ranges of supply and/or target temperature values, the resulting new network structure would not be expected to consistently resemble the previous network structure, in class, and thus, would result in a requirement for an undue expenditure in network reconciliation efforts, to try to form a continuum of common-structure heat exchanger network designs which can be used to facilitate user selection of a physical heat exchanger network structure satisfying both current user-selected economic criteria and anticipated potential future retrofit requirements and corresponding physical, heat exchanger network development and facility surface area of allotment based upon such selected design.

SUMMARY OF THE INVENTION

In grassroots heat exchangers network (HEN) design under frequent process variations in the form of disturbances and uncertainty, it is needed to have a design that is not only cost effective but also switchable and flexible along its life cycle to respond to different operating modes and/or face disturbances and uncertainty without affecting process economics systematically and without iteration. In addition, it can be important for such design to be inherently retrofitable (easy-to-refit in the future) due to the ongoing changes in the trade-off between capital cost and energy cost of energy systems and/or process variation schemes. As such, and in view of the foregoing, various embodiments of the present invention advantageously provide methods, systems and program product for synthesizing a grass-roots heat exchanger network which addresses the difficult problems of designing heat exchanger networks under varying conditions with a simple yet sufficiently rigorous approach. Various embodiments of the present invention advantageously provide methods, systems and program product for synthesizing a heat exchanger network under process variations with life cycle switchability and flexibility and easy-to-implement future retrofit, which can handle industrial-size problems, which can keep the designer in control for the synthesis of the network without forcing him/her to use assumptions that confine the synthesized network to specific inferior structures due to the use of inconclusive superstructure, which can allow the designer to test his/her novel solutions for network synthesis that suffer constrained situations affecting energy consumption to include those normally faced in industrial applications, and which can render a lesser number of units for the same energy targets compared with pinch design approach for the problems that exhibit multiple pinches and pinch with near pinch applications.

Various embodiments of the present invention advantageously provide methods, systems and program product for synthesizing a heat exchanger network which can allow the designer to test his/her novel solutions for network synthesis using realistic disturbance and uncertainty scheme, which can calculate a best estimate for operating cost calculation to develop networks that exhibit a minimum number of units with a minimum value for the maximum-required surface area, and which can perform systematically and without iteration, in contrast to the conventional pinch-based approach. Various embodiments of the present invention advantageously provide methods, systems and program product for synthesizing systematically a heat exchanger network having life-cycle switchability and flexibility as well as easiness in heat exchanger network future systematic retrofitability, that can perform calculations at the design phase under all possible combinations of disturbances and uncertainty of optimal target temperatures for streams having operational conditions with an operating window range, and that can establish a high fidelity relationship between energy cost versus capital cost verses process-impact-cost due to a lack of flexibility resulting from deviations in designed anticipated disturbances and uncertainty and/or new operating modes, systematically and without enumeration.

Particularly, various embodiments of the present invention provide a system to synthesize a grass-roots heat exchanger network for a process or cluster of processes having a plurality of hot process streams to be cooled and a plurality of cold process streams to be heated and to identify optimal heat exchanger network topology. According to an embodiment of the present invention, such a system can include a heat exchanger network synthesizing computer having a processor and memory coupled to the processor to store software and database records therein, and a database stored in the memory (volatile or nonvolatile, internal or external) of or otherwise accessible to the heat exchanger network synthesizing computer. The database can include a plurality of data points, e.g., in the form of data pairs, indicating potential ranges of values for process stream operational attributes (e.g., (Ts), (ts), (Tt), (tt), (FCp)), for each of a same plurality of process streams (H1 . . . n, C1 . . . n), a set $\{\Delta T_{min}^{i} [L:U]\}$ of lower and upper stream-specific minimum temperature approach boundary values $\Delta T_{min}^{i}$ between streams, streams initial types, streams matching constraints, one or more interval global utility consumption values [Qh], [Qc], and/or indicia of the lower and upper bound of the pinch region boundary. The different sets of values beneficially provide for the determination of a plurality of heat exchanger network designs having a common physical structure but a different set of operational attributes. Note, although range/interval values are preferred, the various values including at least some of the operational attributes, stream-specific minimum temperature approach boundary values between streams, and the global utility consumption value can be in discreet form.

The system can also include heat exchanger network synthesizing program product stored in memory of the heat exchanger network synthesizing computer and/or as a stand-alone deliverable. According to a preferred configuration, the program product provides systematic synthesis of heat exchanger networks under all anticipated possible combinations of process variations in grassroots applications with easy-to-implement life-cycle retrofitability for a process or cluster of processes, and can produce the aforementioned plurality of heat exchanger network designs having a common physical structure but different sets of operational attributes, which collectively satisfy both current user-selected economic, switchability, and flexibility criteria and anticipated potential future retrofit requirements.

Notably, the inventors have recognized that the cost of retrofitting a heat exchanger network due to substantial change in a range of variation of the stream-specific supply temperature of at least one of the plurality of process streams and a corresponding substantial change in a range of variation of the stream-specific target temperature of at least one of the plurality of process streams, typically results in an extreme economic burden on a facility, but need not be, if the facility free space needed to retrofit or adjust a current design is allotted during the initial deployment of the first or original heat exchange or network. Embodiments of the present invention advantageously identify structural elements of a continuum of future retrofit network designs sufficient to allow a user to properly identify and allot facility free space needed to retrofit a presently selected design to match any one of the network designs within the continuum of designs.

Specifically, the program product, according to an embodiment of the present invention, can include instructions that when executed by a computer such as, for example, the heat exchanger network synthesizing computer, cause the computer to perform various operations to include the operation of receiving and/or otherwise identifying various input data including a plurality of data points indicating potential ranges of values for operational attributes for each of a plurality of process streams, a set of lower and upper stream-specific minimum temperature approach boundary values between streams, streams initial types, streams matching constraints, one or more interval global utility consumption values, and indicia of the lower and upper bound of the pinch region boundary. The received operational attributes can include a plurality of sets of stream-specific supply attribute interval values associated with a corresponding plurality of process streams, such as, for example, in the form of a lower and an upper boundary value for a supply temperature (Ts, ts) and target temperature (Tt, tt) of each of the plurality of the hot and cold process streams, respectively, and/or a lower and an upper boundary value for a heat capacity flow rate (FCp) of each of the plurality of the process streams.

The operations can also include determining a first heat exchanger network design by a computer responsive to a first set of the plurality of stream-specific supply attribute interval values (e.g., supply temperatures and/or heat capacity flow rates) associated with the corresponding plurality of process streams, and determining a plurality of additional heat exchanger network designs by the computer responsive to a corresponding plurality of additional sets of stream-specific supply attribute interval values associated with the plurality of process streams. This can be performed by separately assigning or otherwise associating corresponding members of each of the plurality of additional sets of stream-specific supply attribute interval values to the same plurality of process streams as used in the design of the first heat exchanger network to thereby form a plurality of additional heat exchanger network designs having the common process-to-process heat exchanger network structure, but having at least one, but more typically, a plurality of stream-specific supply attribute interval values different than those of each other of the additional heat exchanger network designs and the first heat exchanger network design. Further, in an exemplary configuration, each set of supply attribute interval values for each successive additional network design has a successively lower value range corresponding to a decreased anticipated future range of disturbances and uncertainty in the attribute values.

The operations can also include identifying a set of a plurality of common-structure heat exchanger network designs extracted from the plurality of additional heat exchanger network designs and the first heat exchanger network design. Advantageously, each extracted common-structure heat exchanger network design of the set of designs have a network structure characterized by a common process-to-process heat exchanger structure that is substantially the same as that of each other of the plurality of common-structure heat exchanger designs but collectively different in load allocation therebetween. Such common-structure designs advantageously facilitate user selection of a heat exchanger network satisfying both current user-selected economic, switchability, and flexibility criteria and anticipated potential future retrofit requirements.

According to another embodiment of the present invention, the operations can also or alternatively include receiving a user selection of one of the plurality of common-structure heat exchanger network designs satisfying current user-selected economic, switchability, and flexibility criteria to thereby construct a selected physical heat exchanger network satisfying the current user-selected criteria that can be readily retrofitted without extensive modifications, and providing data identifying parameters to construct the selected physical heat exchanger network. According to an embodiment of the system and/or program product, the operation of providing data identifying parameters to construct the selected physical heat exchanger network can include identifying an extra heat exchanger surface area requirement for one or more process-to-process heat exchangers identified in both the selected common-structure heat exchanger network design and a "least" heat exchanger populated one of the plurality of common-structure heat exchanger designs, providing configuration data to assist a user in connecting one or more bypass lines to at least partially bypass a corresponding one or more utilities heat exchangers identified in both the selected common-structure heat exchanger network design and the least heat exchanger network populated one of the plurality of common-structure heat exchanger designs to thereby match at least one other of the plurality of common-structure heat exchanger network designs located in a continuum between the selected one of the plurality of common-structure heat exchanger network designs and the least heat exchanger populated one of the plurality of common-structure heat exchanger designs.

The operations can also or alternatively include providing configuration data to assist a user in connecting one or more utilities heat exchangers identified in both a second selected common-structure heat exchanger network design of the plurality of common-structure heat exchanger network designs located in a continuum between the selected one of the plurality of common-structure heat exchanger network designs and the most heat exchanger populated one of the plurality of common-structure heat exchanger designs and a most heat exchanger populated one of the plurality of common-structure heat exchanger designs to match the second selected common-structure heat exchanger network design.

According to another embodiment of the present invention, the operations can include receiving a user selection of one of the plurality of common-structure heat exchanger network designs satisfying current user-selected economic, switchability, and flexibility criteria to thereby construct the selected physical heat exchanger network satisfying the current user-selected criteria that can be readily retrofitted without extensive modifications, and responsive to the operation of receiving a user selection, determining an amount of facility free space required for additional heat exchanger surface area when the selected one of the plurality of common-structure heat exchanger network designs is not the least heat exchanger populated one of the plurality of common-structure heat exchanger designs to thereby account for additional facility surface area needed to retrofit the selected physical heat exchanger network up to an extent of the least heat exchanger populated one of the plurality of common-structure heat exchanger designs to accommodate any future increased load on the selected physical heat exchanger network within a load capacity of the least heat exchanger populated one of the plurality of common-structure heat exchanger designs responsive to anticipated future switchability and flexibility needs.

According to another embodiment of the present invention, the operations can also or alternatively include receiving the user selection of one of the plurality of common-structure heat exchanger network designs, and responsively determining an amount of facility free space surrounding each of a plurality of process-to-process heat exchangers identified in both the selected common-structure heat exchanger network design and the least heat exchanger populated one of the plurality of common-structure heat exchanger designs required to accommodate an addition of extra surface area required for retrofitting the physical heat exchanger network to match the at least one other of the plurality of common-structure heat exchanger network designs located in the continuum between the selected one of the plurality of common-structure heat exchanger network designs and the least heat exchanger populated one of the plurality of common-structure heat exchanger designs, and/or determining an amount of facility free space required to accommodate an addition of one or more bypass lines to at least partially bypass a corresponding one or more utilities heat exchangers identified in both the selected common-structure heat exchanger network design and the least heat exchanger network populated one of the plurality of common-structure heat exchanger designs, required for retrofitting the physical heat exchanger network to match the at least one other of the plurality of common-structure heat exchanger network designs located in the continuum between the selected one of the plurality of common-structure heat exchanger network designs and the least heat exchanger populated one of the plurality of common-structure heat exchanger designs.

The operations can also and/or alternatively include responsively determining an amount of facility free space required to accommodate connecting one or more utilities heat exchangers identified in both the at least one other of the plurality of common-structure heat exchanger network designs and the most heat exchanger populated one of the plurality of common-structure heat exchanger designs required for retrofitting the physical heat exchanger network to match the at least one other of the plurality of common-structure heat exchanger network designs, and/or determining an amount of facility free space required for additional utility access surface area when the first selected one of the plurality of common-structure heat exchanger network designs is not the most heat exchanger populated one of the plurality of common-structure heat exchanger designs to thereby account for additional facility surface area needed to employ the one or more utilities heat exchangers and associated access media to retrofit the physical heat exchanger network up to an extent of the most heat exchanger populated one of the plurality of common-structure heat exchanger designs to accommodate any future increased utilities access requirements on the physical heat exchanger network within a network structural configuration of the most heat exchanger populated one of the plurality of common-structure heat exchanger designs, when so required.

According to another embodiment of the present invention, the operations can also or alternatively include receiving a user selection of a first selected one of the plurality of common-structure heat exchanger network designs satisfying current user-selected economic, switchability, and flexibility criteria to thereby construct a selected physical heat exchanger network satisfying the current user-selected criteria that can be readily retrofitted without extensive modifications, and at a substantially later time period, for example, as a result of changed conditions, such as a substantial change in a range of variation of the stream-specific supply temperature of at least one of the plurality of process streams and a corresponding/related substantial change in a range of variation of the stream-specific target temperature of at least one of the plurality of process streams, identifying a second one of the plurality of common-structure heat exchanger network designs from within the continuum between the first selected one of the plurality of common-structure heat exchanger network designs and the "least" heat exchanger populated one of the plurality of common-structure heat exchanger designs providing a then presently optimal design.

According to another embodiment of the system/program product, the operations can also or alternatively include receiving the user selection of the first selected one of the plurality of common-structure heat exchanger network designs satisfying current user-selected economic, switchability, and flexibility criteria to thereby construct a selected physical heat exchanger network satisfying the current user-selected criteria that can be readily retrofitted without extensive modifications, and at a substantially later time period, for example, as a result of changed conditions, such as a substantial change in a range of variation of the stream-specific supply temperature of at least one of the plurality of process streams and a corresponding/related substantial change in a range of variation of the stream-specific target temperature of at least one of the plurality of process streams at a substantially later time period, receiving a user selection of a second one of the plurality of common-structure heat exchanger network designs selected from within the continuum between the first selected one of the plurality of common-structure heat exchanger network designs and the "most" heat exchanger populated one of the plurality of common-structure heat exchanger designs to thereby retrofit the selected physical heat exchanger network, e.g., by connecting the one or more utilities heat exchangers identified in both the second selected common-structure heat exchanger network design and the most heat exchanger populated one of the plurality of common-structure heat exchanger designs, required to match the heat exchanger network structure of the selected second one of the plurality of common-structure heat exchanger network designs.

According to another embodiment of the present invention, a system can also or alternatively include heat exchanger network synthesizing program product that includes instructions that when executed by a computer such as, for example, the heat exchanger network synthesizing computer, cause the computer to perform various operations to synthesize a grass-roots heat exchanger network for a process or cluster of processes having a plurality of hot process streams to be cooled and a plurality of cold process streams to be heated and to identify optimal heat exchanger network topology to accommodate future time-dependent new operating modes, disturbances and uncertainty schemes. The operations can include determining a first heat exchanger network design responsive to a first set of stream-specific supply temperature interval values and a first set of stream-specific target temperature interval values for a plurality of process streams, determining a plurality of additional heat exchanger network designs responsive to a corresponding plurality of additional sets of stream-specific supply temperature interval values and a corresponding plurality of additional sets of stream-specific target temperature interval values assigned to the plurality of process streams, and responsive to the operations of determining a first heat exchanger network design and determining a plurality of additional heat exchanger network designs, identifying a set of a plurality of common-structure heat exchanger network designs extracted from the plurality of additional heat exchanger network designs and the first heat exchanger network design to thereby facilitate user selection of a heat exchanger network satisfying both current user-selected economic, switchability, and flexibility criteria and anticipated potential future retrofit requirements.

According to an exemplary methodology/process, at least one interval value of each member of the first set of stream-specific supply temperature interval values is different than a corresponding at least one interval value of a corresponding member of each of the additional sets of stream-specific supply temperature interval values associated with a corresponding same one of the plurality of process streams, and at least one interval value of each member of each one of the additional sets of stream-specific supply temperature interval values is different than a corresponding at least one interval value of a corresponding member of each other of the plurality of additional sets of stream-specific supply temperature interval values associated with a corresponding same one of the plurality of process streams. Further, according to such exemplary methodology/process, at least one interval value of each member of the first set of stream-specific target temperature interval values is also typically different than a corresponding at least one interval value of a corresponding member of each of the additional sets of stream-specific target temperature interval values associated with a corresponding same one of the plurality of process streams, and at least one interval value of each member of each one of the additional sets of stream-specific target temperature interval values is typically different than a corresponding at least one interval value of a corresponding member of each other of the additional sets of stream-specific target temperature interval values associated with a corresponding same one of the plurality of process streams.

These different values can advantageously be utilized to produce multiple heat exchanger designs of which the exemplary methodology/process implemented by the program product can select or otherwise identify a subset of common-structure heat exchanger designs having a common process-to-process heat exchanger network structure that is substantially the same as that of each other of the plurality of common-structure heat exchanger designs but collectively different in load allocation therebetween. Such common process-to-process heat exchanger network structure provides a continuum of designs having the same general physical structure/topology but with a different load allocation on the heat exchangers (heat exchanger duty or heat transfer between streams) and/or the possibility of adding additional heat exchanger units and/or bypassing excess heat exchanger units, partially and/or completely, to easily retrofit a physical heat exchanger network to match any one of the designs in the continuum such as, for example, due to present efficiency, and later, a different one of the designs due to changed energy cost conditions or other factors or conditions.

Various embodiments of the present invention also advantageously provide methods to synthesize a grass-roots heat exchanger network for a process or cluster of processes having a plurality of hot process streams to be cooled and a plurality of cold process streams to be heated and to identify optimal heat exchanger network topology. The methods can include, among others, various steps substantially coinciding with those described with respect to the program product along with the process steps for physically constructing a current heat exchanger network, allotting appropriate real estate/surface area for future retrofit, identifying retrofit requirements, and retrofitting the current heat exchanger network to match one of the network designs provided in the continuum of designs having a common process-to-process structure.

For example, along with the steps (operations) with respect to the various embodiments in the system and/or program product, described above, the steps can further include various other steps including: adding extra surface area on one or more process-to-process heat exchangers identified in both the selected common-structure heat exchanger network design and a least heat exchanger populated one of the plurality of common-structure heat exchanger designs, and adding one or more bypass lines to at least partially bypass a corresponding one or more utilities heat exchangers identified in both the selected common-structure heat exchanger network design and the least heat exchanger network populated one of the plurality of common-structure heat exchanger designs to match a second selected one of the plurality of common-structure heat exchanger network designs located in a continuum between the first selected one of the plurality of common-structure heat exchanger network designs and the least heat exchanger populated one of the plurality of common-structure heat exchanger designs. The steps can also or alternatively include connecting one or more utilities heat exchangers identified in both the second selected common-structure heat exchanger network design and the most heat exchanger populated one of the plurality of common-structure heat exchanger designs to match the second selected common-structure heat exchanger network design.

The steps can additionally or alternatively include allotting facility free space for additional heat exchanger surface area when the selected one of the plurality of common-structure heat exchanger network designs is not the least heat exchanger populated one of the plurality of common-structure heat exchanger designs (typically having the largest heat exchanger surface areas and most bypass lines) to thereby account for additional facility surface area needed to retrofit the selected physical heat exchanger network up to an extent of the least heat exchanger populated one of the plurality of common-structure heat exchanger designs to accommodate any future increased load on the selected physical heat exchanger network within a load capacity of the least heat exchanger populated one of the plurality of common-structure heat exchanger designs responsive to anticipated future switchability and flexibility needs.

Ultimately, such steps allow a user to construct a physical heat exchanger network satisfying both current user-selected economic, switchability, and flexibility criteria and anticipated potential future retrofit requirements based upon a user selection of one of the plurality of common-structure heat exchanger network designs satisfying current user-selected economic, switchability, and flexibility criteria. The constructing of the physical heat exchanger network can include, for example, providing sufficient facility free space surrounding each of a plurality of process-to-process heat exchangers identified in both the selected common-structure heat exchanger network design and the least heat exchanger populated one of the plurality of common-structure heat exchanger designs to accommodate an addition of extra surface area required for retrofitting the physical heat exchanger network to match at least one other of the plurality of common-structure heat exchanger network designs located in the continuum between the selected one of the plurality of common-structure heat exchanger network designs and the least heat exchanger populated one of the plurality of common-structure heat exchanger designs, and/or providing sufficient facility free space to accommodate an addition of one or more bypass lines to at least partially bypass a corresponding one or more utilities heat exchangers identified in both the selected common-structure heat exchanger network design and the least heat exchanger network populated one of the plurality of common-structure heat exchanger designs required for retrofitting the physical heat exchanger network to match the at least one other of the plurality of common-structure heat exchanger network designs located in the continuum between the selected one of the plurality of common-structure heat exchanger network designs and the least heat exchanger populated one of the plurality of common-structure heat exchanger designs.

The step of constructing the physical heat exchanger network can also or alternatively include providing sufficient facility free space to accommodate connecting one or more utilities heat exchangers identified in the most heat exchanger populated one of the plurality of common-structure heat exchanger designs required for retrofitting the physical heat exchanger network to match at least one other of the plurality of common-structure heat exchanger network designs located in the continuum between the first selected one of the plurality of common-structure heat exchanger network designs and the most heat exchanger populated one of the plurality of common-structure heat exchanger designs, and/or allotting sufficient facility free space for additional utility access surface area when the first selected one of the plurality of common-structure heat exchanger network designs is not the most heat exchanger populated one of the plurality of common-structure heat exchanger designs to thereby account for additional facility surface area needed to employ the one or more utilities heat exchangers and associated access media to retrofit the physical heat exchanger network up to an extent of the most heat exchanger populated one of the plurality of common-structure heat exchanger designs to accommodate any future increased utilities access requirements on the physical heat exchanger network within a network structural configuration of the most heat exchanger populated one of the plurality of common-structure heat exchanger designs, when so required.

Typically, after some time has past and after there has been a substantial change in a range of variation of the stream-specific supply temperature, heat capacity flow rate, and/or stream-specific target temperature of at least one of the plurality of process streams, the original first selected heat exchanger network design selected from within the continuum of common-structure heat exchanger network designs no longer provides a optimal or cost-effective design. Accordingly, the steps can include selecting a second one of the plurality of common-structure heat exchanger network designs from within the continuum between the first selected one of the plurality of common-structure heat exchanger network designs and the least heat exchanger populated one of the plurality of common-structure heat exchanger designs, and retrofitting the selected physical heat exchanger network, for example, by adding extra surface area on one or more of the plurality of process-to-process heat exchangers identified in both the first selected common-structure heat exchanger network design and the least heat exchanger populated one of the plurality of common-structure heat exchanger designs, and/or by adding one or more bypass lines to at least partially bypass a corresponding one or more utilities heat exchangers identified in both the first selected common-structure heat exchanger network design and the least heat exchanger network populated one of the plurality of common-structure heat exchanger designs required to match the heat exchanger network structure of the selected second one of the plurality of common-structure heat exchanger network designs.

Similarly, the steps can include selecting a second one of the plurality of common-structure heat exchanger network designs from within the continuum between the first selected one of the plurality of common-structure heat exchanger network designs and the most heat exchanger populated one of the plurality of common-structure heat exchanger designs, and retrofitting the selected physical heat exchanger network, for example, by employ the one or more utilities heat exchangers and associated access media identified in both the second selected common-structure heat exchanger network design and the most heat exchanger populated one of the plurality of common-structure heat exchanger designs.

Various embodiments of the present invention provide a user-friendly methodology for advanced systematic synthesis, of a heat exchanger network under variations, which can benefit heat exchangers network synthesis and waste heat recovery applications of new plant designs and its future retrofit in a world of fast dynamic with significant changes in energy availability and prices. Various embodiments of the present invention provide several folds of commercial benefits. First, various embodiments of the present invention provide unique advanced methodologies that can be easily automated in existing software or provided as separate user-friendly software to optimally design energy recovery systems in industrial facilities. Industrial companies utilizing such methodologies can be expected to have an edge from energy efficiency consumption and pollution minimization points of view in designing and operating their facilities. An estimated 5% improvement in energy efficiency optimization beyond what could be currently obtained from the state-of-art tools and technology, due to the application of one or more embodiments of the present invention, can result in saving of tens of millions of dollars per year to implementing company in energy consumption and huge saving in projects capital too. Second, the commercial development of the various techniques/methods, and algorithms described herein can, by themselves, provide independent tools for optimizing facilities from waste energy recovery system synthesis and future retrofits point of view. Finally, along with various other commercial benefits, the various methods/techniques can employ to form part of a "centre of excellence" or "hot-house" in an energy efficiency optimization business.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 11 is a tabular description of an input file for a program for determining heat exchanger duty surface area according to an embodiment of the present invention;

FIG. 12 is a tabular description of an output file produced by a program for determining heat exchanger duty surface area according to an embodiment of the present invention;

FIG. 23 is a tabular description of an input file for a program for determining a heat exchanger network structure according to an embodiment of the present invention; and FIG. 24 is a tabular description of an output file produced by a program for determining heat exchanger network structure according to an embodiment of the present invention.

DETAILED DESCRIPTION

Figure 1:
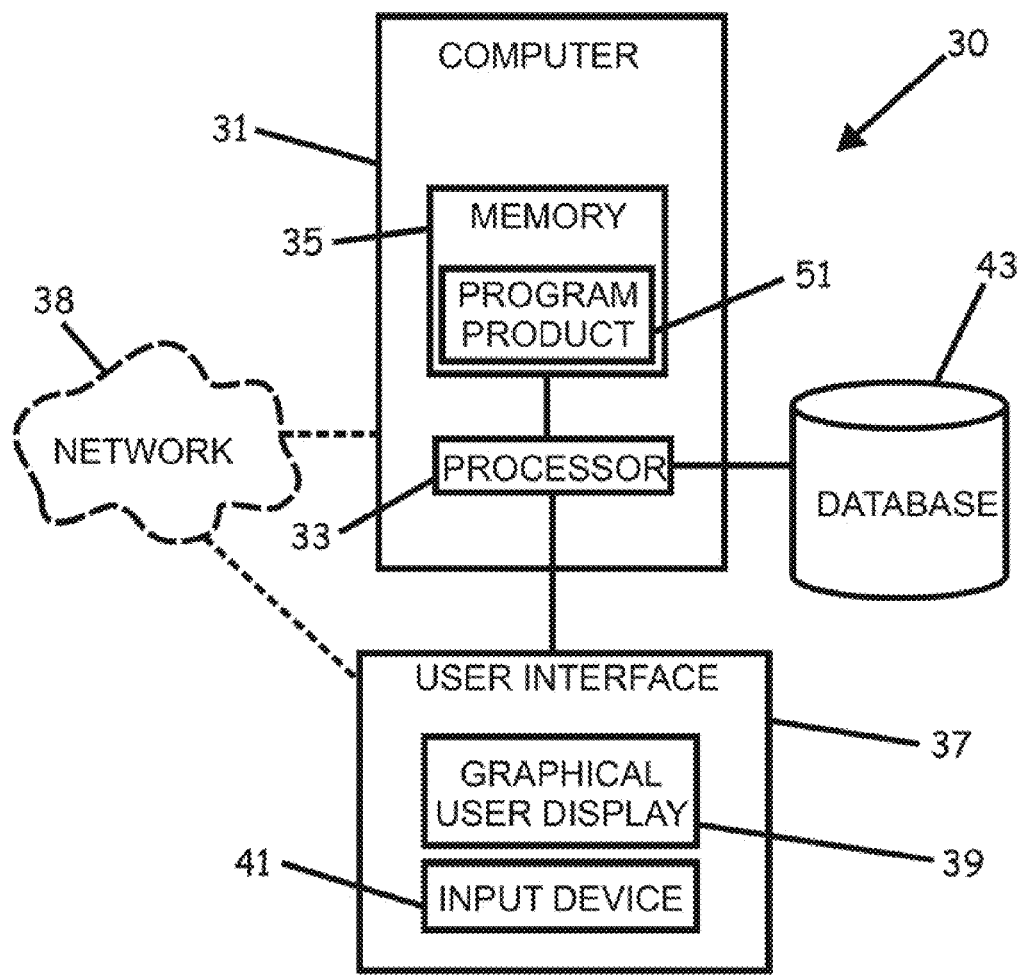
FIG. 1 is a schematic block diagram of a system to synthesize a grass-roots heat exchanger network for a plurality of process streams and to identify optimal heat exchanger network topology according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Many different types of processes consume multiple steam levels and electricity to obtain an output result, or to produce a required product or compound. With large scale processes which consume significant amounts of steam, for example, it is preferable to optimize the steam and power system where possible. Heat exchanger network synthesis for waste heat recovery under all possible combinations of process variations is a very important sub-system in any new plant. Its synthesis and design needs to be optimized during the design stage to minimize energy and capital costs and to make it 100% switchable to each operating mode and as flexible as economically feasible under disturbances and uncertainty for its entire life cycle, as well as "easily-retrofitable" in future times due to dramatic changes in energy prices, new desirable operating modes, and/or new schemes of disturbance and uncertainty. For example, in some industrial manufacturing processes, specific streams of material flows need to be supplied to different types of equipment and machinery at specific temperatures. These material flows may need to be heated or cooled from an original starting temperature to a target temperature. This, in turn, will require the consumption of steam to heat specific streams and consumption of water, for example, to cool down specific streams under varying process conditions.

From a switchability point of view, the new heat exchanger network design may be required, for example, to face different operating modes to handle major changes in feed conditions such as crude oil type, natural gas flow, temperature, pressure and composition. It may also be required to handle the processing of different products with different specifications as would be the case in the polymer industry (e.g., different polymer grades), in the multi-product pharmaceutical industries, and in multi-feed, multi-product agriculture chemical plants, and so on. In such situations, although the range of variation might be significant, it is nevertheless necessary to design a heat exchanger network that can handle such situations all the time. In other words, the design should be feasible under all possible combinations and at each operating mode. Accordingly, in the case of switchability, decision-makers would not trade-off between network capital and operating cost, but rather, would require that the design be sufficient to satisfy all operating modes.

From a flexibility point of view, however, the new heat exchanger network design can relax both the range of variations in the process conditions and the need for 100% feasibility. For example, in some cases, decision-makers can allow for a trade-off between the heat exchanger network capital cost and operating cost; on one hand, and the impact on the rest of the process due less than 100% feasibility in the designed heat exchanger network under the given process variation range, on the other. It should be understood that the heat exchanger network flexibility should provide for different small changes/disturbances and uncertainty due to, for example, ambient temperature changes, fouling in exchangers, catalyst deactivation, heat, mass and momentum transfer coefficients uncertainty, reaction kinetics parameters uncertainty (activation energy and frequency factor), equilibrium constants uncertainty, degradation in equipment thermodynamic efficiency, and so on.

As such, according to various embodiments of the present invention, beneficially, these considerations can be taken into account during heat exchanger network synthesis and prior to detailed design. That is, it is preferable to consider these important issues in heat exchanger network design with a systematic method prior to the detailed design and actual construction of the physical plant and equipment. Correspondingly, where the state-of-the-art software in the market such as AspenTech Inc. product known as Aspen Pinch, and HX-NET, Pinch Express of KBC and Sprint of UMIST, do not address the heat exchanger network life cycle switchability and flexibility problems systematically, and in applications of the near pinch and multiple pinches problems, render a larger number of units that necessary, various embodiments of the present invention advantageously overcome such limitations. Further, where such software that employs the pinch design approach in an iterative way, due to its nature, can not guarantee feasibility for switchability purposes, can not systematically trade-off heat exchanger network flexibility versus the rest of the process, and can not optimally select optimal or at least substantially optimal streams target temperatures under all possible combinations of the process variations systematically, various embodiments of the present invention advantageously provide user friendly systematic methods, systems, and program product for heat exchanger network grassroots applications: that render heat exchanger network designs that have less than or equal number of heat exchanger units of the networks synthesized using other iterative methods systematically and that, for all practical purposes, that render heat exchanger network designs that are guaranteed to be switchable and have the right degree of flexibility for the heat exchanger network life cycle, and that render heat exchanger network designs that exhibit easiness in its future retrofitability under all possible combinations of process variations, and that provide an identification of the heat exchanger network streams optimal target temperatures for the respective network designs, all accomplished without ad hoc iterations.

For a given list of process streams to be either cooled or heated with its interval heat capacity flow rate, interval supply and target temperatures, set of stream-specific minimum approach temperatures, and interval utilities targets that need to be satisfied or more or less to be satisfied through bounded targets, various embodiments of the methods/techniques, systems, and program product can beneficially enable synthesizing a heat exchanger network that sharply satisfies or more or less satisfies the interval utilities targets consumption within its defined bounds with less number of units, compared with pinch design method using advanced matching solutions, systematically, producing a network that exhibits heat exchanger network life cycle switchablity and flexiblity that is easily retrofitable in the future upon the change in energy prices and/or disturbances and uncertainty schemes under all possible combinations of process variations. Further, according to uncertainty schemes where the process streams have desired target temperatures in form of collapsed interval or as fixed numbers, various embodiments of the methods/techniques, systems, and program product can beneficially also select the optimal target temperature of each stream from within its given range.

FIGS. 1-24 provide examples illustrating various embodiments of methods, systems, and program product including algorithms to synthesize a grass-roots heat exchanger network and analyze a grass-roots heat exchanger network design, which can utilize targeting calculations described, for example, in one or more prior related patent/patent application disclosures identified at the end of this detailed description section, as an input file to the process steps and/or operations described herein. Such targeting calculations data can include the global heating energy utility values (heating duty required) [Qh] and global cooling energy utility values (cooling duty required) [Qc] where the "[ ]" denotes interval values, as well as the location of the pinch region referred to as "region of minimum choice lower and upper temperature boundaries" shown in FIG. 4 at 103, 105, for example. Note, those skilled in the art should appreciate that various embodiments of the present invention may encompass specific hardware or apparatus used to implement the present invention in addition to a computer program product programmed into programmable logic or digital devices adapted to execute to a number of processing steps to achieve the aims of the invention.

Specifically, FIG. 1 illustrates a system 30 to determine global energy utility targets, to define an optimal driving force distribution, synthesize a grass-roots heat exchanger network, and analyze a grass-roots heat exchanger network design, for a process having a plurality of resource streams. The system 30 can include a heat exchanger network synthesizing computer 31 having a processor 33, memory 35 coupled to the processor 33 to store software and database records therein, and a user interface 37 which can include a graphical display 39 for displaying graphical images, and a user input device 41 as known to those skilled in the art, to provide a user access to manipulate the software and database records. Note, the computer 31 can be in the form of a personal computer or in the form of a server or server farm serving multiple user interfaces 37 or other configuration known to those skilled in the art. Accordingly, the user interface 37 can be either directly connected to the computer 31 or through a network 38 as known to those skilled in the art.

The system 30 can also include a database 43 stored in the memory 35 (internal or external) of heat exchanger network synthesizing computer 31 and having a plurality of sets of values each separately defining a potential range of values for at least one operational attribute for each of a plurality of hot resource streams and a plurality of sets of values each separately defining a potential range of values for at least one operational attribute for each of a plurality of cold resource streams. Such attributes can include, for example, a lower and an upper boundary value for a supply temperature (Ts) of each of the hot resource streams and each of the cold resource streams, a lower and an upper boundary value for a target temperature (Tt) of each of the hot resource streams and each of the cold resource streams, and/or a lower and an upper boundary value for a heat capacity flow rate (FCp) of each of the hot resource streams and each of the cold resource streams, along with one or more sets of stream-specific minimum temperature approach values between streams ($\Delta T\text{-}min^i$), streams initial types, streams matching constraints, and at least one interval global utility consumption value [Qh], [Qc], for the process according to the received streams conditions.

The system 30 can also include heat exchanger network synthesizing program product 51 stored in memory 35 of the heat exchanger network synthesizing computer 31 and adapted to provide systematic synthesis of heat exchanger networks for switchability and flexibility under all possible combinations of process variations in grassroots applications with easy-to-implement life-cycle retrofitability for a process or cluster of processes using a plurality of resource streams each having operational attributes including an interval heat capacity flow rate, a defined interval supply temperature, and a desired target temperature that can also be in interval form, accomplished without the need for manual (trial and error) enumeration, inherent in other prior systems. Note, the heat exchanger network synthesizing program product 51 can be in the form of microcode, programs, routines, and symbolic languages that provide a specific set for sets of ordered operations that control the functioning of the hardware and direct its operation, as known and understood by those skilled in the art. Note also, the heat exchanger network synthesizing program product 51, according to an embodiment of the present invention, need not reside in its entirety in volatile memory, but can be selectively loaded, as necessary, according to various methodologies as known and understood by those skilled in the art.

Figure 2:
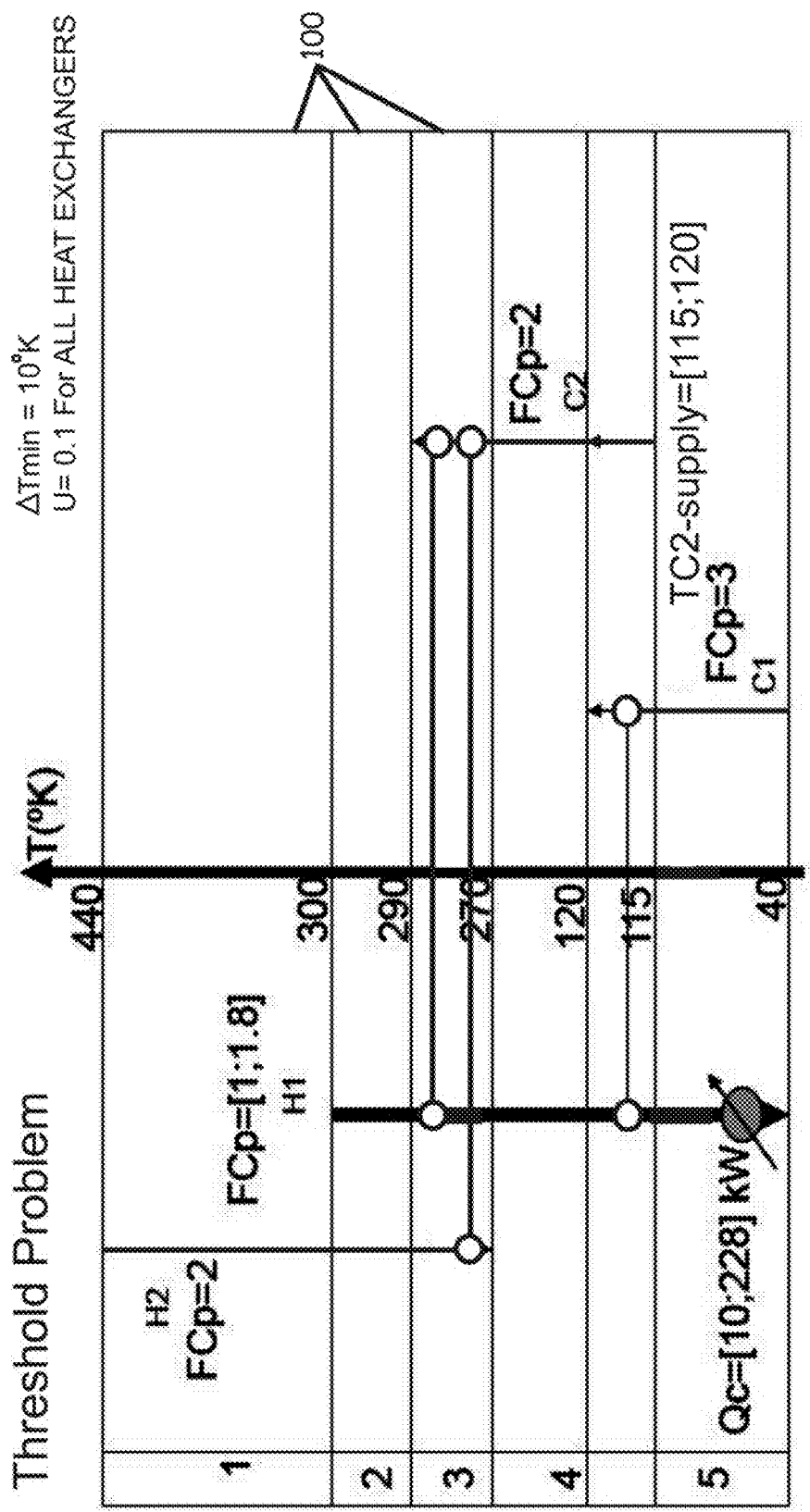
FIG. 2 is a diagram illustrating generation of temperature step intervals included with a diagram of a heat exchanger network synthesis implementation for a simple threshold problem for an industrial process according to an embodiment of the present invention.
Figure 3:
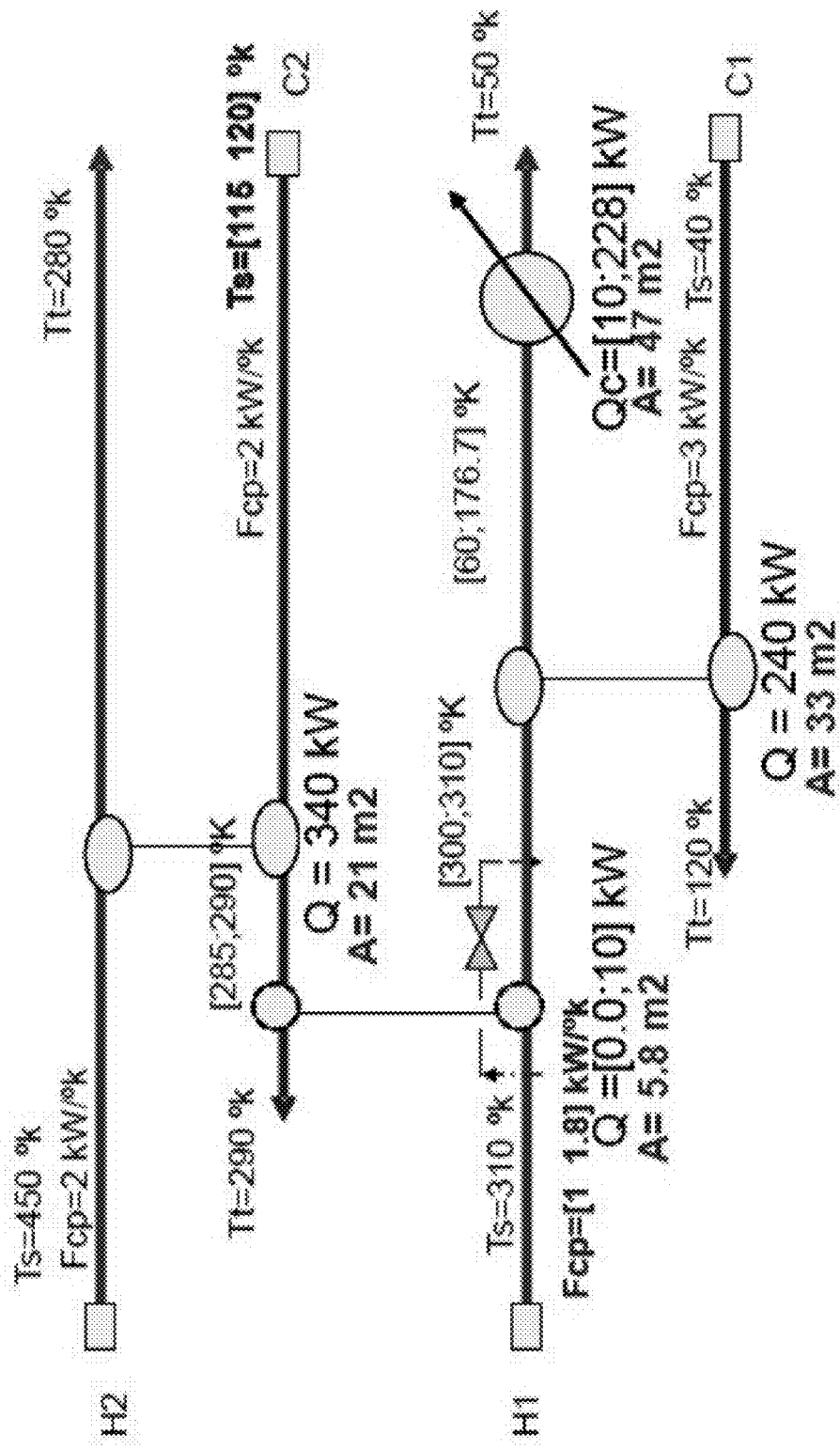
FIG. 3 is a schematic diagram of a physical structural configuration of a heat exchanger network synthesis implementation for the industrial process shown in FIG. 2 according to an embodiment of the present invention.

FIG. 2 illustrates a schematic graph illustrating a simple example of an industrial process, overlaid upon successive temperature intervals 100 generated therefor. The illustrated industrial process, providing what is termed a "threshold problem" (i.e., one requiring only a cold or hot utility, but not both), incorporates four separate and distinct process streams H1, H2, C1, C2, with H1, H2, and C1, having only discrete values for the supply temperature and the target temperature, and H2, C1, and C2 having only discrete values for the heat capacity flow rate but with C2 having an interval value [115, 120] for its supply temperature and H1 having an interval value [1.0, 1.8] for its heat capacity flow rate. The result is a network having a global cooling energy utility interval value [Qc] of [10, 228] kW based upon a minimum temperature approach value ($\Delta T_{min}$) of 10° K embedded in each hot stream H1, H2 and a heat exchanger duty (U) value of 0.1 for all heat exchangers. FIG. 3 illustrates a schematic of the resulting heat exchanger network design for the industrial process.

Figure 4:
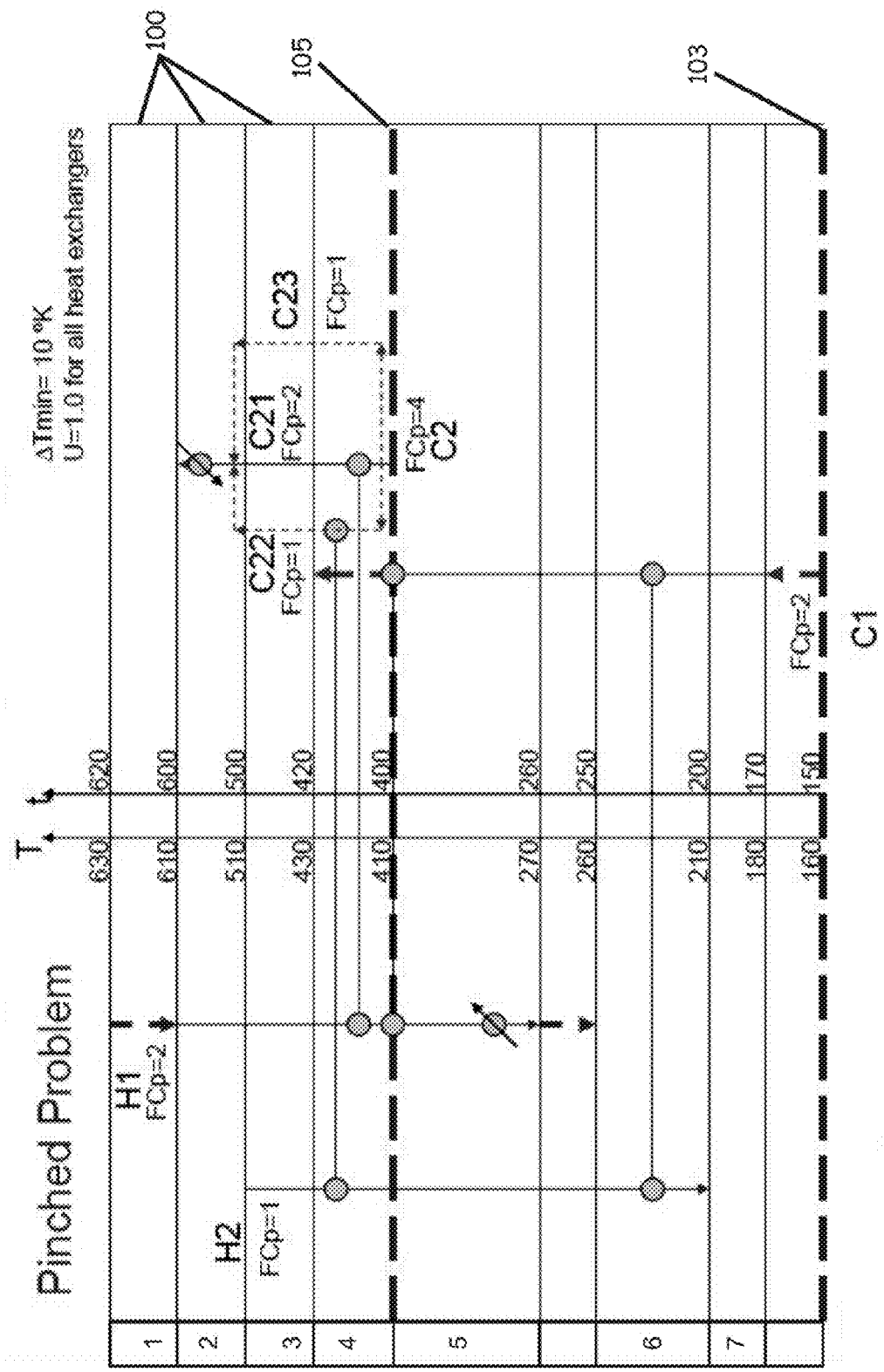
FIG. 4 is a diagram illustrating generation of temperature step intervals included with a diagram of a heat exchanger network synthesis implementation for a simple pinched problem for an industrial process according to an embodiment of the present invention.
Figure 5:
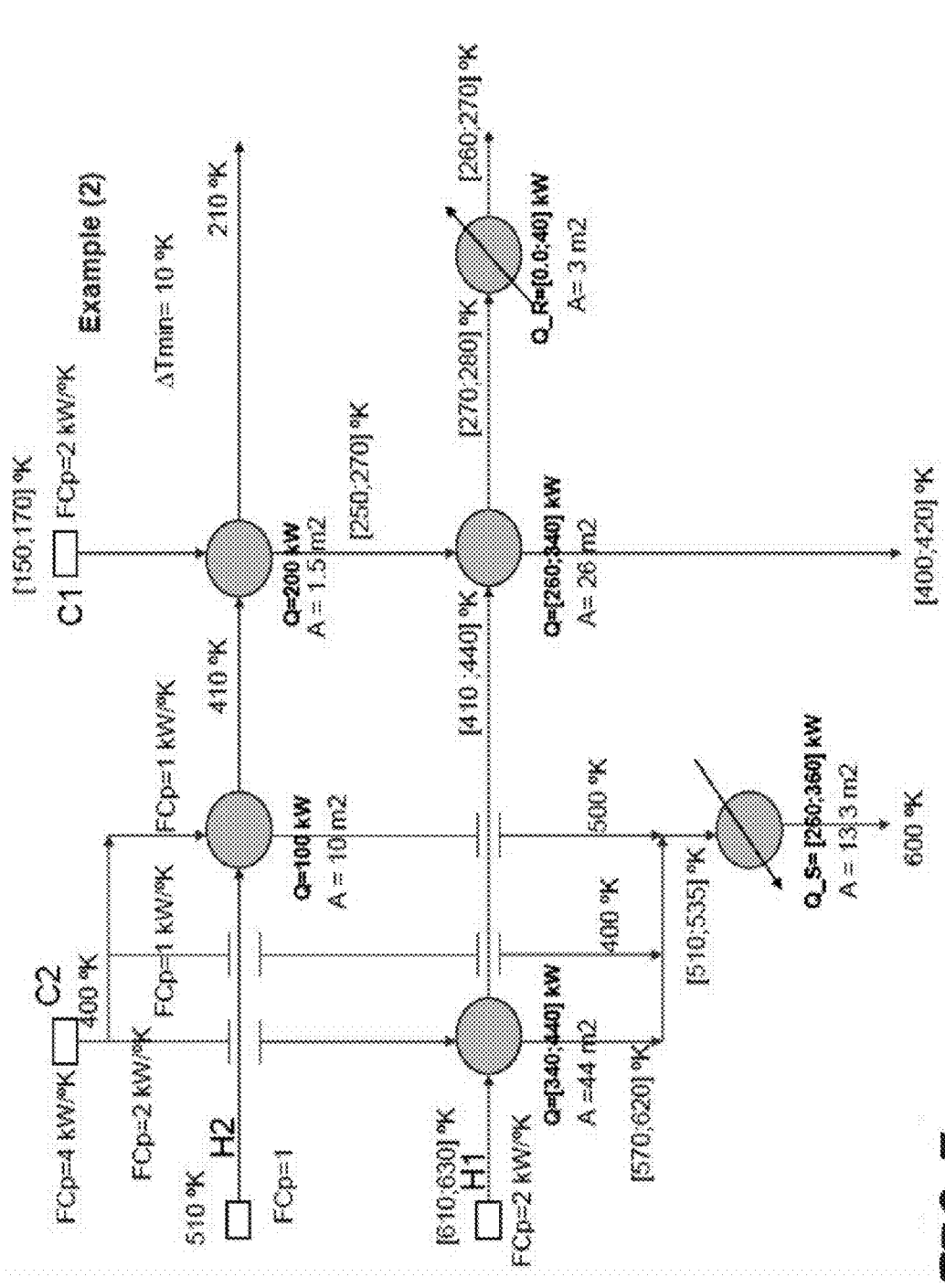
FIG. 5 is a schematic diagram of a physical structural configuration of a heat exchanger network synthesis implementation for the industrial process shown in FIG. 4 according to an embodiment of the present invention.

FIG. 4 illustrates a schematic graph illustrating a simple example of an industrial process, overlaid upon successive temperature intervals 100 generated therefor. The illustrated industrial process, providing what is termed a "pinched problem" that needs both heating and cooling utilities, incorporates four separate and distinct process streams H1, H2, C1, C2, with H2 and C2, having only discrete values for the supply temperature and the target temperature, and H1, H2, C1, and C2 having only discrete values for the heat capacity flow rate but with H1 having an interval value [610, 630] for its supply temperature and an interval value [260, 270] for its target temperature and C1 having an interval value [150, 170] for its supply temperature and an interval value [400, 420] for its target temperature. The result is a network having a global cooling energy utility interval value [Qc] of [0.0, 40] kW and a global heating energy utility interval value [Qh] of [260, 360] kW based upon a minimum temperature approach value ($\Delta T_{min}$) of 10° K embedded in each hot stream H1, H2 and a heat exchanger duty (U) value of 1.0 for all heat exchangers, with streams splitting of cold stream C2 being performed to enhance energy recovery through stream matching. FIG. 5 illustrates a schematic of the resulting heat exchanger network design for the industrial process.

Figure 6:
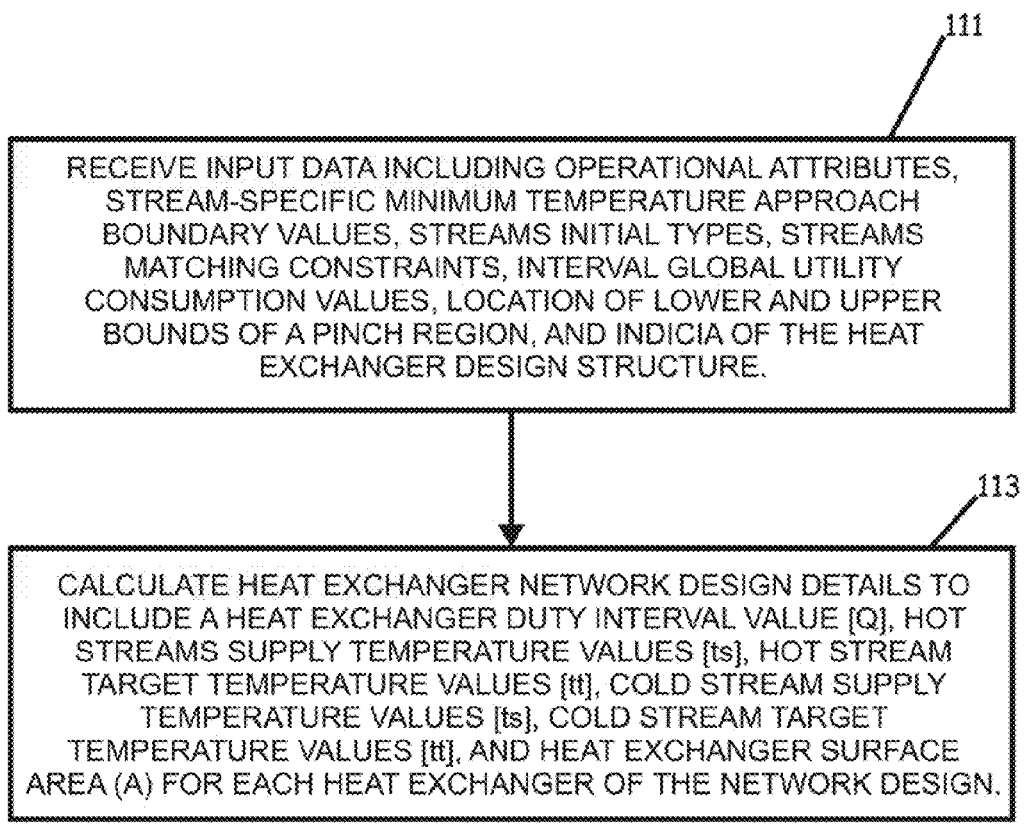
FIG. 6 is a block flow diagram illustrating calculation of individual heat exchanger network design details according to an embodiment of the present invention.

The table below provides a high-level summary of a heat exchanger network design algorithm according to an example of an embodiment of the present invention:

FIG. 6 provides a high-level flow diagram illustrating operation of the heat exchanger network synthesizing program product 51 and/or associated method steps according to an embodiment of the present invention. As shown in block 111, the program product 51 receives input data as an input file (see, e.g., FIG. 11) which can include data indicating potential ranges of values for operational attributes for each of a plurality of process streams, a set $\{\Delta T_{min}{}^i [L:U]\}$ of lower and upper stream-specific minimum temperature approach boundary values $\Delta T_{min}{}^i$ between streams, streams initial types, streams matching constraints, at least one interval global utility consumption value [Qh], [Qc], a location of lower and upper bounds of a pinch region referred to as "region of minimum choice" for the process according to received streams conditions provided, and indicia of a heat exchanger network design structure, for example, produced or otherwise determined through application of an energy modeling process described, for example, in addition detail, in U.S. patent application Ser. No. 12/767,217, filed Apr. 26, 2010, titled "System, Method, and Program Product for Synthesizing Non-Constrained and Constrained Heat Exchanger Networks, and U.S. patent application Ser. No. 12/767,275, filed Apr. 26, 2010, titled "System, Method, and Program Product for Synthesizing Non-Thermodynamically Constrained Heat Exchanger Networks," incorporated by reference in its entirety.

As shown in block 113, the program product 51 then calculates heat exchanger network design details to include a heat exchanger duty interval value [Q], hot streams supply temperature values [Ts], hot stream target temperature values [Tt], cold stream supply temperature values [ts], cold stream target temperature values [tt], and heat exchanger surface area "A" for each heat exchanger of the network design, along with a corresponding total surface area, for the whole network that satisfies the respective given/input process condition variations scheme. The table below provides a high-level summary of a heat exchanger network design details calculation algorithm according to an example of an embodiment of the present invention:

| | |
|---|---|
| Step # 0: | Treat the problem as one problem without decomposition. |
| Step # 1: | Receive attribute data for hot and cold streams of the process or processes. |
| Step # 2: | Calculate [Qh], [Qc], and find ROMC temperature boundary. Generate temperature intervals having input variations in an, e.g., one-scale temperature interval diagram and apply specific minimum temperature approach values. |
| Step # 3: | Match streams at each temperature interval for all types of problems moving from top-to-bottom (highest to lowest). Match streams that can cancel each other or one of them with minimum quality degradation to the other. Match streams with maximum overlap or with equal or close to equal heat capacity flow rates (FCps). Match streams having high FCps and high heat transfer coefficients ("hi") with streams having low FCps with low heat transfer coefficients. Employ stream switching/partial conversion, homogeneous matching, or buffers (if feasible) to overcome non-thermodynamic constraints. |
| Step # 4: | Target for utilities as guidance and balance loads using utilities during step down through the temperature intervals. |
| Step # 5: | Split streams as necessary to reach the desired utilities loads and/or to reduce quality degradation. |
| Step # 6: | Determine an initial heat exchanger network design. |
| Step # 7: | Remove redundant process-to-process heat exchanger units. |
| Step # 8: | Merge same stream utility heat exchanger units. |
| Step # 9: | Determine the final heat exchanger network design. |

| | |
|---|---|
| Step # 0: | Treat ΔTmin[1] and realizing [Qc] and [Qh] as the main constraints to be satisfied. |
| Step # 1: | Use ΔTmin[1] check to decide path forward for middle temperatures calculation. |
| Step # 2: | Ensure heat exchanger unit heat load Q realization and lower and upper bounds calculation using logic propagation. |
| Step # 3: | Use standard interval method for middle temperatures and duties calculation for each heat exchanger unit heat load [Q]. |
| Step # 4: | Use modal intervals in case of ΔTmin[1] violation, or [Q]s constraints violation, or lower and upper bounds calculation logic constraints dissatisfaction. |

Note, although the heat capacity flow rate FCp, supply temperature Ts, target temperature Tt, heat exchanger unit heat load Q, and heating and cooling energy Qh and Qc values are described as interval values where "[ ]" refers to interval values, one of ordinary skill in the art would understand that not all of such stream or heat exchanger operation attributes need be interval values. Rather, one or more or all can be discreet point values. Regarding Step #1, the middle temperatures calculation refers to the calculation of temperature between two consecutive units, such as, for example, [290; 310]° K for hot stream H1 in FIG. 18. Regarding Step #2, logic propagation refers to maintaining the heat balance of each stream intact, where a hot stream, for example, with known heat capacity flow rate [FCp] (or FCp) between a certain supply temperature [Ts] (or Ts) and certain target temperature [Tt] and Tt shall loose a certain [Q] (or Q). Regarding Step #3, the standard interval method (for subtraction) refers to a method of obtaining an interval answer that provides a worst-case scenario that may or may not be realizable in some physical applications. For example, for the subtraction of intervals [10; 15] and [5; 7], the result would be [3; 10]: obtained by performing the following subtraction (10-7) and (15-5) to obtain the interval answer.

Regarding Step #4, the modal intervals calculation (for subtraction) refers to a method of obtaining a modal interval answer. For example, for the modal subtraction of intervals [10; 15] and [5; 7], the result would be [5; 8]: obtained by performing the following subtraction (10-5) and (15-7) to obtain the interval answer. The existence of a ΔTmin violation refers to the use of a value in any heat exchanger less than the one used in calculating the energy targets. The existence of a [Q]s violation refers to a change in the heating utilities and cooling utilities interval energy targets calculated at certain global ΔTmin used from the beginning in the energy targeting phase. Logic constraints dissatisfaction refers to a situation where when subtracting intervals, we find that the cold stream at higher temperature than the hot stream is exchanging heat in one or more of the designed heat exchanger units.

Figure 21:
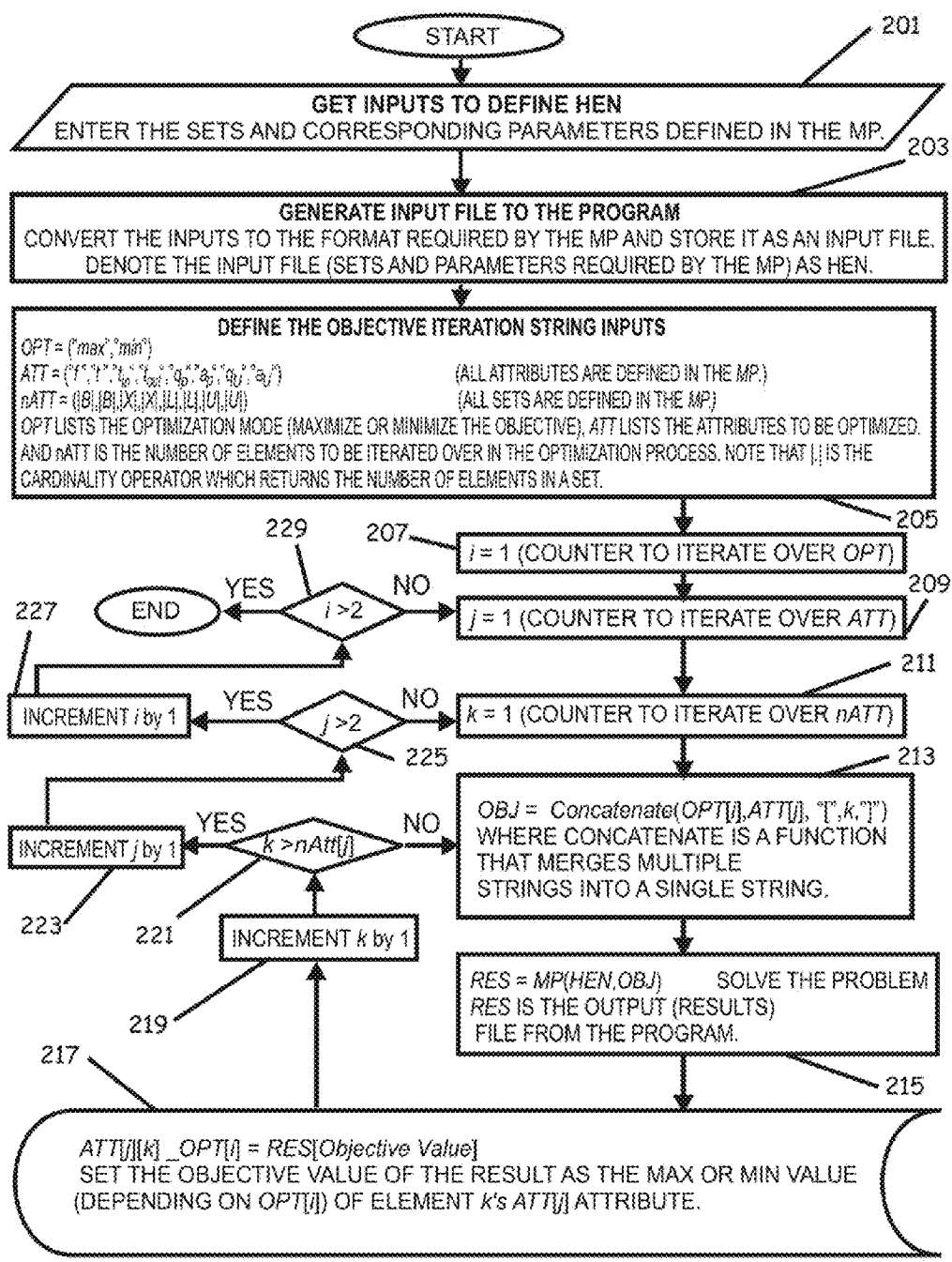
FIG. 21 is a schematic block diagram of a method of determining heat exchanger design details for each heat exchanger of a network according to an embodiment of the present invention.
Figure 22:
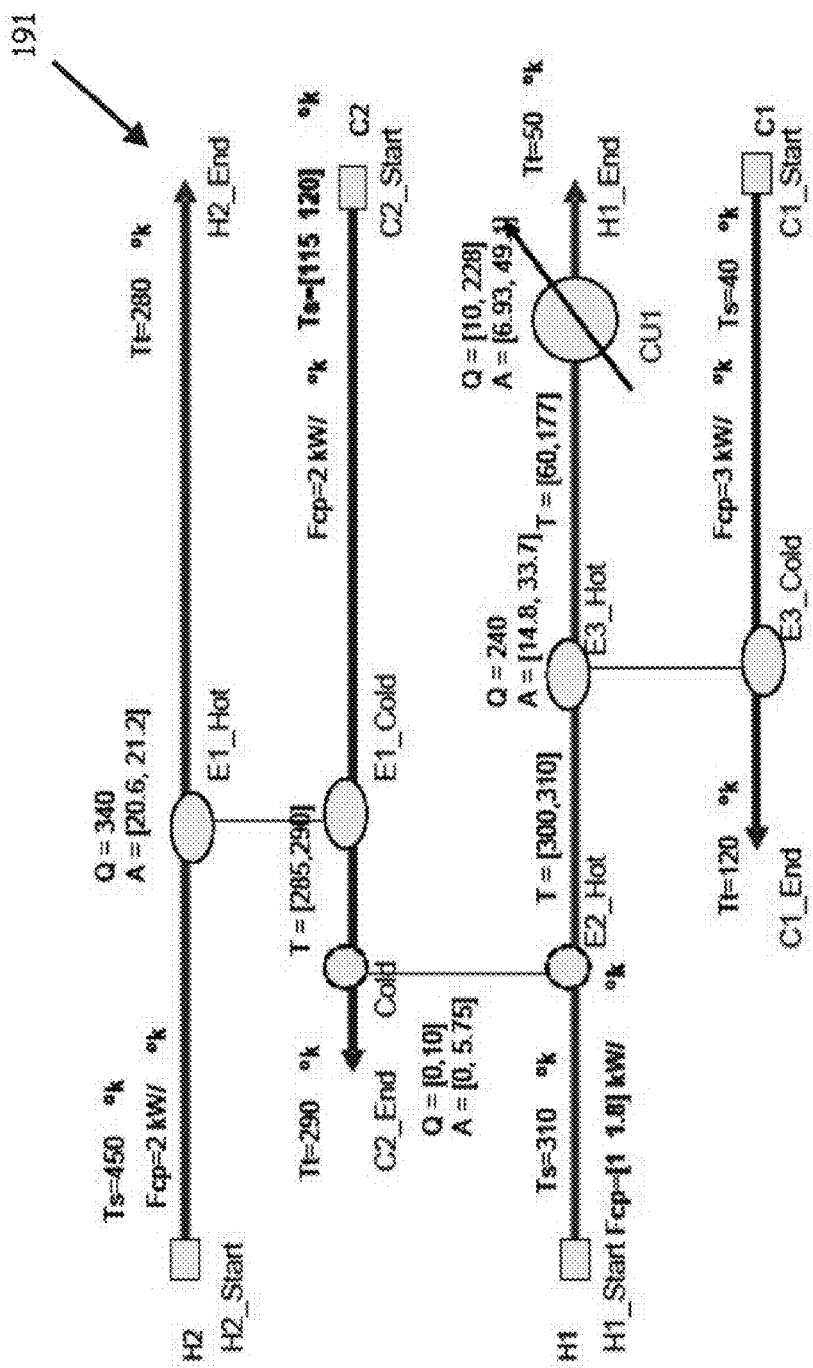
FIG. 22 is a schematic diagram of a physical structural configuration of a heat exchanger network synthesis implementation for an industrial process according to an embodiment of the present invention.

According to an embodiment of the present invention, the surface area that satisfies desired process variations possibility schemes can be the maximum one obtained through use of a heat exchanger-by-heat exchanger algebraically calculation to find the required maximum realizable area "A" using, for example, the overall heat transfer coefficient U and maximum realizable heat exchanger duty Q over log mean temperature difference ΔT_LMTD, using an algebraic formula such as, for example, that described below and illustrated in FIGS. 7A-12, and/or using a heat exchanger device optimization algorithm that repeatedly solves a mathematical program with variable objective illustrated in FIG. 21 and described in more detail later.

The algebraic formula according to the first of the two configurations identified above, is as follows:

$$\text{Max} A = \text{Max} Q/U^* \Delta T\_LMTD,$$

wherein:
$Q=FCp^*(Ts-Tt)=fcp^*(tt-ts)$,
$y1>=\Delta T\_min$,
$y2>=\Delta T\_min$,
$y1=Tt-ts$,
$y2=Ts-tt$,
$\Delta T\_LMTD=\{y1^*y2^*(y1+y2)/2\}^{**}0.333333$,
$[FCp]=[FCp\_I;FCp\_U]$,
$[fcp]=[fcp\_L;fcp\_U]$,
$[Ts]=[Ts\_L;Ts\_U]$,
$[Tt]=[Tt\_L;Tt\_U]$,
$[ts]=[ts\_L; ts\_U]$,
$[tt]=[tt\_L; tt\_U]$,
$Q<=Q\_U$,
$Q>=Q\_L$, and
$U=1.0$.

The following table provides additional abbreviations:

| | |
|---|---|
| FCp: | Heat capacity flow rate of a hot or cold stream |
| [FCp1h]: | Interval Heat capacity flow rate of hot stream # 1 |
| [FCp1c]: | Interval Heat capacity flow rate of cold stream #1 |
| MM Btu/h.° F.: | Million British thermal units per hour. Degree |
| Qc: | Cooling duty required |
| Qh: | Heating duty required |
| [Qc]: | Interval cooling duty required |
| [Qh]: | Interval heating duty required |
| kW: | Kilo watts |
| kW/°K: | Kilo watts per degree Kelvin |
| ΔT_min: | Minimum approach temperature |
| HEN: | Heat exchanger network |
| hi: | Stream heat transfer coefficient |
| U: | Overall heat transfer coefficient |
| A: | Heat exchanger surface area |
| h: | Hot stream |
| c: | Cold stream |
| T_LMTD: | Log mean temperature difference |
| U_l: | Lower bound of overall heat transfer coefficient |
| Q_U: | Upper bound of heat exchanger duty |
| Ts_l: | Lower bound of hot stream supply temperature |
| Ts_U: | Upper bound of hot stream supply temperature |
| Tt_l: | Lower bound of hot stream target temperature |
| Tt_U: | Upper bound of hot stream target temperature |
| ts_l: | Lower bound of cold stream supply temperature |
| ts_U: | Upper bound of cold stream supply temperature |
| tt_l: | Lower bound of cold stream target temperature |
| tt_U: | Upper bound of cold stream target temperature |
| Ts: | Stream supply temperature |
| [Ts]: | Interval stream supply temperature |
| Tt: | Stream target temperature |
| [Tt]: | Interval stream target temperature |
| [Q]: | Interval heat exchanger duty required |

Figure 7A:
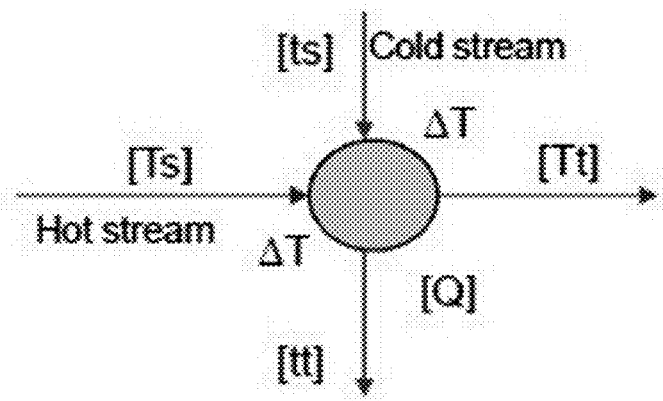
FIG. 7A is a schematic diagram of a single heat exchanger illustrating input and output connections and nomenclature.
Figure 7B:
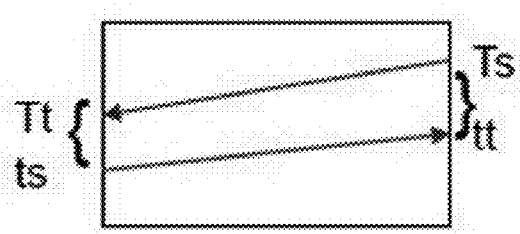
FIG. 7B is a graph illustrating a time-dependent temperature differential between cold and hot stream temperature for the heat exchanger shown in FIG. 7A.
Figure 8:
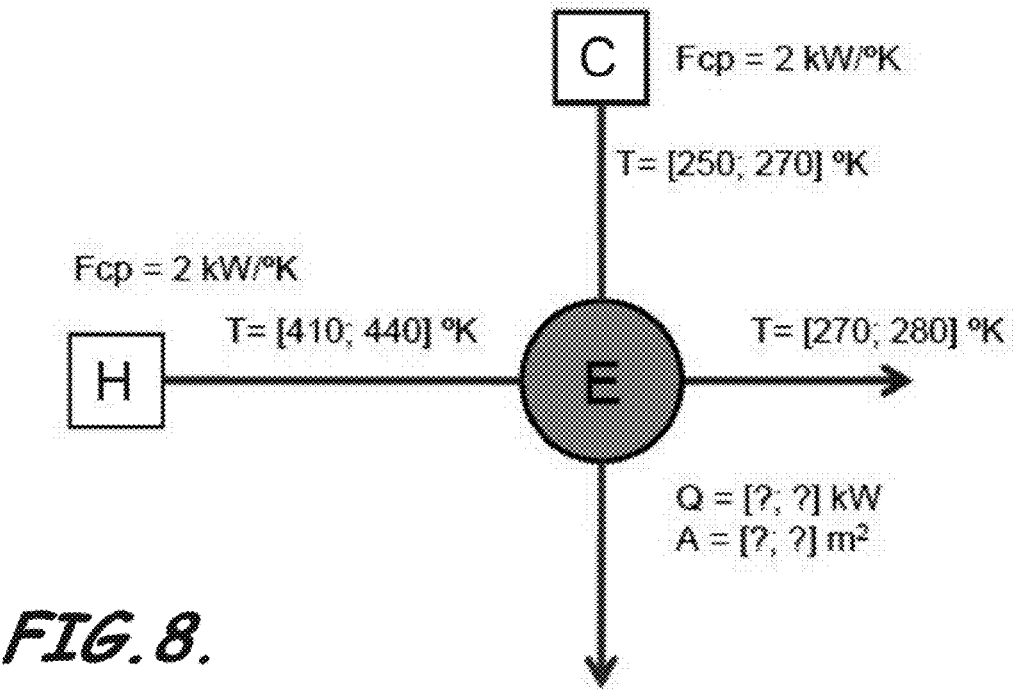
FIGS. 8-10 are schematic diagrams of a single heat exchanger graphically illustrating a process for determining a heat exchanger duty and surface area according to an embodiment of the present invention.
Figure 9:
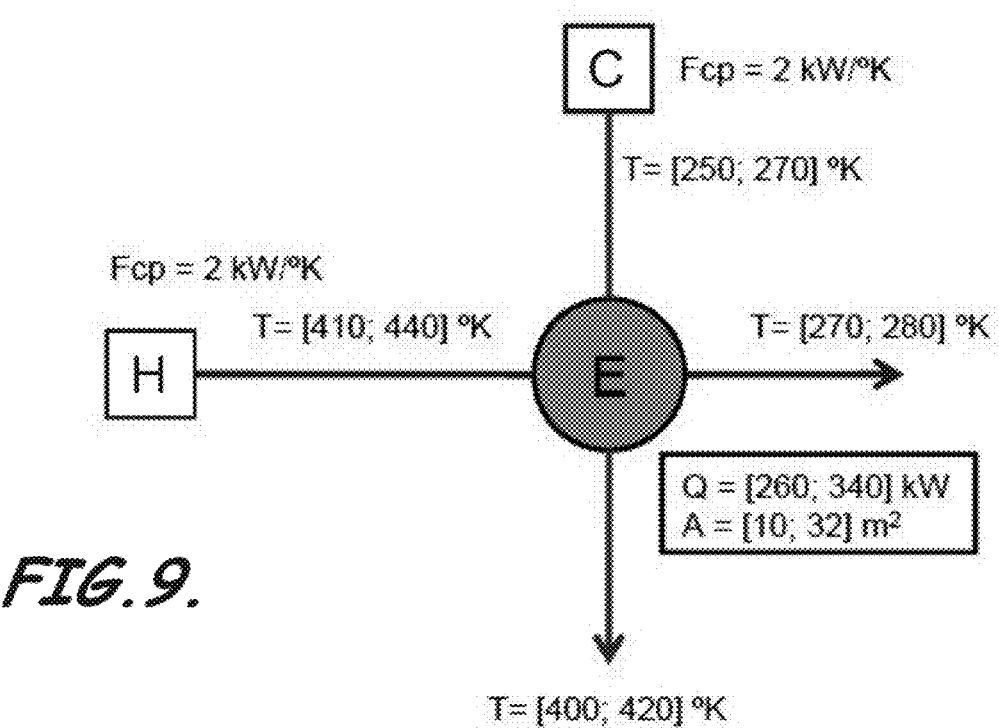
Figure 10:
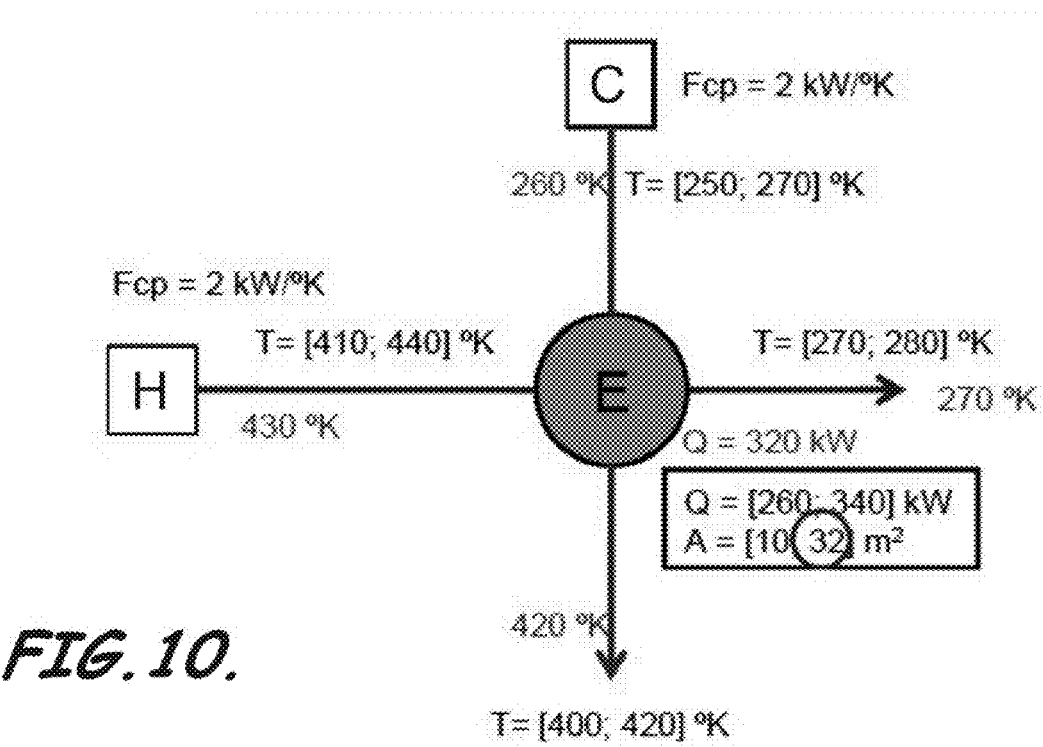

FIG. 7A illustrates a single heat exchanger having an interval hot stream supply temperature [Ts], an interval hot stream target temperature [Tt], an interval cold stream supply temperature [ts], an interval cold stream target temperature [tt], and an interval heat exchanger duty [Q] having a overall heat transfer coefficient U equal to 1.0. FIG. 7B illustrates a relative difference between stream temperatures. FIG. 8 provides a graphical representation of the single heat exchanger having input data used for an input file such as, for example, the file graphically illustrated in FIG. 11. According to an embodiment of the systems, methods, and program product 51, the associated steps/operations include receiving the input file, internally constructing a heat exchanger node shown in FIG. 8, determining the interval heat exchanger duty [Q] and the interval heat exchanger surface area [A] as is graphically displayed in FIG. 9, and selecting the maximum of the interval heat exchanger duty [Q] as is graphically displayed in FIG. 10, which in this example, renders a value of 32 m².

Figures 11, 12:
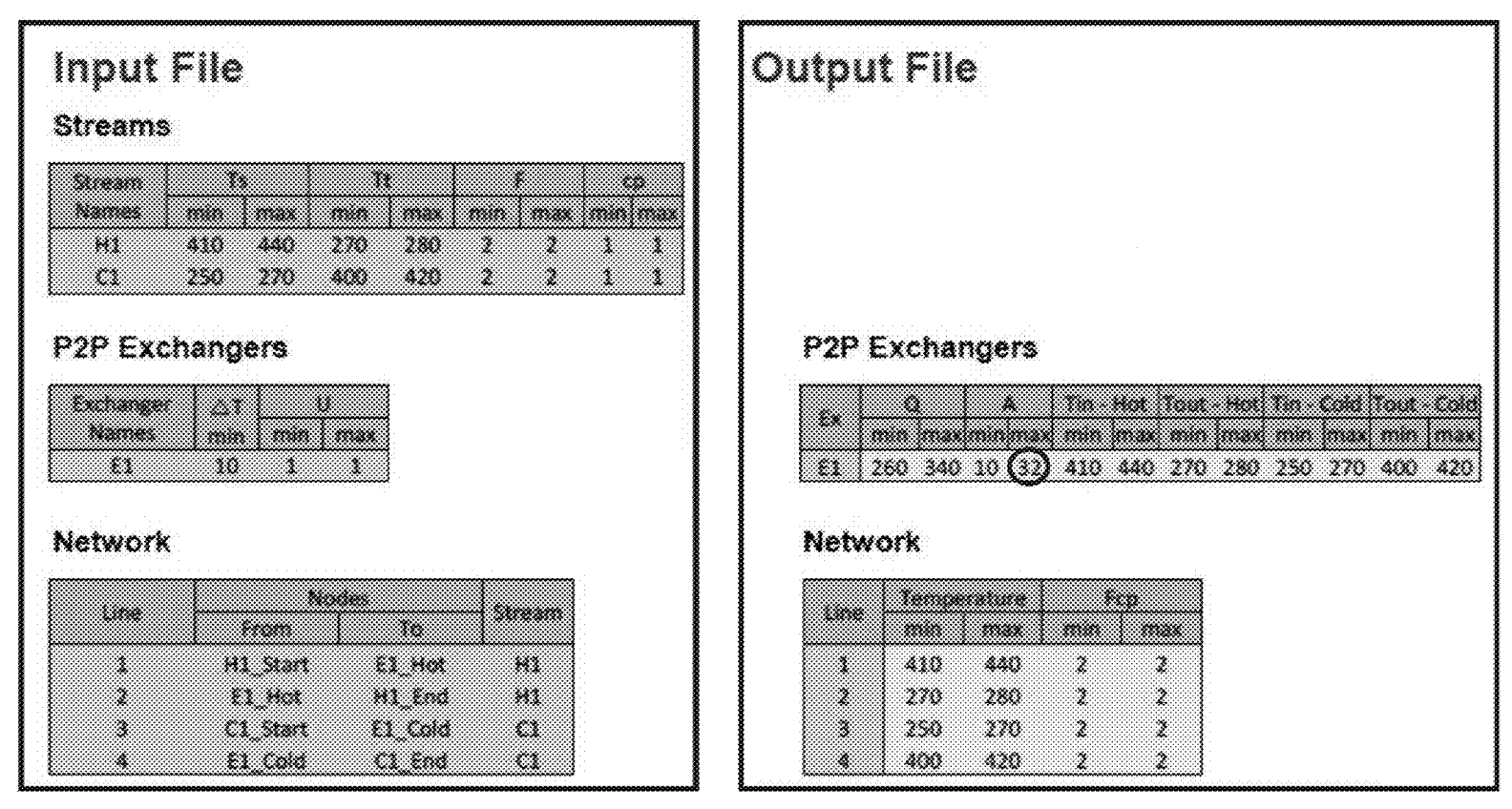

Finally, the steps/operations also include outputting an output file, such as, for example, the file graphically illustrated in FIG. 12.

Disturbance & Uncertainty Schemes Representation and Optimal Heat Exchanger Network Design and Flexibility Level An exemplary embodiment of the present invention provides for the development and analysis of possibility schemes for switchability and flexibility variations, adapting Nested Intervals representation techniques. A hot stream supply temperature (Th1) can, for example, have the possibility of being equal to [150, 160]° K 100% of the time, [145, 170]° K 98% of the time, [142, 175]° K 95% of the time, and [140, 180]° K 90% of the time in a nested interval form. According to an exemplary configuration, feasibility for switchability can be achieved with a minimum number of heat exchanger units and minimum energy consumption in a heat exchanger network design to satisfy process switchability needs for the given ranges of variations of 100% possibility of time. Note, a process stream having operational attribute values of "100% possibility of time" refers to the respective value being equal to a given range 100% of the time. The 100% possibility range on a variable is the range with highest possible confidence. In other words, the 100% possibility means that 100% the operating time of the plant, the plant will be in that range—[150, 160]° K in this illustrative example. In practice, the summer and winter conditions of a gas stream inlet temperature normally is rigorously known. Also, different crudes have known specific gravities, etc. Other ranges with less confidence, e.g., 98% of the operating time and so on represent an outer value range of the most assured one in the core, which sits or is otherwise nested within the 98% range. In Switchability applications, according to an embodiment of the present invention, it is preferred that one uses the 100% confidence range, for example, to design the heat exchanger network, e.g., without checking the operating and fixed cost of the network.

According to an exemplary configuration, feasibility for flexibility for 100% process variations possibility of the time, however, is not mandatory. In such flexibility applications, the representation again is in a nested form with percentage for each possibility range operating time of the plant, but the order of the process variation ranges is reversed as compared with that for switchability. That is, the widest range of the variable(s) interval represent the 100% flexibility such that if the heat exchanger network is going to be designed for this variation range for each variable, it will be 100% feasible at the worst case scenario with ultimate confidence that process changes will never become outside these intervals. With tighter (narrower) ranges on process variable(s), flexibility goes down as does the cost of both energy consumption and heat exchanger network capital cost, but the impact of streams target temperature not reaching the desired value(s) in case of wider range of disturbance affecting the downstream units in the plant such as reactors and distillation columns and so on, can have a substantial cost sufficient to warrant a search for optimal flexibility level according to various embodiments the present invention.

According to an embodiment of the present invention, the desired level of flexibility can be determined using a process performance formula/algorithm to analyze an economic trade-off between feasibility for flexibility for given ranges of variation through comparison of annualized fixed and operating costs for a given heat exchanger network design in view of a cost impact on process economics due to the lack of flexibility in one or more target temperature fluctuation for a specific "possibility" time. For example, each stream specific target temperature $Tt_i$ can be determined/analyzed for comparative purposes as a function of product yield, product quality, and production cost, i.e., f(product yield, product quality, production cost) where cost impact or profit ($) equals $a+bT_{ti}^n$.

Figure 13:
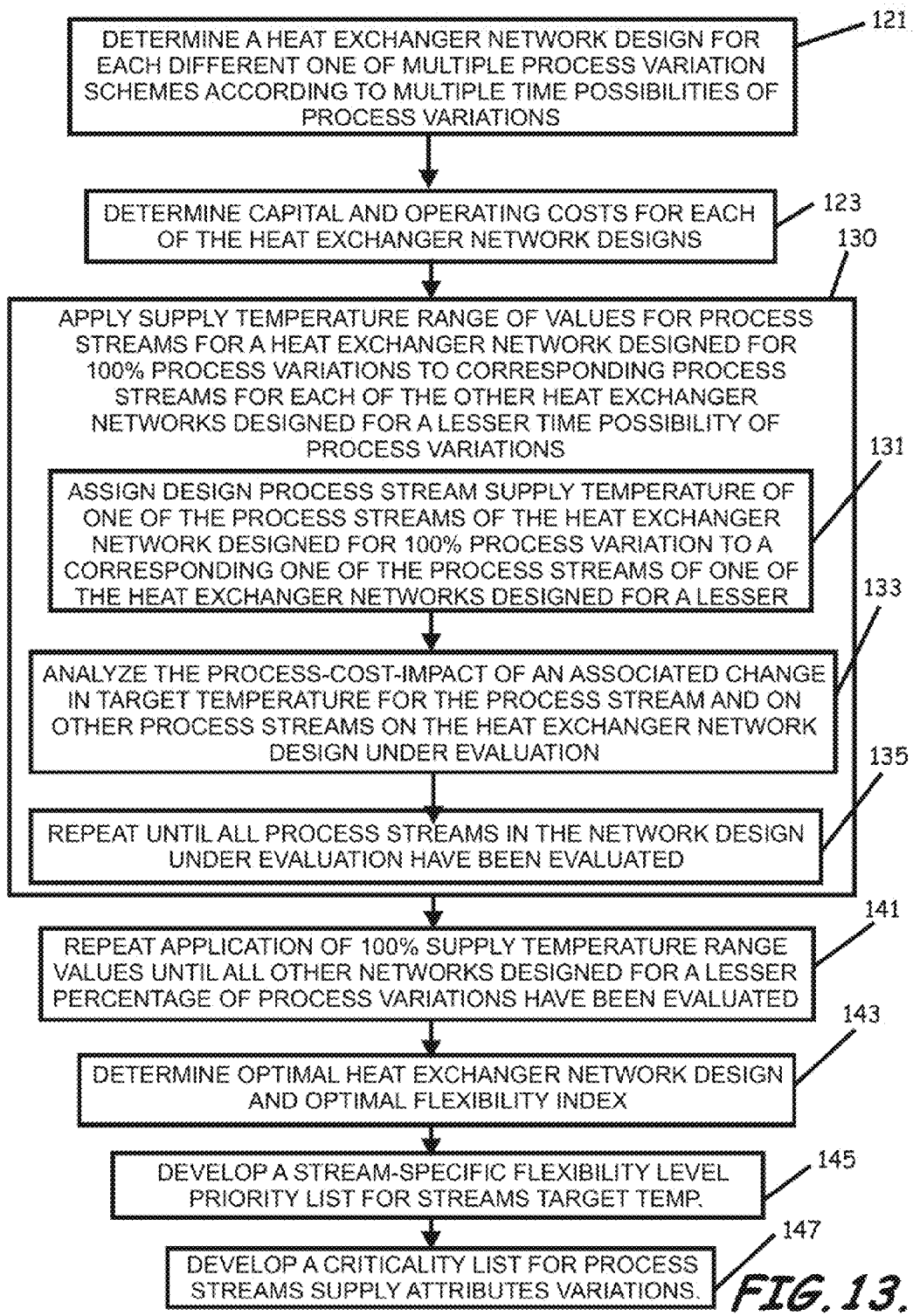
FIG. 13 is a block flow diagram illustrating a process for determining an optimal heat exchanger network design and flexibility index according to an embodiment of the present invention.

FIG. 13 illustrates a simple high-level flow diagram for determining an economic trade-off between heat exchanger network capital and energy cost and impact on process economics to select an optimal heat exchanger network design and for determining and using different levels of feasibility for given variations and their associated possibility times to find an optimal flexibility level, according to an exemplary embodiment of the present invention. The steps/operations can include determining a heat exchanger network design for each different one of multiple process variation schemes according to a corresponding multiple time possibilities/probabilities (block 121), and determining the capital and operating costs for each of the heat exchanger network designs (block 123). Beneficially, as described in more detail below, the operating costs can be used in analyzing a trade-off with the fixed costs of the heat exchanger network based, for example, upon a $\Delta Tmin^i$ set selection in evaluating the energy cost at each process variations schemes at different possibility levels as well as in calculating flexibility level upon considering the cost impact of different flexibility levels on other process units and its economics.

The heat exchanger network designs can be produced via energy modeling as described previously. Additionally, using, for example, the interval collapsing algorithm described in U.S. patent application Ser. No. 12/715,255, filed Mar. 1, 2010, titled "System, Method, and Program Product for Targeting and Optimal Driving Force Distribution in Energy Recovery Systems," the energy operating costs can be determined using the interval heating and cooling duties [Qh] and [Qc] for each of the heat exchanger network designs to calculate the average realizable maximum energy cost and average realizable minimum energy cost under each interval possibility scheme to obtain a best estimate for energy operating cost. Since each scenario can be assumed to have a possibility of 50%, Shanon's Maximum Entropy Concept, for example, can then be used to estimate energy operating cost through calculating the average of both maximum energy cost and minimum energy cost under each interval possibility distribution scheme.

The table below provides a summary of the energy operating cost estimation algorithm according to an example of an embodiment of the present invention:

| | |
|---|---|
| Step # 1: | Find the best case scenario energy cost via calculating the global minimum heating duty Qh and corresponding cooling duty Qc, and global minimum cooling duty Qc and corresponding heating duty Qh. |
| Step # 2: | Find the worst case scenario energy cost via calculating the global maximum heating duty Qh and corresponding cooling duty Qc, and global maximum cooling duty Qc and corresponding heating duty Qh. |

Step # 3: Employ Shanon's Maximum Entropy Concept to estimate energy operating cost through getting the average of both maximum energy cost and minimum energy cost under each interval possibility distribution scheme.

In order for a designed network to reach the desired hot stream target temperature Thi with 100% possibility of the time a cost-1 will need to be incurred, for 98% possibility of the time a cost-2 will need to be incurred, for 95% possibility of the time a cost-3 will need to be incurred, and for 90% possibility of time a cost-4 will need to be incurred, and so on. Accordingly, the steps/operations can also include applying at least one, but more typically each of the supply temperature and/or heat capacity flow rate range of values for each of the process streams for a heat exchanger network designed for 100% process variations, for example, one at a time, to corresponding process streams for each of the other heat networks designed having lesser time possibility of process variations (block 130) to determine a process-cost-impact of utilizing the different network designs. More particularly, the step/operation of applying supply temperature and/or heat capacity flow rate values can include assigning the design process stream supply temperatures and/or heat capacity flow rate of one of the process streams of network designed for 100% process variation to a corresponding process stream of one of the heat exchanger networks (under evaluation) designed for a lesser percentage (block 131), analyzing the process-cost-impact of an associated change in target temperature for the process stream and on other process streams on the network design under evaluation (block 133), and repeating the "applying" step until all process streams in the network design under evaluation have been evaluated (block 135). The steps/operations can further include repeating the step of applying the 100% supply temperature and/or heat capacity flow rate values until all other networks designed for a lesser percentage of process variations have been evaluated (block 141), and determining the optimal heat exchanger network design and system-level optimal flexibility index, as a result of such evaluations (block 143). The steps/operations can also include determining a flexibility priority list that can include different flexibility levels for each individual process stream target temperature (stream-specific flexibility level) (block 145), and a corresponding criticality list for process streams supply attributes variations, e.g., due to disturbances and/or uncertainty of each process streams supply temperatures (Ts) and/or heat capacity flow rates (FCp) (block 147).

As described above, for switchability, a 100% possibility is required. In other words, according to a preferred configuration, 100% feasibility is normally needed to accommodate different operating modes. For flexibility levels determination, however, the cost calculation at different possibilities of time can be used for the triple trade-off among energy cost, annualized heat exchanger network capital cost, and economic impact on the process.

For example, consider the below methodology to perform the flexibility level economic calculation that enables one to identify an optimal flexibility level for each stream target temperature of each corresponding stream of a process assumed to be something less than 100% in the face of a given small range of disturbances and uncertainties in input variables, using Thi target temperature. First, one can use the above described methods to design a feasible heat exchanger network for 90% process variation range and apply on it the 100% range of variation of the low disturbances/uncertainty kind to analyze that affect of flexibility on the heat exchanger network. Such test will result in a Thi target temperature equal to value "[X]"° F., for example, that is not exactly the range desired by the process. Using these sub-optimal values, one can determine the cost impact of such deviation/change in this target temperature (i.e., for a possibility of 10% of the time) on the economics of the rest of process units ("process-impact-cost").

Next, the heat exchanger network capital and energy operating costs designed for 100% process variations are compared with such process-cost-impact. Finally, in order to complete the analysis, the suboptimal target temperature range (Thi) can be used to determine the economic impact on both heat exchanger network capital and energy operating cost for each process stream target temperature, one-by-one stream, to allow for differentiating among heat exchanger network target temperatures priority by its economic impact on the rest of the process units.

Beneficially, such differentiation can result in creation of the stream-specific-flexibility-level concept. Further, beneficially, this approach facilitates the identification of the right (optimal) trade-off between the heat exchanger network capital and energy cost on the one hand and the impact on the rest of process economics due to lack of heat exchanger network flexibility (i.e. for 10% of the time) on the other hand. Still further, beneficially, depending upon the results of the comparison, this evaluation may show that 90% of flexibility in this target temperature may not have an economic impact on the process that justifies the potential extra cost of both heat exchanger network capital and energy needed to achieve 100% flexibility.

In summary, the exemplary embodiment of the present invention includes procedures to find optimal flexibility level for the whole system (i.e., same flexibility level across all process streams) and an optimal flexibility level for each target temperature through calculating its impact on process economics versus its impact on heat exchanger network capital and energy costs, and procedures to find optimal target temperatures ranges from streams data for a heat exchanger network working with different time possibilities according to the variations schemes available, for example, for possibility of 80%, 90%, 95% and 100% of time. The procedures provide the ability to then check, for example, the network designed for 90% possibility of the time disturbance scheme working under 100% variation and to find the corresponding target temperatures range of each target temperature Tt in the target temperature set TtI. If the difference in capital cost and operating cost of the two heat exchanger network designs (e.g., the one designed for 100% variation and the one designed for 90% variation) is higher than the impact of the target temperatures deviation on the process economics, then the heat exchanger network designed for 90% possibility time is the more optimal between the two designs and the associated variation scheme represents the optimal flexibility index of the heat exchanger network. The exemplary embodiment of the present invention also utilizes the above described process steps to form a stream-specific target temperature flexibility priority list and a corresponding supply attributes variations criticality list. The stream-specific target temperature flexibility priority list can include different stream-specific flexibility levels for each individual process stream target temperature obtained through application of each separate flexibility level to the same set of process streams. The supply attributes variations criticality list can include critical values for the process streams supply temperatures (Ts) and heat capacity flow rates (FCp) determined through an analysis of the effect of the deviation in target temperature range of variation for one or more of the process streams for a heat exchanger network design formed according to a first process variation scheme responsive to application of a supply attribute value range of variation (e.g., interval values for supply temperature and/or heat capacity flow rate) according to a different process variation scheme, to the corresponding supply attribute (e.g., supply temperature or the capacity flow rate) of the one or more process streams for the heat exchanger network design—e.g., through analysis of the outcome of replacing the attribute values of a process variation scheme used to design the heat exchanger network with attribute values of a process variation scheme having a different level of flexibility.

Optimal Target Temperatures Selection

Figure 14:
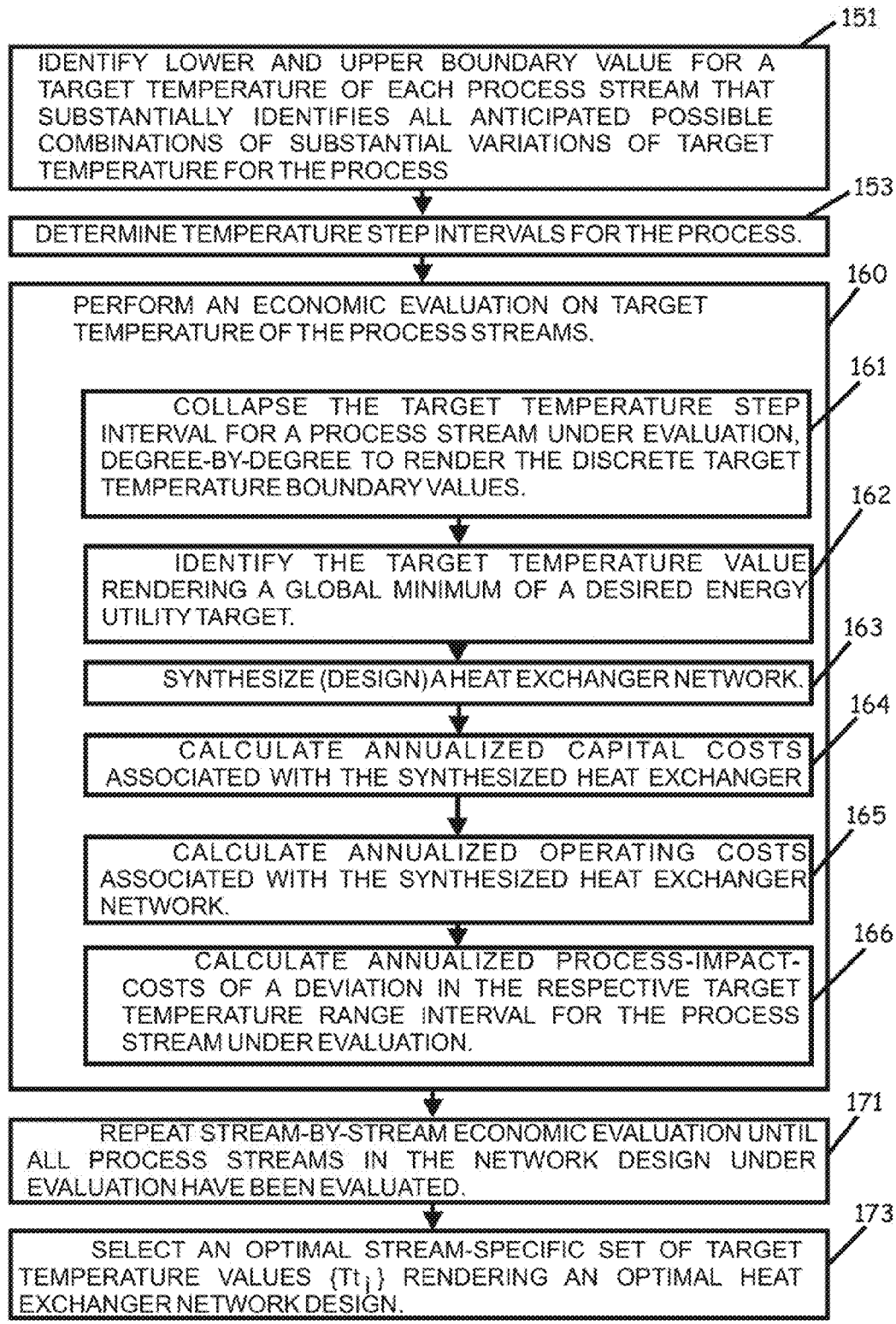
FIG. 14 is a block flow diagram illustrating a process for selecting a stream-specific set of target temperature values rendering an optimal heat exchanger network design according to an embodiment of the present invention.

Various embodiments of the present invention include processes/algorithms for selecting an optimal target temperature from a target temperature range under all possible combinations of variations in other variables during the design phase. FIG. 14, for example, provides a high-level flow diagram illustrating operations of the heat exchanger network synthesizing program product 51 and/or associated method steps according to an embodiment of the present invention, which provide a methodology for systematically determining optimal target temperatures under all given disturbance ranges in input conditions from an energy cost point of view from within a given range by utilizing an optimization process which, itself, can utilize the interval collapsing algorithm identified previously.

According to the exemplary implementation illustrated in FIG. 14, the operation/steps include first retrieving or otherwise receiving, identifying, or generating a lower and an upper boundary value for a target temperature defining a target temperature range interval for each separate one of a plurality of process streams that substantially identify all anticipated possible combinations of substantial variations of target temperature for the process (block 151). For simplicity, the decision maker can assign, for example, a range of ±5-10° F. when anticipated temperature variations are fairly well-known, ±10% when less well-known, or some other value which encompasses current and/or future uncertainty, around each target temperature for each process stream. The steps/operations can also include determining a plurality of temperature step intervals (block 153) as described, for example, in U.S. patent application Ser. No. 12/715,255, filed Mar. 1, 2010, titled "System, Method, and Program Product for Targeting and Optimal Driving Force Distribution in Energy Recovery Systems," whereby each temperature step interval includes an input interval indicating heat extracted collectively from the plurality of hot process streams, an output interval indicating heat collectively applied to the plurality of cold process streams, and an output interval indicating surplus heat available for a next of the plurality of temperature step intervals, which can be useful in determining the heating duty [Qh] and the cooling duty [Qc] for the process.

The steps/operations can also include performing an economic evaluation on target temperature of the process streams of the process (block 160) to include both hot process streams and cold process streams according to this exemplary embodiment of the method/program product. This step/operation can be performed, for example, by collapsing the target temperature step interval for the process streams under evaluation on its vertices to render the discrete target temperature boundary values, with the target temperature range interval for each other of the process streams remaining in interval form (block 161), and identifying the target temperature value rendering a global minimum of a desired energy utility target (block 162). Note, according to this exemplary configuration, if neither of the boundary temperature interval values provide the global minimum heating or global minimum cooling values calculated before collapsing the interval, as may be expected when the pinch point location changes, the process then further steps through the temperatures within the interval, degree-by-degree. In an alternative configuration, the process performs the degree-by-degree analysis without first analyzing or comparing the global minimum values obtained from the discrete temperature boundary values with those obtained prior to collapsing the respective interval.

The steps/operations can also include synthesizing a heat exchanger network "design" responsive to the identified target temperature value (block 163), calculating, e.g., annualized capital costs associated with the synthesized heat exchanger network (block 164), calculating, e.g., annualized operating costs associated with the synthesized heat exchanger network (block 165), and calculating, e.g., annualized process-impact-costs of a deviation in the respective target temperature range interval for the respective process stream under evaluation on process economics associated with the synthesized heat exchanger network for other portions of the process—e.g., costs resulting from the sub-optimal target temperature interval (block 166).

The steps/operations can also include repeating the step of performing an economic evaluation on target temperature for each other of the process streams (block 171), and selecting an optimal stream-specific set of target temperature values $\{Tt_i\}$ rendering an optimal heat exchanger network design responsive to the economic evaluation on target temperature for each of the process streams (block 173)—i.e., responsive to the impact of the deviation in target temperature range on process economics, energy consumption, and switchable and flexible heat exchanger network capital cost. In essence, the exemplary evaluation process beneficially allows for differentiating between target temperatures $Tt_i$ through their individual economic impact on the rest of the process units.

Grass-roots Design of Optimal Topology for Future Retrofit

Various embodiments of the present invention provide systems, program product, and methods of synthesizing an, e.g., grass-roots, heat exchanger network for an industrial process including multiple hot process streams to be cooled and multiple cold process streams to be heated, and various hot and/or cold utilities to supplement the waste heat recovery system, which satisfy the life cycle switchability and flexibility concepts of the synthesized heat exchanger network, described above, for both current and future conditions. That is, various embodiments of the present invention provide systems, methods, and program product for synthesizing heat exchanger networks designed to minimize energy consumption, structured to satisfy current needs: to accommodate future changes in energy costs under current disturbances and uncertainty schemes; and to accommodate future time-dependant new operating modes, disturbances, and uncertainty schemes.

The table below provides a high-level summary of a heat exchanger network synthesis algorithm according to an embodiment of the present invention, which produces heat exchanger network structures specifically configured for future retrofit under current disturbances and uncertainty schemes to accommodate future changes in energy costs under the current disturbances and uncertainty schemes:

| | |
|---|---|
| Step # 1: | Start heat exchanger network (HEN) synthesis using high minimum temperature approach value or set of values. |
| Step # 2: | Synthesize several HENs at sequentially lower minimum temperature approach values using a systematic method. |
| Step # 3: | Produce HENs that are all exhibiting the same structure/topology and differ only in load allocation on each heat exchanger (heat exchanger duty or heat transfer between streams) and the possibility of adding additional heat exchanger units and/or bypassing excess heat exchanger units, partially and/or completely. |
| Step # 4: | Select the network that satisfies current economic criteria and keep other designs for future retrofit upon the change in the trade-off between energy cost and capital cost that keep current network operability intact. |
| Step # 5: | Reserve in the plant layout sufficient free space for the specific heat exchangers that will require extra surface area in the future due to anticipated possible increased load. |

Figure 15:
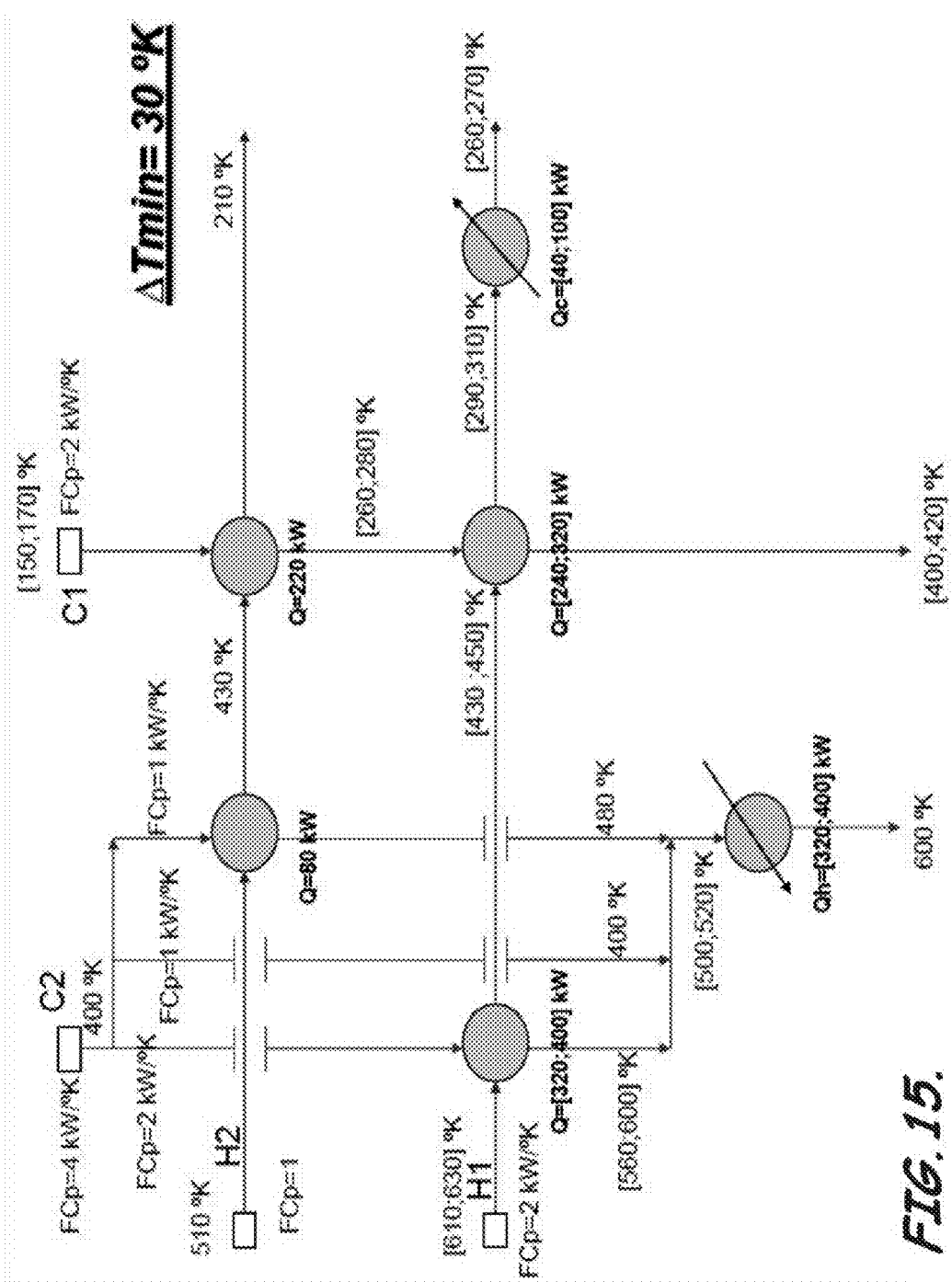
FIGS. 15-17 are schematic diagrams illustrating an application of successively lower minimum temperature approach values to the same industrial process to produce a series of heat exchanger networks each having a common process-to-process heat exchanger network structure according to an embodiment of the present invention.
Figure 16:
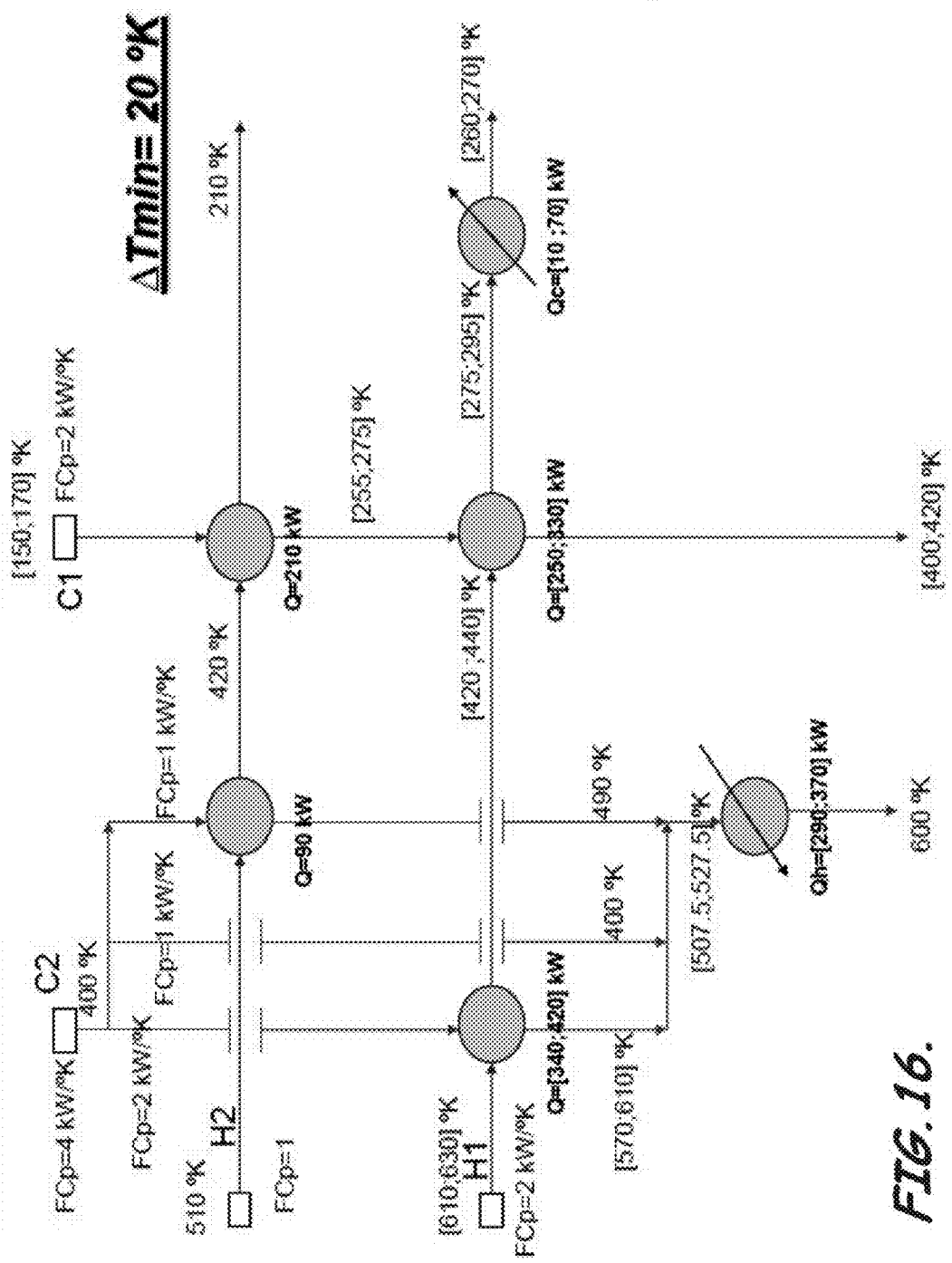
Figure 17:
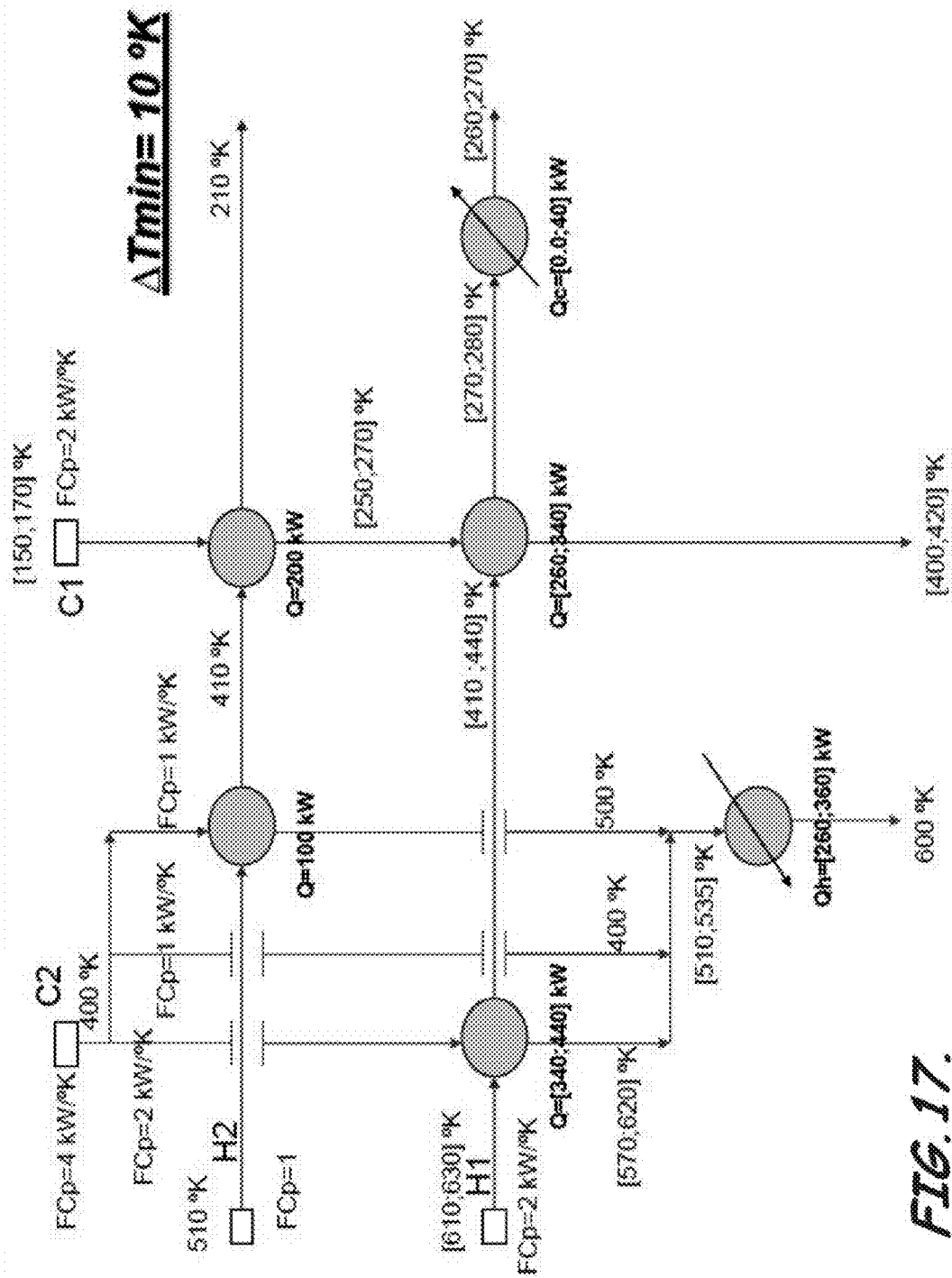

Steps 1-3: The steps of synthesizing a grassroots heat exchanger network for future retrofit, according to an example of an embodiment of the present invention, by synthesizing several grass-roots heat exchanger network designs at sequentially lower minimum temperature approach values $\Delta T_{min}^{i}$ beginning at a high ("maximum") minimum temperature approach value (or set of values) using a systematic method in accordance with steps 1-3, are shown, for example, in FIGS. 15-17. That is, the exemplary implementation shown in FIGS. 15-17 illustrates an example of a step-by-step synthesis of a grassroots-design-for-future-retrofit to include an illustration of how application of sets of successively different (e.g, lower) stream-specific minimum temperature approach values $\Delta T_{min}^{i}$ for each hot process stream, beginning, for example, at the highest minimum temperature approach values (e.g., 30° K in this example), followed by successively lower minimum temperature approach values (e.g., 20° K and 10° K in this example for simplicity), can yield a series of heat exchanger network configurations having common network structures, but with the possibility of having successively fewer numbers of heat exchanger units, which can readily be used to facilitate construction on a heat exchanger network that has a topology that is easily retrofittable based on possible future differing load requirements. Note, although the exemplary process configuration features beginning at a maximum temperature approach value or set of values, embodiments where a minimum temperature approach value or values are used to begin the analysis, or where intermediate values are used first, are within the scope of the present invention.

Beneficially, the results of steps 2 and 3 provide a continuum of user selectable heat exchanger network designs extending, for example, between (1) a heat exchanger network design having hot streams assigned a set of minimum temperature approach values $\{\Delta T_{min}^{i}\}$ established at a corresponding set of expected maximum values, generally resulting in a most heat exchanger populated heat exchanger network design due to the need for utilities (heaters and coolers), and (2) a heat exchanger network design having hot streams assigned a set of minimum temperature approach values $\{\Delta T_{min}^{i}\}$ established at a corresponding set of expected minimum values, generally resulting in a least heat exchanger populated heat exchanger network design due to a lesser requirement for utilities (heaters and/or coolers) but with heat exchanger units that generally require more surface area "A" and other capital investment. Further beneficially, the most heat exchanger populated heat exchanger network design can be used to identify the maximum amount of real estate needed for providing necessary hot and cold utilities streams and hot and cold utilities heat exchangers; and the least heat exchanger populated heat exchanger network design can be used to identify the maximum amount of real estate necessary for retrofitting or otherwise providing heat exchangers for delivering a maximum design required load or heat transfer requirement. Note, for a detailed discussion of implementation examples illustrating steps 2-3, see U.S. patent application Ser. No. 12/767,315, filed Apr. 26, 2010, titled "System, Method, and Program Product for Synthesizing Heat Exchanger Networks and Identifying Optimal Topology for Future Retrofit."

Step 4: Step 4 includes selection of a network from within the continuum of user selectable heat exchanger network designs that satisfies current economic criteria such as, for example, the trade-off between capital costs/investment and the current and forecast cost of heating or cooling utilities. The step can also include maintaining the heat exchanger network designs within the continuum that were not selected to provide the blueprint for a future retrofit upon the change in the trade-off between energy cost and capital cost.

Step 5: Step 5 applies to an initial build/development of the industrial process facility or a current retrofit. Specifically, step 5 includes reserving in the plant layout sufficient free space for the specific heat exchangers that will require extra surface area in the future due to anticipated possible increased load, for example, due to a sufficient increase in the cost of heating, cooling, or heating and cooling utilities, depending upon that utilized and/or required according to the current network design and according to that which would be required according to the higher-load, reduced-utility retrofit design. Optionally and/or alternatively, step 5 can also include reserving in the plant layout sufficient free space for the addition of additional utilities such as, for example, due to a sufficient decrease in the cost of heating, cooling, or heating and cooling utilities, in conjunction with a requirement to replace one or more heat exchanger units, such as, for example, due to damage or age, again, depending upon that utilized and/or required according to the current network design and according to that which would be required according to the lower-load, increased-utility retrofit design.

Various embodiments of the present invention provide systems, methods, and program product for synthesizing heat exchanger networks designed to accommodate future time-dependant new operating modes, disturbances, and uncertainty schemes (e.g., gas-oil-ratio percentage water cut, etc.). By way of example, the table below provides a high-level summary of a heat exchanger network synthesis algorithm according to an embodiment of the present invention, which produces heat exchanger network structures specifically configured for future retrofit under future time-dependant new operating modes, disturbances, and uncertainty schemes:

Step # 1: Start heat exchanger network (HEN) synthesis for an expected future high range of disturbances and uncertainty scheme.
Step # 2: Synthesize several HENs at sequentially lower ranges that match current and future short-term needs.
Step # 3: Produce HENs that are all exhibiting the same structure/topology and differ only in load allocation on each heat exchanger (heat exchanger duty or heat transfer between streams) and the possibility of adding additional heat exchanger units and/or bypassing excess heat exchanger units, partially and/or completely.
Step # 4: Select the network that satisfies current economic, switchability, and flexibility criteria and keep other designs for future retrofit that accommodate new switchability and flexibility needs without major modifications.
Step # 5: Reserve in the plant layout sufficient free space for the specific heat exchangers that will require extra surface area in the future due to anticipated possible new switchability and flexibility needs.

Figure 18:
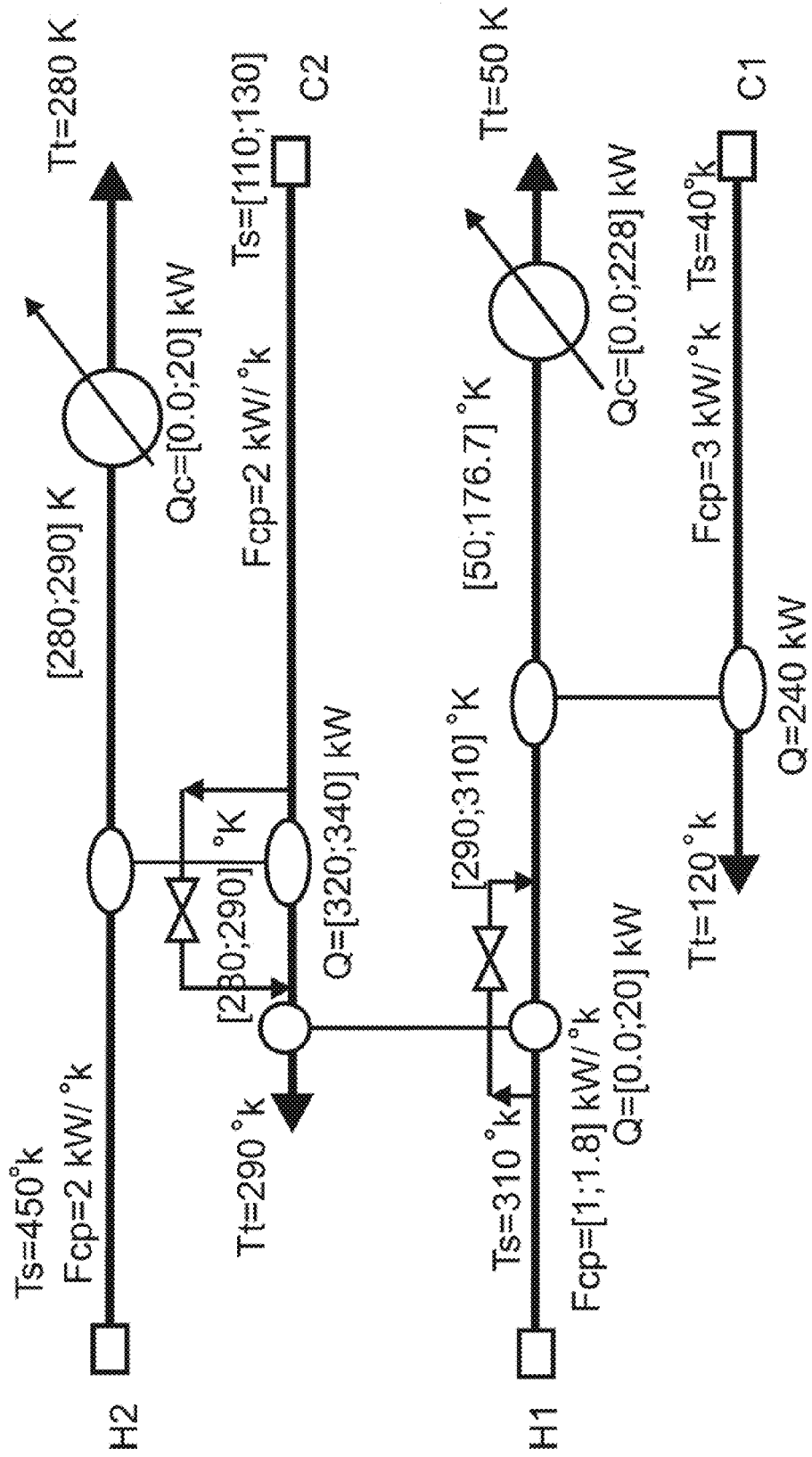
FIGS. 18-20 are schematic diagrams illustrating an application of successively lower supply temperature interval values to the same process streams of the same industrial process to produce a series of heat exchanger networks each having a common process-to-process heat exchanger network structure according to an embodiment of the present invention.
Figure 19:
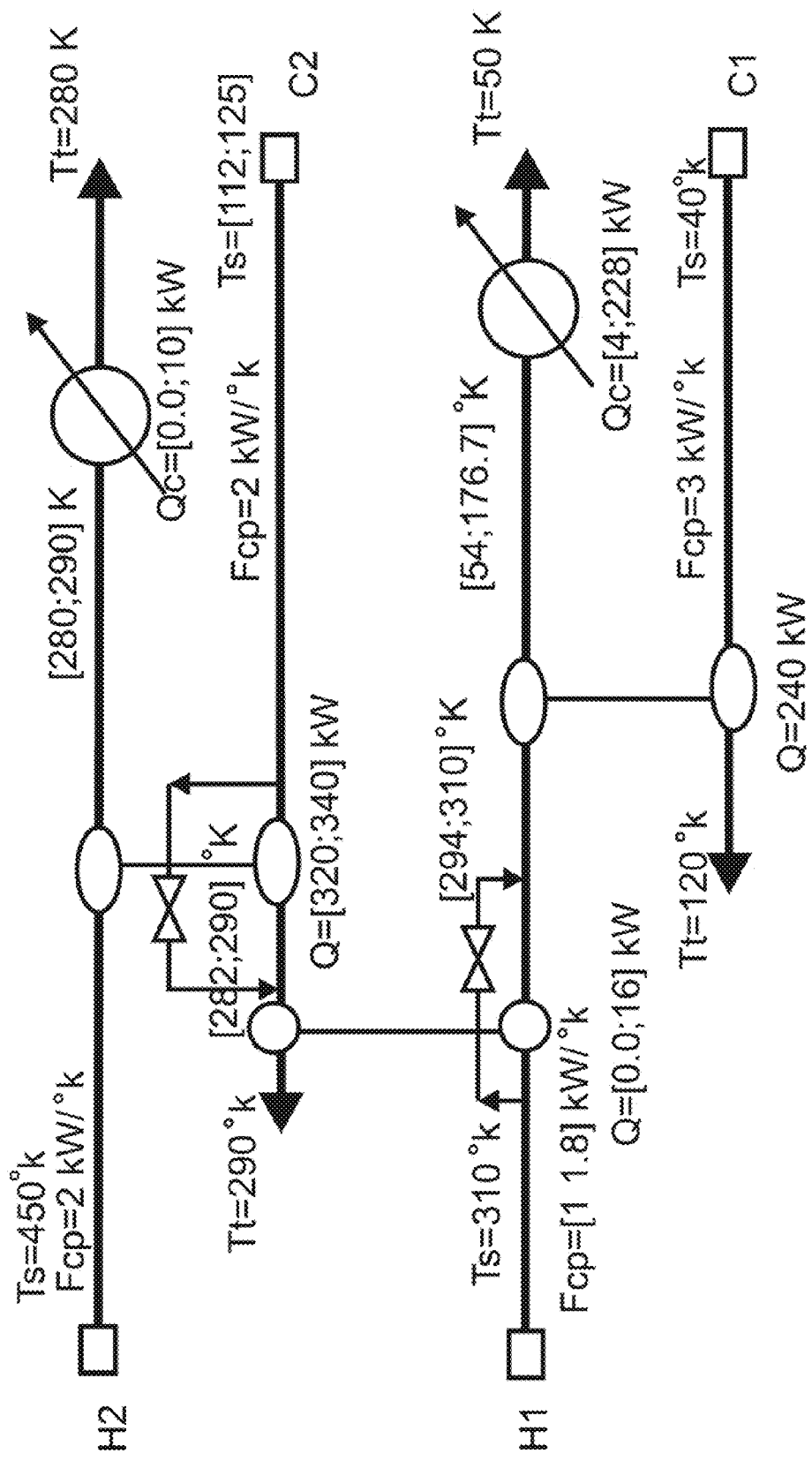
Figure 20:
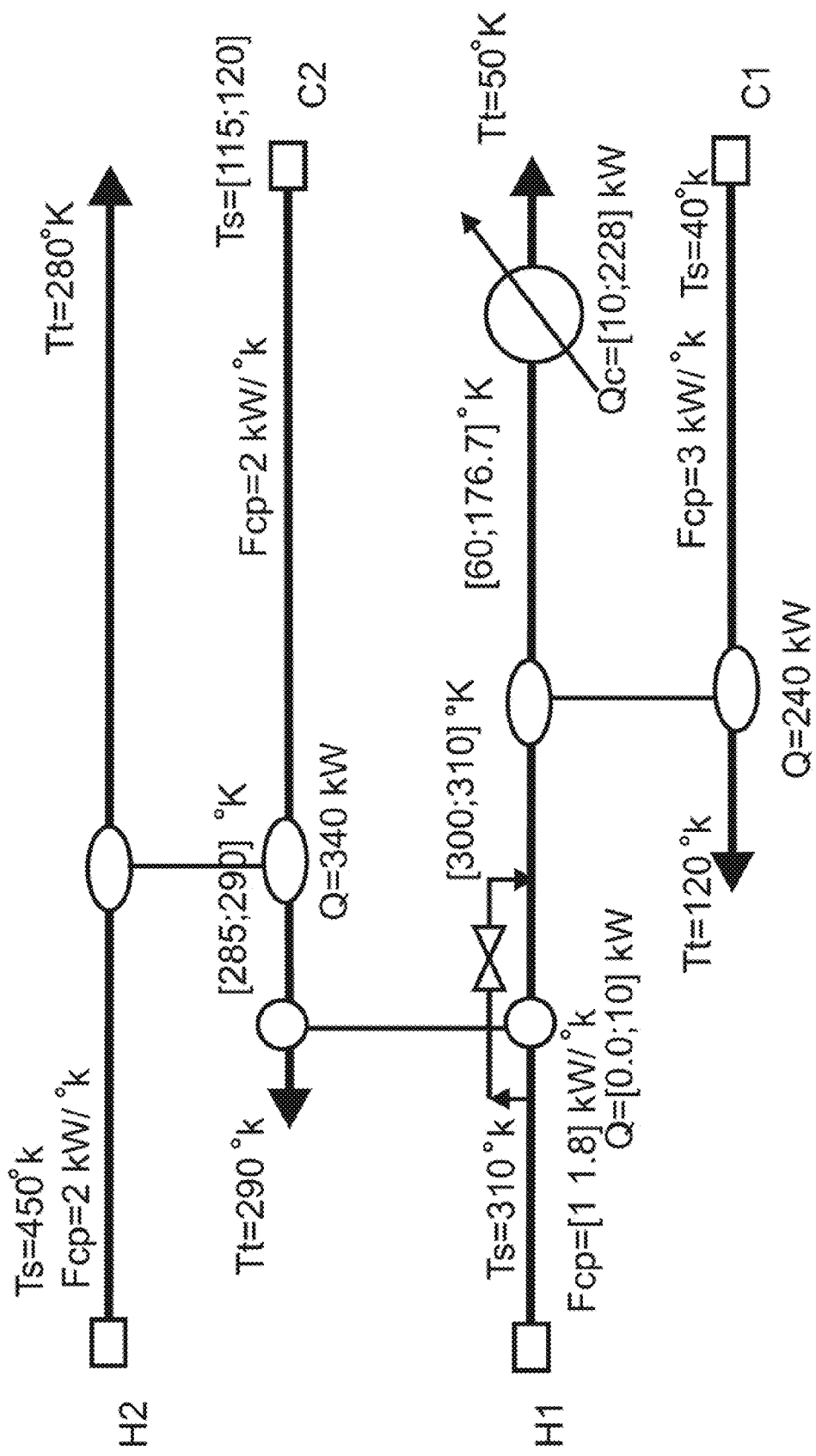

Steps 1-3: The steps of synthesizing a grassroots heat exchanger network for future retrofit, according to an example of an embodiment of the present invention, by synthesizing several grass-roots heat exchanger network designs at sequentially lower ranges of supply temperature values, heat capacity flow rate values, and/or target temperature values for the process streams of a process beginning with a process variation scheme at a high ("maximum") expected range of values (or set of values) using a systematic method in accordance with steps 1-3 are shown, for example, in FIGS. 18-20. That is, the exemplary implementation shown in FIGS. 18-20 illustrates an example of a step-by-step synthesis of a grassroots-design-for-future-retrofit to include an illustration of how application of sets of successively different supply temperature range values of certain process streams, beginning, for example, at the, e.g., highest (widest) range values followed by successively lower (narrower) range values, can yield a series of heat exchanger network configurations having common network structures, but with the possibility of having successively fewer numbers of heat exchanger units, which can be used to facilitate construction on a heat exchanger network that has a topology that is easily retrofittable based on possible future differing load requirements. Note, although the exemplary configuration features beginning at a maximum range of values or set of values, embodiments where a minimum range of values or values are used to begin the analysis, or where an intermediate range of values or sets of values are used to begin the analysis, are within the scope of the present invention.

Beneficially, the results of steps 2 and 3 provide a continuum of user selectable heat exchanger network designs extending, for example, between: (1) a heat exchanger network design having process streams assigned a set of supply temperatures and/or heat capacity flow rates established at a corresponding set of expected maximum range values, generally resulting in a most heat exchanger populated heat exchanger network design due to the need for utilities (heaters and coolers), and (2) a heat exchanger network design having hot streams assigned a set of supply and/or target temperatures established at a corresponding set of expected minimum range values, generally resulting in a least heat exchanger populated heat exchanger network design due to a lesser requirement for utilities (heaters and/or coolers) but with heat exchanger units that generally require more surface area and other capital investment. Further beneficially, the most heat exchanger populated heat exchanger network design (typically requiring less surface area per heat exchanger units) can be used to identify the maximum amount of real estate necessary for providing the additional necessary hot and cold utilities streams and hot and cold utilities heat exchangers. Correspondingly, the least heat exchanger populated heat exchanger network design can be used to identify the maximum amount of real estate (e.g., room accommodate increased heat exchanger surface area) necessary for retrofitting existing heat exchangers or providing replacement heat exchangers for delivering a maximum design required load or heat transfer requirement.

Step 4: Step 4 includes selection of a network from within the continuum of user selectable heat exchanger network designs that satisfies current economic and operability criteria such as, for example, the trade-off between capital costs/investment, the current and forecast cost of heating or cooling utilities, and the process-cost-impact of current disturbances and uncertainty. The step can also include maintaining the heat exchanger network designs within the continuum that were not selected to provide the blueprint for a future retrofit upon the change in the trade-off between energy cost and capital cost and new (future) operating modes, disturbances, and uncertainty schemes, which could be implemented without major modifications. Major modifications generally include topological modifications that are undoable due to lack of space, need an interruption of the plant operation and/or extremely expensive to implement. For example, major modifications can include moving a heat exchanger and/or associated components from one location to another to change the sequence of the units. Major modifications can also include the need of re-matching of streams and changing the service of a heat exchanger. Major modifications can further include the need to add multiple new heat exchanger units in a limited space, and/or adding a bypass where there is no space available for piping.

Step 5: Step 5 applies to an initial build/development of the industrial process facility or a current retrofit. Specifically, step 5 includes reserving (in the plant layout) sufficient free space for the specific heat exchangers that will require extra surface area in the future due to an anticipated possible increased load, for example, due to a sufficient increase in uncertainty and/or disturbances and/or new operating mode requirements, etc., depending upon that utilized and/or required according to the current network design and according to that which would be required according to the higher-load, reduced-utility retrofit design. Optionally and/or alternatively, step 5 can also include reserving (in the plant layout) sufficient free space for the addition of additional utilities such as, for example, due to a sufficient decrease in uncertainty and/or disturbances and/or reduced requirements of a new operating mode, in conjunction with or alternative to a requirement to replace one or more heat exchanger units, such as, for example, due to damage or age, again, depending upon that utilized and/or required according to the current network design and according to that which would be required according to the lower-load, increased-utility retrofit design.

Automated Generation of Detailed Design of Synthesized Heat Exchanger Network

Various embodiments of the present invention include an algorithm that repeatedly solves a mathematical program MP with variable objective to determine heat exchanger area and duty intervals and branch flow rate and temperature intervals. The mathematical program is denoted MP and is defined over the sets and parameters that define the HEN. The objective of the mathematical program includes a variable input denoted by OBJ, and it returns the following sets of variables that best meet the objective OBJ: (a) process-to-process heat exchanger duty, overall heat transfer coefficient, surface area, inlet temperature for the hot and cold sides, and the outlet temperature for the hot and cold sides; (b) utility heat exchanger surface areas, utility temperatures, overall heat transfer coefficient temperatures, and heating or cooling duties; and (c) network branch temperatures and flow rates.

FIG. 21 illustrates the steps/operations employed by a surface area determination algorithm, according to an embodiment of the present invention, employed as part of program product 51 or as a stand-alone module, as be understood by those of ordinary skill in the art. The steps/operations of such algorithm include, for example, retrieving or otherwise receiving input data defining the process stream, heat exchanger, and network connectivity attributes that define the structure of a heat exchanger network 191 (block 201) such as, for example, that shown in the FIG. 22, and generating an input file from the input data (block 203) such as, for example, that shown in FIG. 23. The input data can include process stream attributes including process stream names and their respective starting temperature ranges, target temperature ranges, flow rate ranges, and specific heat ranges; process-to-process heat exchanger attributes including the heat exchanger names and their respective minimum approach temperatures and overall heat transfer coefficient ranges; utility heat exchanger attributes including utility exchanger names and their respective type (heating or cooling utility exchanger), minimum approach temperatures, utility temperature ranges, overall heat transfer coefficient ranges, and heating or cooling duty temperature ranges; and network connectivity attributes specified by defining the branches in the network that connect the different elements of the network to include: (a) nodes comprising either a stream's starting terminal, a stream's ending terminal, the hot side of a process-to-process heat exchanger, the cold side of a process-to-process heat exchanger, or a utility exchanger; and (b) branches each defined by its stream, source node, and target node. Correspondingly, the input file can provide parameters in both discrete and interval form that define the network to be used by the mathematical program.

The steps/operations can also include defining inputs (string options) for an objective iterations string function used to generate an objective function OBJ (block 205). According to the exemplary configuration, the objective function string is composed of three inputs: (a) the optimization option OPT describing the two-optimization option (minimize or maximize); (b) the attribute ATT being optimized describing the eight attributes to be optimized, which correspond to branch flows and temperatures in the network, heat exchanger input and output temperatures, process-to-process heat exchanger duties and areas, and utility heat exchanger duties and areas; and (c) the heat exchanger network element index nATT that the attribute is defined over describing the number of elements for each attribute which is used to select the heat exchanger network element index.

The steps/operations can also include assigning the variable i as in index to iterate over OPT and initializing it to 1 (block 207), assigning the variable j as in index to iterate over ATT and initializing it to 1 (block 209), assigning the variable k as in index to iterate over nATT and initializing it to 1 (block 211), determining the objective string OBJ by concatenating OPT, ATT, and k into a single string using the following formula: OBJ=Concatenate(OPT[i],ATT[j],"[",k,"]") (block 213), and solving the mathematical program MP using the HEN input file and the OBJ objective and storing the result in the RES file (block 215). Note, this step is denoted by RES=MP(HBN,OBJ) in FIG. 21.

The steps/operations can also include storing the objective value of the problem as a bound to the variable in the objective (block 217). Note, if OPT[i] is "max," then the objective is an upper bound. Otherwise, it is a lower bound. The variable is the attribute ATT[j] of the HEN element k. This step is denoted by ATT[j][k]_OPT[i]=RES[ObjectiveValue] in FIG. 21. The steps/operations can also include incrementing the counter k by 1 after storing the objective value (block 219), and determining if k is no greater than the number of elements that has the attribute ATT[j] (i.e. if k<nATT[j]) (block 221). If so, the process returns to block 213, otherwise the process continues by incrementing the counter j by 1 (block 223) and determining whether each of the eight attributes have been returned by the mathematical program (block 225). If j is no greater than the number of attributes being considered, which is 8, (i.e. if j≦8) then the process returns to block 211, otherwise the process continues by incrementing the counter i by 1 (block 227) and determining if both optimization objective options have been addressed (block 229). If i is no greater than the number of optimization objective options being considered, which is 2, (i.e. if i≦2) then the process returns to block 209, otherwise the program terminates the process.

Mathematical Program (MP) Formulation

According to an exemplary embodiment of the present invention, the mathematical program (MP) takes two types of inputs: the sets and parameters that define the heat exchanger network, shown below, and the objective function OBJ. The problem then returns the objective function's value and the variables defined below (e.g., the temperatures, flows, duties, and surface areas of different components in the HEN) that best satisfy the objective function. The sets and parameters that define the HEN are passed to MP via the input file denoted as "HEN" (see, e.g., FIG. 23) and the output is stored in the file denoted as "RES." As such, MP is defined over the file HEN and the string OBJ, and program returns the file RES (i.e. RES←MP(HEN, OBJ)).

Sets:

---

S: Set of streams in the network, which includes hot and cold streams.
N: Nodes in the network, including heat exchanger nodes, sources, and sinks.
R: Source nodes (or terminal nodes), which are the starting points of a stream: R ∈ N.
RS: Set of pairs of streams and their corresponding source nodes: $R_S$ ∈ S × R.
K: Sink nodes, which are the ending point of a stream: K ∈ N.

-continued

| | |
|---|---|
| KS: | Set of pairs of streams and their corresponding sink (terminal) nodes: $K_S \in S \times K$. |
| X: | Heat exchanger nodes, including process-to-process and utility exchangers. |
| P: | Process-to-process exchangers: $P \in X$. A process-to-process exchanger is modeled by two nodes, one for the hot side and another for the cold side. |
| PH: | The hot nodes of the process-to-process exchangers used to model the hot side of the exchanger: $P_H \in P$. |
| PC: | The cold nodes of the process-to-process exchangers used to model the cold side of the exchanger: $P_C \in P$. |
| L: | Set of pairs of linked nodes to link the hot and cold sides of the process-to-process exchangers: $L \in P_H \times P_C$. |
| U: | The utility nodes, which include hot utilities and cold utilities: $U \in X$. |
| UH: | The hot utility nodes used to heat cold streams: $U_H \in U$. |
| UC: | The cold utility nodes used to cool hot streams: $U_C \in U$. |
| B: | The set of triples to represent branches in the HEN cold nodes of the process-to-process exchangers, used to model the cold side of the exchanger: $B \in S \times N \times N$. The first entry represents the stream, the second represents the starting node of the branch, and the third represents the terminal node of the branch. |

Parameters:

Streams:

| | |
|---|---|
| $t_s^{min}[i \in S]$: | The lower limit of a stream's starting temperature. |
| $t_s^{max}[i \in S]$: | The upper limit of a stream's starting temperature. |
| $t_t^{min}[i \in S]$: | The lower limit of a stream's target temperature. |
| $t_t^{max}[i \in S]$: | The upper limit of a stream's target temperature. |
| $cp_S^{min}[i \in S]$: | The lower limit of a stream's specific heat. |
| $cp_S^{max}[i \in S]$: | The upper limit of a stream's specific heat. |
| $f_S^{min}[i \in S]$: | The lower limit of a stream's mass flow. |
| $f_S^{max}[i \in S]$: | The upper limit of a stream's mass flow. |

Process-to-process exchangers:

| | |
|---|---|
| $\Delta t_{min}^P[(i,j) \in L]$: | The minimum approach temperature difference of a process-to-process heat exchanger. |
| $u_P^{min}[(i,j) \in L]$: | The lower limit of the overall heat transfer coefficient of a process-to-process heat exchanger. |
| $u_P^{max}[(i,j) \in L]$: | The upper limit of the overall heat transfer coefficient of a process-to-process heat exchanger. |

Utility exchangers:

| | |
|---|---|
| $t_U^{min}[i \in U]$: | The lower limit of a utility's temperature. |
| $t_U^{max}[i \in U]$: | The upper limit of a utility's temperature. |
| $\Delta t_{min}^U[i \in U]$: | The minimum approach temperature difference of a utility heat exchanger. |
| $u_U^{min}[i \in U]$: | The lower limit of the overall heat transfer coefficient of a utility heat exchanger. |
| $u_U^{max}[i \in U]$: | The upper limit of the overall heat transfer coefficient of a utility heat exchanger. |

-continued

| | |
|---|---|
| $q_U^{min}[i \in U]$: | The lower limit of the overall heat duty transferred through a utility exchanger. |
| $q_U^{max}[i \in U]$: | The upper limit of the overall heat duty transferred through a utility exchanger. |

Variables:

Streams:

| | |
|---|---|
| $t_s[i \in S]$: | Stream's starting temperature. |
| $t_t[i \in S]$: | Stream's target temperature. |
| $cp_S[i \in S]$: | Stream's specific heat. |
| $f_S[i \in S]$: | Stream's mass flow. |

Branches:

| | |
|---|---|
| $f[(i,j,k) \in B]$: | Branch's mass flow rate. |
| $cp[(i,j,k) \in B]$: | Branch's specific heat. |
| $fcp[(i,j,k) \in B]$: | Branch's heat capacity flow rate. |
| $t[(i,j,k) \in B]$: | Temperature of fluid in a branch of the network. |

Heat exchangers:

| | |
|---|---|
| $f_X[i \in X]$: | Total mass flow into/out of an exchanger. |
| $fcp_X[i \in X]$: | Total heat capacity flow rate through one side of an exchanger. |
| $t_{in}[i \in X]$: | Temperature of fluid entering an exchanger. |
| $t_{out}[i \in X]$: | Temperature of fluid leaving an exchanger. |

Process-to-process exchangers:

| | |
|---|---|
| $\Delta t_P^1[(i,j) \in L]$: | The temperature difference between the entering hot fluid and the leaving cold fluid in a process-to-process exchanger. |
| $\Delta t_P^2[(i,j) \in L]$: | The temperature difference between the leaving hot fluid and the entering cold fluid in a process-to-process exchanger. |
| $u_P[(i,j) \in L]$: | The overall heat transfer coefficient of a process-to-process heat exchanger. |
| $\Delta t_{LMTD}^P[(i,j) \in L]$: | The log mean temperature difference of a process-to-process exchanger. |
| $q_P[(i,j) \in L]$: | The overall heat duty transfer through a process-to-process exchanger. |
| $a_P[(i,j) \in L]$: | The surface area of a process-to-process heat exchanger. |

Utility exchangers:

| | |
|---|---|
| $t_U[i \in U]$: | Utility's temperature. |
| $\Delta t_U^1[i \in U]$: | The temperature difference between the entering hot fluid and the leaving cold fluid in a utility exchanger. |
| $\Delta t_U^2[i \in U]$: | The temperature difference between the leaving hot fluid and the entering cold fluid in a utility exchanger. |
| $\Delta t_{LMTD}^U[(i,j) \in L]$: | The log mean temperature difference of a utility exchanger. |
| $u_U[i \in U]$: | The overall heat transfer coefficient of a utility heat exchanger. |
| $q_U[i \in U]$: | The overall heat duty transfer through a utility exchanger. |
| $a_U[i \in U]$: | The surface area of a utility heat exchanger. |

Constraints:
Streams:
Stream temperature, specific heat, and flow limits are as follows:

$$t_s^{min}[i] \leq t_s[i] \leq t_s^{max}[i] \forall i \in S,$$

$$t_s^{min}[i] \leq t_t[i] \leq t_t^{max}[i] \forall i \in S,$$

$$cp_s^{min}[i] \leq cp_s[i] \leq cp_s^{max}[i] \forall i \in S,$$

$$f_s^{min}[i] \leq f_s[i] \leq f_s^{max}[i] \forall i \in S.$$

Total material flow in the branches out of a source of a stream is equivalent to the stream's mass flow, as follows:

$$f_s[i] = \sum_{(i,j,k) \in B: (i,j) \in R_S} f[i,j,k] \ \forall \ i \in S.$$

Note, this constraint need not be specified for the sink because the material balance of the network guarantees this condition.

The temperatures of fluid in branches leaving a source of a stream are equivalent to the stream's temperature, as follows:

$$t[i,j,k] = t_S[i] \forall (i,j,k) \in B: (i,j) \in R_S.$$

The temperature resulting from the mix of fluids in branches going into a sink equals the sink's stream's target temperature, as follows:

$$t_t[i] \cdot f_S[i] = \sum_{(i,j,k) \in B: (t,k) \in K_S} t[i,j,k] \cdot f[i,j,k] \ \forall \ i \in S.$$

Branches:
Specific heat of branches equals that of their corresponding streams as follows:

$$cp[i,j,k] = cp_S[t] \forall (i,j,k) \in B.$$

Heat capacity flow rate of branches equals the product of their mass flow rate and their specific heat as follows:

$$fcp[i,j,k] = f[i,j,k] \cdot cp[i,j,k] \forall (t,j,k) \in B.$$

All heat exchangers:
The temperature resulting from the mix of fluids in branches going into a heat exchanger equals the exchanger's entering temperature as follows:

$$t_{in}[k] \cdot f_X[k] = \sum_{(i,j,k) \in B} t[i,j,k] \cdot f[i,j,k] \ \forall \ k \in X.$$

The temperatures of fluid in branches leaving a heat exchanger are equivalent to the exchanger's leaving temperature as follows:

$$t[i,j,k] = t_{out}[j] \forall (i,j,k) \in B: j \in X.$$

Material balance: The heat capacity flow rate through an exchanger is equivalent to the total heat capacity flow rates of the entering branches, and the total heat capacity flow rates of the leaving branches, as follows:

$$fcp_x[k] = \sum_{(i,j,k) \in B} fcp[i,j,k] \ \forall \ k: (i,j,k) \in B,$$

$$fcp_x[j] = \sum_{(i,j,k) \in B} fcp[i,j,k] \ \forall \ j \in X: (i,j,k) \in B.$$

Process-to-process exchangers:
Calculation of the two approach temperatures of an exchanger, where the first is the difference between the entering hot stream's temperature and the leaving cold stream's temperature, and the second is the difference between the leaving hot stream's temperature and the entering cold stream's temperature, is as follows:

$$\Delta t_P^1[i,j] = t_{in}[i] - t_{out}[j] \forall (i,j) \in L,$$

$$\Delta t_P^2[i,j] = t_{out}[i] - t_{in}[j] \forall (i,j) \in L.$$

The two approach temperatures are no less than the minimum approach temperature of the exchanger, as follows:

$$\Delta t_P^1[i,j] \geq \Delta t_{min}^P[i,j] \forall (i,j) \in L,$$

$$\Delta t_P^2[i,j] \geq \Delta t_{min}^P[i,j] \forall (i,j) \in L.$$

Heat transferred in an exchanger equals the heat lost from the hot side of the exchanger, as follows:

$$q_P[i,j] = (t_{in}[i] - t_{out}[i]) \cdot fcp_X[t] \forall (i,j) \in L.$$

Heat transferred in an exchanger equals the heat gained in the cold side of the exchanger, as follows:

$$q_P[i,j] = (t_{out}[j] - t_{in}[j]) \cdot fcp_X[j] \forall (i,j) \in L.$$

The calculation of the log mean temperature difference of a process-to-process heat exchanger should be as follows for enhanced accuracy:

$$\Delta t_{LMTD}^P[(i,j)] = \frac{\Delta t_P^1[i,j] - \Delta t_P^2[i,j]}{\ln\left(\frac{\Delta t_P^1[i,j]}{\Delta t_P^2[i,j]}\right)} \ \forall \ (i,j) \in L.$$

Due to the computational expense of solving problems with the logarithmic function, however, according to the exemplary configuration, the calculation is performed utilizing the Chen's approximation, which is:

$$\Delta t^P_{LMTD}[(i,j)] = \Delta t^1_P[i,j] \cdot \Delta t^2_P[i,j] \cdot \sqrt[3]{\frac{\Delta t^1_P[i,j] + \Delta t^2_P[i,j]}{2}} \quad \forall (i,j) \in L.$$

Heat transfer of process-to-process exchangers as a function of heat exchanger area, is as follows:

$$q_P[i,j] = u_P[i,j] \cdot a_P[i,j] \cdot \Delta t^P_{LMTD}[(i,j)] \forall (i,j) \in L$$

The overall heat transfer coefficient limits are as follows:

$$u_P^{min}[i,j] \leq u_P[i,j] \leq u_P^{max}[i,j] \forall (i,j) \in L$$

All utility heat exchangers:
Chen's approximation of the log mean temperature difference for utility exchangers is as follows:

$$\Delta t^U_{LMTD}[i] = \Delta t^1_U[i] \cdot \Delta t^2_U[i] \cdot \sqrt[3]{\frac{\Delta t^1_U[i] + \Delta t^2_U[i]}{2}} \quad \forall i \in U.$$

Limits for the overall heat transfer coefficient, the overall heat duty transfer, and the utilities temperature, are as follows:

$$u_U^{min}[i] \leq u_U[i] \leq u_U^{max}[i] \forall i \in U,$$

$$q_U^{min}[i] \leq q_U[i] \leq q_U^{max}[i] \forall i \in U,$$

$$t_U^{min}[i] \leq t_U[i] \leq t_U^{max}[i] \forall i \in U.$$

The two approach temperatures are no less than the minimum approach temperature of the exchanger, as follows:

$$\Delta t_p^2[i] \geq \Delta t_{min}^U[i] \forall i \in U.$$

Heat transfer of utility exchangers as a function of heat exchanger area, is as follows:

$$q_U[i] = u_U[i] \cdot a_U[i] \cdot \Delta t^U_{LMTD}[i] \forall i \in U.$$

Hot utility exchanger:
Calculation of the two approach temperatures of a utility exchanger, where the first is the difference between the utility's temperature and the leaving process stream's temperature, and the second is the difference between the utility's temperature and the entering process stream's temperature, is as follows:

$$\Delta t_U^1[i] = t_U[i] - t_{out}[i] \forall i \in U_H,$$

$$\Delta t_U^2[i,j] = t_U[i] - t_{in}[j] \forall i \in U_H.$$

The smaller approach temperature (utility's temperature minus outlet process temperature) is no less than the minimum approach temperature of the exchanger, as follows:

$$\Delta t_U^1[i] \geq \Delta t_{min}^U[i] \forall i \in U_H.$$

Heat transferred in an exchanger equals the heat gained by the process stream, as follows:

$$q_U[i] = (t_{out}[i] - t_{in}[i]) \cdot fcp_X[i] \forall i \in U_H.$$

Cold utility exchanger:
Calculation of the two approach temperatures of a utility exchanger, where the first is the difference between the entering process stream's temperature and the utility's temperature, and the second is the difference between the leaving process stream's temperature and the utility' temperature, or as follows:

$$\Delta t_U^1[i] = t_{in}[i] - t_U[i] \forall i \in U_C,$$

$$\Delta t_U^2[i,j] = t_{out}[i] - t_U[j] \forall i \in U_C.$$

The smaller approach temperature (outlet process temperature minus the utility's temperature) is no less than the minimum approach temperature of the exchanger, as follows:

$$\Delta t_U^2[i] \geq \Delta t_{min}^U[i] \forall i \in U_C.$$

Heat transferred in an exchanger equals the heat lost in the process stream, as follows:

$$q_U[i] = (t_{in}[i] - t_{out}[i]) \cdot fcp_X[i] \forall i \in U_C.$$

According to exemplary embodiment of the present invention, the mathematical program can automatically calculate the minimum (just needed) and maximum surface area for each heat exchanger unit and the corresponding the minimum and maximum total surface area for the whole network that satisfies the user input/given process conditions variations (disturbances/uncertainties) schemes. The mathematical program can also determine, from the user input/given intervals/ operating windows/ranges describing the values for the process streams supply and target temperatures as well as streams heat capacity flow rates, the optimal set of process conditions that render the minimum total surface area of heat exchangers network and the optimal set of process conditions that render the maximum total surface area of the designed heat exchangers network. In an alternative embodiment of the mathematical program, the program can further and/or alternatively determine the set of process conditions that render the optimal required surface area of the heat exchangers network.

It is important to note that while the foregoing embodiments of the present invention have been described in the context of a fully functional system and process, those skilled in the art will appreciate that the mechanism of at least portions of the present invention and/or aspects thereof are capable of being distributed in the form of a non-transitory tangible computer readable medium in a variety of forms storing a set of instructions for execution on a processor, processors, or the like, where it is understood that non-transitory computer-readable media comprises all tangible computer-readable media, with the sole exception being a transitory, propagating signal, and that embodiments of the present invention apply equally regardless of the particular type of signal bearing media used to actually carry out the distribution. Examples of the computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, HD-DVDs, memory sticks, mini disks, laser disks, Blu-ray disks, flash drives, and other newer types of memories, and certain types of transmission type media such as, for example, certain digital and analog communication links that are capable of storing the set of instructions. Such media can contain, for example, both operating instructions and the operations instructions related to the program product 51 and the computer executable portions of the algorithms and method steps according to various embodiments of a method of synthesizing a grass-roots heat exchanger network for a plurality of hot process streams to be cooled and a plurality of cold process streams to be heated and to identify optimal heat exchanger network topology, and various embodiments of a method to synthesize a grass-roots heat exchanger network for a plurality of hot process streams to be cooled and a plurality of cold process streams to be heated and to identify optimal heat exchanger network topology for future retrofit to accommodate future time-dependent new operating modes, disturbances and uncertainty schemes.

Embodiments of the present invention provide numerous advantages and benefits. For example, various exemplary embodiments of the present invention introduce a systematic user friendly system, method, and program product for grass-roots heat exchangers network synthesis that exhibits life-Cycle switchability and flexibility under all anticipated possible combinations of process variations with procedures for retrofitability due to change in energy and capital cost trade-off and/or change in assumed design phase disturbance and/or uncertainty schemes. Exemplary embodiments of the present invention advantageously keep the designer in control for the synthesis of the network, and advantageously do not require the use of assumptions that confine the synthesized network to inferior structures due to the use of unrealistic assumptions regarding disturbance and uncertainty schemes. Nor do exemplary embodiments of the present invention require use of a simplified multi-period superstructure for the network to avoid its combinatorial explosion (i.e., due to a requirement for sets of the P-dimensional vectors) as is the situation in the mathematical programming-based methods which utilize sets of multi-dimensional vectors. In contrast, various exemplary embodiments of the present invention can readily dispatch industrial-size problems, can allow the designer to test his/her novel solutions for network synthesis, can employ a realistic disturbance and uncertainty scheme, can utilize a best estimate for operating cost calculation to thereby result in the synthesis of networks that exhibits a minimum number of units with a minimum value for the maximum required surface area, done systematically and without manual iteration (required when employing a conventional pinch-based approach).

Exemplary embodiments of the present invention can further advantageously produce, systematically, networks having life-cycle switchability and flexibility as well as easiness in heat exchangers network future systematic retrofitability. Additionally, exemplary embodiments of the present invention can determine optimal target temperatures at the design phase under all anticipated possible combinations of disturbances and uncertainty for streams with operating window range. Further, besides deciding the optimal target temperature from heat exchanger network capital and operating cost costs, various exemplary embodiments of the invention can use the target temperature range of each stream in a performance equation of the rest of the process to ascertain its economic impact on the rest of the process. In such case the streams optimal target temperatures can be optimally selected for each stream based upon its impact on process economics, energy consumption, and switchable and flexible heat exchanger network capital cost. Accordingly, such systematic methods/techniques, systems, and program product can substantially benefit the heat exchangers network synthesis and waste heat recovery applications of new plant designs and its future retrofit in a world of fast dynamics with significant changes in energy availability and prices.

Various exemplary embodiments of the present invention further advantageously introduce a systematic heat exchangers network synthesis process/technique that renders desirable improvements over the pinch approach. For example, where the pinch approach is an in-systematic ad hoc iterative approach, which, in the case of the nominal design, is not understood to provide solutions which include matching one or more hot streams with one or more hot streams or one or more cold streams with one or more cold streams, and/or partially converting one or more hot streams to one or more cold streams or one or more cold streams to one or more hot streams, various embodiments of the present invention can provide such solutions. Further, as is the case of nominal design, where the pinch approach is not understood to provide any guarantee of feasibility under a given realistic disturbance scheme—instead producing a heat exchangers network with a greater than optimal number of units; does not address life cycle switchability and flexibility; and can not be used to calculate optimal target temperatures for streams within a realistic operating window range at the design phase under all possible combinations of anticipated disturbances and uncertainty, various embodiments of the present invention advantageously provide such solutions.

Various exemplary embodiments of the present invention can utilize various input values to synthesize, systematically, a switchable heat exchangers network with a desired level of flexibility under all possible anticipated combinations of process variations for a process or cluster of processes using a plurality of resource streams having operational attributes, which exhibits various desirable qualities according to various specific procedures. Such synthesized network developed therefrom can advantageously include one that exhibits easiness for life-cycle switchability and flexibility retrofitability synthesized according to specific procedures: that achieve at least one objective which exactly satisfies certain heating and cooling utilities loads, that achieve at least one objective using a fewer number of units, that achieve at least one objective satisfying more or less, in bounded range, certain heating and cooling utilities, that achieve at least one objective comprising either a heating or cooling utility, that achieve at least one objective comprising less hot utility consumption, that achieve at least one objective comprising less cold utility consumption, that achieve at least one objective comprising a lesser number of hot utilities types, that achieve at least one objective comprising a lesser number of cold utilities types, that achieve at least one objective comprising less degradation in process source region, and/or that achieve at least one objective comprising the achievement of a minimum value for the maximum surface area required to achieve the network objectives under all possible combinations of given process variations.

Such synthesized network developed therefrom can also or alternatively advantageously include one that exhibits easiness for life-cycle switchability and flexibility retrofitability synthesized according to specific procedures: that achieve at least the two objectives comprising less degradation in the process source region and exact interval consumption of heating and cooling utilities, that achieve at least the two objectives comprising less degradation in the process source region and a minimum maximum surface area required to satisfy all possible combinations for the given range of process variations, that achieve at least the two objectives comprising using a fewer number of units and a minimum maximum surface area that is required to handle all possible combinations of the given interval range of process variations, and/or that achieve at least three objectives comprising satisfying interval energy consumption exactly using a fewer number of units and a minimum maximum surface area that is required to handle all possible combinations of a given interval range of process variations.

Such synthesized network developed therefrom can advantageously also or alternatively include one that exhibits easiness for life-cycle switchability and flexibility retrofitability synthesized according to specific procedures that provide an indication of the specific attribute value or values determined from the ranges supplied by the user in the beginning or even decided during the implementation of the procedures for the streams target temperatures which result in a new utility consumption value or values calculated and the heat exchanger network synthesized to achieve one or more of the accompanied objectives described above. This can include synthesizing a systematically switchable heat exchanger network with a desired level of flexibility that exhibits easiness for life-cycle switchability and flexibility retrofitability with optimally selected streams target temperatures, whereby the calculated utilities consumption value or values satisfy desired minimum utilities consumed to heat resource streams and minimum utilities consumed to cool resource streams, while considering certain process constraints. Such synthesized network developed therefrom can advantageously also or alternatively include one that exhibits easiness for life-cycle switchability and flexibility retrofitability synthesized according to specific procedures: that include performing an automated calculation of [Q], [A], [Fcp], and middle temperatures in the network for the desired heat exchanger network structure, that rigorously provide sharp bounds on surface area calculations, that calculate conditions that result in the worst case scenarios for single heat exchangers as well as for the total network surface area under all possible combinations of process variations, and/or that determine maximum flow limits in the branches of the network that result from all the possible combinations process variations, which Can be used to determine the branch capacities before the detailed design is accomplished.

This application is related to U.S. Provisional Patent Application No. 61/356,900, filed Jun. 21, 2010, titled "Systematic Synthesis Method and Program Product For Heat Exchanger Network Life-Cycle Switchability and Flexibility Under All Possible Combinations of Process Variations," U.S. Provisional Patent Application No. 61/256,754, filed Oct. 30, 2009, titled "System, Method, and Program Product for Synthesizing Non-Constrained and Constrained Heat Exchanger Networks and Identifying Optimal Topology for Future Retrofit, U.S. patent application Ser. No. 12/575,743, filed Oct. 8, 2009, titled "System, Method, and Program Product for Targeting and Identification of Optimal Process Variables in Constrained Energy Recovery Systems, U.S. patent application Ser. No. 12/715,255, filed Mar. 1, 2010, titled "System, Method, and Program Product for Targeting and Optimal Driving Force Distribution in Energy Recovery Systems," U.S. patent application Ser. No. 11/768,084, filed on Jun. 25, 2007, titled "System, Method, and Program Product for Targeting and Optimal Driving Force Distribution in Energy Recovery Systems," U.S. Provisional Patent Application No. 60/816,234, filed Jun. 23, 2006, titled "Method and Program Product for Targeting and Optimal Driving Force Distribution in Energy Recovery Systems," U.S. patent application Ser. No. 12/480,415, filed Jun. 8, 2009, titled "System, Program Product and Related Methods for Global Targeting of Process Utilities Under Varying Conditions," U.S. patent application Ser. No. 12/767,217, filed Apr. 26, 2010, titled "System, Method, and Program Product for Synthesizing Non-Constrained and Constrained Heat Exchanger Networks," U.S. patent application Ser. No. 12/767,275, filed Apr. 26, 2010, titled "System, Method, and Program Product for Synthesizing Non-Thermodynamically Constrained Heat Exchanger Networks," and U.S. patent application Ser. No. 12/767,315, filed Apr. 26, 2010, titled "System, Method, and Program Product for Synthesizing Heat Exchanger Networks and Identifying Optimal Topology for Future Retrofit," each incorporated herein by reference in its entirety.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. This invention is not to be construed as limited to the particular forms or embodiments disclosed, since these are regarded as illustrative rather than restrictive. It will be apparent, however, that various modifications and changes can be made within the spirit and scope of the invention as described in the foregoing specification.

That claimed is:

1. A method to synthesize a grass-roots heat exchanger network for a plurality of hot process streams to be cooled and a plurality of cold process streams to be heated and to identify optimal heat exchanger network topology for future retrofit to accommodate future time-dependent new operating modes, disturbances and uncertainty schemes, the method comprising the steps of:

determining a first heat exchanger network design by a computer responsive to a first set of a plurality of stream-specific supply attribute interval values associated with a corresponding plurality of process streams;

determining a plurality of additional heat exchanger network designs by the computer responsive to a corresponding plurality of additional sets of stream-specific supply attribute interval values associated with the plurality of process streams, at least one interval value of at least one member of the first set of stream-specific supply attribute interval values being different than a corresponding at least one interval value of a corresponding at least one member of each of the additional sets of stream-specific supply attribute interval values associated with a corresponding same one of the plurality of process streams, at least one interval value of at least one member of each one of the additional sets of stream-specific supply attribute interval values being different than a corresponding at least one interval value of a corresponding at least one member of each other of the plurality of additional sets of stream-specific supply attribute interval values associated with a corresponding same one of the plurality of process streams; and identifying a set of a plurality of common-structure heat exchanger network designs extracted from the plurality of additional heat exchanger network designs and the first heat exchanger network design to thereby facilitate user selection of a heat exchanger network satisfying both current user-selected economic, switchability, and flexibility criteria and anticipated potential future retrofit requirements, each of the plurality of common-structure heat exchanger designs having a network structure comprising a common process-to-process heat exchanger structure that is substantially the same as that of each other of the plurality of common-structure heat exchanger designs but collectively different in load allocation therebetween.

2. A method as defined in claim 1, wherein the step of determining a plurality of additional heat exchanger network designs comprises the step of:

separately assigning corresponding members of each of the plurality of additional sets of stream-specific supply attribute interval values to the same plurality of process streams to thereby determine the plurality of additional heat exchanger network designs having the common process-to-process heat exchanger network structure.

3. A method as defined in claim 2,
wherein the first set of a plurality of stream-specific supply attribute interval values comprises a first set of a plurality of stream-specific supply temperature interval values; and
wherein the plurality of additional sets of stream-specific supply attributes interval values comprise a plurality of additional sets of discrete stream-specific supply temperature interval values each containing members having successively lower ranges of temperature values than corresponding members of the first set of stream-specific supply temperature interval values for the corresponding same plurality of process streams.

4. A method as defined in claim 3, wherein the first heat exchanger network design is a most heat exchanger populated one of the plurality of common-structure heat exchanger network designs.

5. A method as defined in claim 1,
wherein the first set of a plurality of stream-specific supply attribute interval values comprises a first set of a plurality of stream-specific supply temperature interval values; and
wherein each of the plurality of additional sets of stream-specific supply attribute interval values comprise a plurality of discrete stream-specific supply temperature interval values defining a corresponding plurality of members of the respective set,
wherein each member of each of the plurality of additional sets of stream-specific supply temperature interval values has a different range of temperature values than each corresponding member of each other of the plurality additional sets of stream-specific supply temperature interval values associated with the corresponding same plurality of process streams, and
wherein each corresponding member of each of the plurality of sets of discrete stream-specific supply temperature interval values also has successively lower ranges of temperature values than the corresponding members of the first set of stream-specific supply temperature interval values associated with the corresponding same plurality of process streams.

6. A method as defined in claim 1,
wherein the first set of a plurality of stream-specific supply attribute interval values comprises a first set of a plurality of stream-specific heat capacity flow rate interval values; and
wherein the plurality of additional sets of stream-specific supply attributes interval values comprise a plurality of additional sets of discrete stream-specific heat capacity flow rate interval values each containing members having successively lower ranges of heat capacity flow rate values than corresponding members of the first set of stream-specific heat capacity flow rate interval values for the corresponding same plurality of process streams.

7. A method as defined in claim 1,
wherein the first set of a plurality of stream-specific supply attribute interval values comprises a first set of a plurality of stream-specific heat capacity flow rate interval values; and
wherein each of the plurality of additional sets of stream-specific supply attribute interval values comprise a plurality of discrete stream-specific heat capacity flow rate interval values defining a corresponding plurality of members of the respective set,
wherein each member of each of the plurality of additional sets of stream-specific heat capacity flow rate interval values has a different range of heat capacity flow rate values than each corresponding member of each other of the plurality additional sets of stream-specific heat capacity flow rate interval values associated with the corresponding same plurality of process streams, and
wherein each corresponding member of each of the plurality of sets of discrete stream-specific heat capacity flow rate interval values also has successively lower ranges of heat capacity flow rate values than the corresponding members of the first set of stream-specific heat capacity flow rate interval values associated with the corresponding same plurality of process streams.

8. A method as defined in claim 1,
wherein the step of determining a first heat exchanger network design is further responsive to a first set of stream-specific target temperature interval values; and
wherein the step of determining a plurality of additional heat exchanger network designs by the computer is further responsive to both the plurality of additional sets of stream-specific supply attribute interval values assigned thereto and a corresponding plurality of additional sets of stream-specific target temperature interval values assigned to the plurality of process streams.

9. A method as defined in claim 8, wherein the step of determining a plurality of additional heat exchanger network designs comprises the step of:
separately assigning corresponding members of each of the plurality of additional sets of stream-specific target temperature interval values to the same plurality of process streams to thereby determine the plurality of additional heat exchanger network designs having the common process-to-process heat exchanger network structure.

10. A method as defined in claim 9, wherein the plurality of additional sets of stream-specific target temperature interval values comprise a plurality of sets of discrete stream-specific target temperature interval values each containing members having successively lower ranges of temperature values than corresponding members of the first set of stream-specific target temperature interval values for the corresponding same plurality of process streams.

11. A method as defined in claim 9,
wherein each of the plurality of additional sets of stream-specific target temperature interval values comprise a plurality of discrete stream-specific target temperature interval values defining a corresponding plurality of members of the respective set,
wherein each member of each of the plurality of additional sets of stream-specific target temperature interval values has a different range of temperature values than each corresponding member of each other of the plurality additional sets of stream-specific target temperature interval values associated with the corresponding same plurality of process streams, and
wherein each corresponding member of each of the plurality of sets of discrete stream-specific target temperature interval values also has successively lower ranges of temperature values than the corresponding members of the first set of stream-specific target temperature interval values associated with the corresponding same plurality of process streams.

12. A method as defined in claim 1, wherein the steps of determining a first heat exchanger network design and determining a plurality of additional heat exchanger network designs each include the steps of matching the plurality of hot process streams and the plurality of cold process streams to attain one or more utilities energy consumption targets, the matching including a matching scheme comprising the step of:
matching each hot process stream of the plurality of hot process streams having a higher starting temperature to a cooler stream prior to matching each other hot process stream of the plurality of hot process streams having a cooler starting temperature.

13. A method as defined in claim 1,
wherein each of the plurality of common-structure heat exchanger network designs account for at least one non-thermodynamic constraint between process streams; and
wherein the steps of determining a first heat exchanger network design and determining a plurality of additional heat exchanger network designs each include the step of matching the plurality of hot process streams and the plurality of cold process streams to attain one or more utilities energy consumption targets, the matching including a matching scheme comprising one or more of the following steps:
employing homogeneous matching to account for the one or more non-thermodynamic stream matching constraints to thereby reduce one or more utility consumption requirements, and
employing streams designation switching to account for the one or more non-thermodynamic stream matching constraints to thereby reduce one or more utility consumption requirements.

14. A method as defined in claim 1, further comprising the steps of:
selecting one of the plurality of common-structure heat exchanger network designs satisfying current user-selected economic, switchability, and flexibility criteria to thereby construct a selected physical heat exchanger network satisfying the current user-selected economic, switchability, and flexibility criteria that can be readily retrofitted without extensive modifications; and
constructing the selected physical heat exchanger network to include performing one or more of the following steps:
adding extra surface area on one or more process-to-process heat exchangers identified in both the selected common-structure heat exchanger network design and a least heat exchanger populated one of the plurality of common-structure heat exchanger designs, and adding one or more bypass lines to at least partially bypass a corresponding one or more utilities heat exchangers identified in both the selected common-structure heat exchanger network design and the least heat exchanger network populated one of the plurality of common-structure heat exchanger designs to match at least one other of the plurality of common-structure heat exchanger network designs located in a continuum between the selected one of the plurality of common-structure heat exchanger network designs and the least heat exchanger populated one of the plurality of common-structure heat exchanger designs, and
connecting one or more utilities heat exchangers identified in a most heat exchanger populated one of the plurality of common-structure heat exchanger designs to match at least one other of the plurality of common-structure heat exchanger network designs located in a continuum between the selected one of the plurality of common-structure heat exchanger network designs and the most heat exchanger populated one of the plurality of common-structure heat exchanger designs.

15. A method as defined in claim 14, further comprising the step of:
allotting facility free space for additional heat exchanger surface area when the selected one of the plurality of common-structure heat exchanger network designs is not the least heat exchanger populated one of the plurality of common-structure heat exchanger designs to thereby account for additional facility surface area needed to retrofit the selected physical heat exchanger network up to an extent of the least heat exchanger populated one of the plurality of common-structure heat exchanger designs to accommodate any future increased load on the selected physical heat exchanger network within a load capacity of the least heat exchanger populated one of the plurality of common-structure heat exchanger designs responsive to anticipated future switchability and flexibility needs.

16. A method as defined in claim 14, wherein the step of constructing the selected physical heat exchanger network further comprises the step of:
providing sufficient facility free space surrounding each of a plurality of process-to-process heat exchangers identified in both the selected common-structure heat exchanger network design and the least heat exchanger populated one of the plurality of common-structure heat exchanger designs to accommodate an addition of extra surface area required for retrofitting the physical heat exchanger network to match the at least one other of the plurality of common-structure heat exchanger network designs located in the continuum between the selected one of the plurality of common-structure heat exchanger network designs and the least heat exchanger populated one of the plurality of common-structure heat exchanger designs.

17. A method as defined in claim 16, wherein the step of constructing the physical heat exchanger network satisfying both current user-selected economic, switchability, and flexibility criteria and anticipated potential future retrofit requirements, further comprises the step of:
providing sufficient facility free space to accommodate an addition of one or more bypass lines to at least partially bypass a corresponding one or more utilities heat exchangers identified in both the selected common-structure heat exchanger network design and the least heat exchanger network populated one of the plurality of common-structure heat exchanger designs, required for retrofitting the physical heat exchanger network to match the at least one other of the plurality of common-structure heat exchanger network designs located in the continuum between the selected one of the plurality of common-structure heat exchanger network designs and the least heat exchanger populated one of the plurality of common-structure heat exchanger designs.

18. A method as defined in claim 14, wherein the selected one of the plurality of common-structure heat exchanger network designs satisfying current user-selected economic, switchability, and flexibility criteria is a first selected one of the plurality of common-structure heat exchanger network designs, and wherein the method further comprises the steps of:
selecting a second one of the plurality of common-structure heat exchanger network designs from within the continuum between the first selected one of the plurality of common-structure heat exchanger network designs and the least heat exchanger populated one of the plurality of common-structure heat exchanger designs responsive to a substantial change in a range of variation of the stream-specific supply temperature of at least one of the plurality of process streams and a substantial change in a range of variation of the stream-specific target temperature of at least one of the plurality of process streams; and retrofitting the selected physical heat exchanger network by adding extra surface area on one or more of the plurality of process-to-process heat exchangers identified in both the first selected common-structure heat exchanger network design and the least heat exchanger populated one of the plurality of common-structure heat exchanger designs, and by adding one or more bypass lines to at least partially bypass a corresponding one or more utilities heat exchangers identified in both the first selected common-structure heat exchanger network design and the least heat exchanger network populated one of the plurality of common-structure heat exchanger designs required to match the heat exchanger network structure of the selected second one of the plurality of common-structure heat exchanger network designs.

19. A method as defined in claim 14, wherein the step of constructing the physical heat exchanger network satisfying both current user-selected economic, switchability, and flexibility criteria and anticipated potential future retrofit requirements includes performing one or more of the following:

providing sufficient facility free space to accommodate connecting one or more utilities heat exchangers identified in the most heat exchanger populated one of the plurality of common-structure heat exchanger designs required for retrofitting the physical heat exchanger network to match the at least one other of the plurality of common-structure heat exchanger network designs located in the continuum between the selected one of the plurality of common-structure heat exchanger network designs and the most heat exchanger populated one of the plurality of common-structure heat exchanger designs; and allotting sufficient facility free space for additional utility access surface area when the selected one of the plurality of common-structure heat exchanger network designs is not the most heat exchanger populated one of the plurality of common-structure heat exchanger designs to thereby account for additional facility surface area needed to employ the one or more utilities heat exchangers and associated access media to retrofit the physical heat exchanger network up to an extent of the most heat exchanger populated one of the plurality of common-structure heat exchanger designs to accommodate any future increased utilities access requirements on the physical heat exchanger network within a network structural configuration of the most heat exchanger populated one of the plurality of common-structure heat exchanger designs, when so required.

20. A method as defined in claim 14, wherein the selected one of the plurality of common-structure heat exchanger network designs satisfying current user-selected economic, switchability, and flexibility criteria is a first selected one of the plurality of common-structure heat exchanger network designs, the method further comprising the steps of:

selecting a second one of the plurality of common-structure heat exchanger network designs from within the continuum between the first selected one of the plurality of common-structure heat exchanger network designs and the most heat exchanger populated one of the plurality of common-structure heat exchanger designs responsive to a substantial change in a range of variation of the stream-specific supply temperature of at least one of the plurality of process streams and a substantial change in a range of variation of the stream-specific target temperature of at least one of the plurality of process streams; and retrofitting the second selected physical heat exchanger network by connecting the one or more utilities heat exchangers identified the most heat exchanger populated one of the plurality of common-structure heat exchanger designs, required to match the heat exchanger network structure of the second selected one of the plurality of common-structure heat exchanger network designs.

21. A method to synthesize a grass-roots heat exchanger network for a plurality of hot process streams to be cooled and a plurality of cold process streams to be heated and to identify optimal heat exchanger network topology for future retrofit to accommodate future time-dependent new operating modes, disturbances and uncertainty schemes, the method comprising the steps of:

determining a first heat exchanger network design by a computer responsive to a first set of stream-specific supply temperature interval values and a first set of stream-specific target temperature interval values for a plurality of process streams;

determining a plurality of additional heat exchanger network designs by the computer responsive to a corresponding plurality of additional sets of stream-specific supply temperature interval values and a corresponding plurality of additional sets of stream-specific target temperature interval values assigned to the plurality of process streams, at least one interval value of each member of the first set of stream-specific supply temperature interval values being different than a corresponding at least one interval value of a corresponding member of each of the additional sets of stream-specific supply temperature interval values associated with a corresponding same one of the plurality of process streams, at least one interval value of each member of each one of the additional sets of stream-specific supply temperature interval values being different than a corresponding at least one interval value of a corresponding member of each other of the plurality of additional sets of stream-specific supply temperature interval values associated with a corresponding same one of the plurality of process streams, at least one interval value of each member of the first set of stream-specific target temperature interval values being different than a corresponding at least one interval value of a corresponding member of each of the additional sets of stream-specific target temperature interval values associated with a corresponding same one of the plurality of process streams, at least one interval value of each member of each one of the additional sets of stream-specific target temperature interval values being different than a corresponding at east one interval value of a corresponding member of each other of the additional sets of stream-specific target temperature interval values associated with a corresponding same one of the plurality of process streams; and identifying a set of a plurality of common-structure heat exchanger network designs extracted from the plurality of additional heat exchanger network designs and the first heat exchanger network design to thereby facilitate user selection of a heat exchanger network satisfying both current user-selected economic, switchability, and flexibility criteria and anticipated potential future retrofit requirements, each of the plurality of common-structure heat exchanger designs having a network structure comprising a common process-to-process heat exchanger structure that is substantially the same as that of each other of the plurality of common-structure heat exchanger designs but collectively different in load allocation therebetween.

22. Heat exchange network synthesizing program product to synthesize a grass-roots heat exchanger network for a plurality of hot process streams to be cooled and a plurality of cold process streams to be heated and to identify optimal heat exchanger network topology for future retrofit to accommodate future time-dependent new operating modes, disturbances and uncertainty schemes, the program product comprising a set of instructions, stored on a tangible computer readable medium, that when executed by a computer, cause the computer to perform the operations of:

determining a first heat exchanger network design responsive to a first set of a plurality of stream-specific supply attribute interval values associated with a corresponding plurality of process streams;

determining a plurality of additional heat exchanger network designs responsive to a corresponding plurality of additional sets of stream-specific supply attribute interval values associated with the plurality of process streams, at least one interval value of at least one member of the first set of stream-specific supply attribute interval values being different than a corresponding at least one interval value of a corresponding at least one member of each of the additional sets of stream-specific supply attribute interval values associated with a corresponding same one of the plurality of process streams, at least one interval value of at least one member of each one of the additional sets of stream-specific supply attribute interval values being different than a corresponding at least one interval value of a corresponding at least one member of each other of the plurality of additional sets of stream-specific supply attribute interval values associated with a corresponding same one of the plurality of process streams; and identifying a set of a plurality of common-structure heat exchanger network designs extracted from the plurality of additional heat exchanger network designs and the first heat exchanger network design to thereby facilitate user selection of a heat exchanger network satisfying both current user-selected economic, switchability, and flexibility criteria and anticipated potential future retrofit requirements, each of the plurality of common-structure heat exchanger designs having a network structure comprising a common process-to-process heat exchanger structure that is substantially the same as that of each other of the plurality of common-structure heat exchanger designs but collectively different in load allocation therebetween.

23. Program product as defined in claim 22, wherein the operation of determining a plurality of additional heat exchanger network designs comprises the operation of:

associating corresponding members of each of the plurality of additional sets of stream-specific supply attribute interval values to the same plurality of process streams to thereby determine the plurality of additional heat exchanger network designs having the common process-to-process heat exchanger network structure.

24. Program product as defined in claim 23,
wherein the first set of a plurality of stream-specific supply attribute interval values comprises a first set of a plurality of stream-specific supply temperature interval values; and
wherein the plurality of additional sets of stream-specific supply attributes interval values comprise a plurality of additional sets of discrete stream-specific supply temperature interval values each containing members having successively lower ranges of temperature values than corresponding members of the first set of stream-specific supply temperature interval values for the corresponding same plurality of process streams.

25. Program product as defined in claim 24, wherein the first heat exchanger network design is a most heat exchanger populated one of the plurality of common-structure heat exchanger network designs.

26. Program product as defined in claim 22,
wherein the first set of a plurality of stream-specific supply attribute interval values comprises a first set of a plurality of stream-specific supply temperature interval values; and
wherein each of the plurality of additional sets of stream-specific supply attribute interval values comprise a plurality of discrete stream-specific supply temperature interval values defining a corresponding plurality of members of the respective set,
wherein each member of each of the plurality of additional sets of stream-specific supply temperature interval values has a different range of temperature values than each corresponding member of each other of the plurality additional sets of stream-specific supply temperature interval values associated with the corresponding same plurality of process streams, and
wherein each corresponding member of each of the plurality of sets of discrete stream-specific supply temperature interval values also has successively lower ranges of temperature values than the corresponding members of the first set of stream-specific supply temperature interval values associated with the corresponding same plurality of process streams.

27. Program product as defined in claim 22,
wherein the first set of a plurality of stream-specific supply attribute interval values comprises a first set of a plurality of stream-specific heat capacity flow rate interval values; and
wherein the plurality of additional sets of stream-specific supply attributes interval values comprise a plurality of additional sets of discrete stream-specific heat capacity flow rate interval values each containing members having successively lower ranges of heat capacity flow rate values than corresponding members of the first set of stream-specific heat capacity flow rate interval values for the corresponding same plurality of process streams.

28. Program product as defined in claim 22,
wherein the first set of a plurality of stream-specific supply attribute interval values comprises a first set of a plurality of stream-specific heat capacity flow rate interval values; and
wherein each of the plurality of additional sets of stream-specific supply attribute interval values comprise a plurality of discrete stream-specific heat capacity flow rate interval values defining a corresponding plurality of members of the respective set, wherein each member of each of the plurality of additional sets of stream-specific heat capacity flow rate interval values has a different range of heat capacity flow rate values than each corresponding member of each other of the plurality additional sets of stream-specific heat capacity flow rate interval values associated with the corresponding same plurality of process streams, and wherein each corresponding member of each of the plurality of sets of discrete stream-specific heat capacity flow rate interval values also has successively lower ranges of heat capacity flow rate values than the corresponding members of the first set of stream-specific heat capacity flow rate interval values associated with the corresponding same plurality of process streams.

29. Program product as defined in claim 22,
wherein the operation of determining a first heat exchanger network design is further responsive to a first set of stream-specific target temperature interval values; and
wherein the operation of determining a plurality of additional heat exchanger network designs is further responsive to both the plurality of additional sets of stream-specific supply attribute interval values assigned thereto and a corresponding plurality of additional sets of stream-specific target temperature interval values assigned to the plurality of process streams.

30. Program product as defined in claim 29, wherein the operation of determining a plurality of additional heat exchanger network designs comprises the operation of:
separately assigning corresponding members of each of the plurality of additional sets of stream-specific target temperature interval values to the same plurality of process streams to thereby determine the plurality of additional heat exchanger network designs having the common process-to-process heat exchanger network structure.

31. Program product as defined in claim 30, wherein the plurality of additional sets of stream-specific target temperature interval values comprise a plurality of sets of discrete stream-specific target temperature interval values each containing members having successively lower ranges of temperature values than corresponding members of the first set of stream-specific target temperature interval values for the corresponding same plurality of process streams.

32. Program product as defined in claim 30,
wherein each of the plurality of additional sets of stream-specific target temperature interval values comprise a plurality of discrete stream-specific target temperature interval values defining a corresponding plurality of members of the respective set,
wherein each member of each of the plurality of additional sets of stream-specific target temperature interval values has a different range of temperature values than each corresponding member of each other of the plurality additional sets of stream-specific target temperature interval values associated with the corresponding same plurality of process streams, and
wherein each corresponding member of each of the plurality of sets of discrete stream-specific target temperature interval values also has successively lower ranges of temperature values than the corresponding members of the first set of stream-specific target temperature interval values associated with the corresponding same plurality of process streams.

33. Program product as defined in claim 22, wherein the operations of determining a first heat exchanger network design and determining a plurality of additional heat exchanger network designs each include the operations of matching the plurality of hot process streams and the plurality of cold process streams to attain one or more utilities energy consumption targets, the matching including a matching scheme comprising the operation of:
matching each hot process stream of the plurality of hot process streams having a higher starting temperature to a cooler stream prior to matching each other hot process stream of the plurality of hot process streams having a cooler starting temperature.

34. Program product as defined in claim 22,
wherein each of the plurality of common-structure heat exchanger network designs account for at least one non-thermodynamic constraint between process streams; and
wherein the operations of determining a first heat exchanger network design and determining a plurality of additional heat exchanger network designs each include the operation of matching the plurality of hot process streams and the plurality of cold process streams to attain one or more utilities energy consumption targets, the matching including a matching scheme comprising one or more of the following operations:
employing homogeneous matching to account for the one or more non-thermodynamic stream matching constraints to thereby reduce one or more utility consumption requirements, and
employing streams designation switching to account for the one or more non-thermodynamic stream matching constraints to thereby reduce one or more utility consumption requirements.

35. Program product as defined in claim 22, wherein the operations further comprise:
receiving a user selection of one of the plurality of common-structure heat exchanger network designs satisfying current user-selected economic, switchability, and flexibility criteria to thereby construct a selected physical heat exchanger network satisfying the current user-selected economic, switchability, and flexibility criteria that can be readily retrofitted without extensive modifications; and
providing data identifying parameters to construct the selected physical heat exchanger network to include performing one or more of the following:
identifying an extra heat exchanger surface area requirement for one or more process-to-process heat exchangers identified in both the selected common-structure heat exchanger network design and a least heat exchanger populated one of the plurality of common-structure heat exchanger designs,
providing configuration data to connect one or more bypass lines to at least partially bypass a corresponding one or more utilities heat exchangers identified in both the selected common-structure heat exchanger network design and the least heat exchanger network populated one of the plurality of common-structure heat exchanger designs to match at least one other of the plurality of common-structure heat exchanger network designs located in a continuum between the selected one of the plurality of common-structure heat exchanger network designs and the least heat exchanger populated one of the plurality of common-structure heat exchanger designs, and
providing configuration data to connect one or more utilities heat exchangers identified in a most heat exchanger populated one of the plurality of common-structure heat exchanger designs to match at least one other of the plurality of common-structure heat exchanger network designs located in a continuum between the selected one of the plurality of common-structure heat exchanger network designs and the most heat exchanger populated one of the plurality of common-structure heat exchanger designs.

36. Program product as defined in claim 22, wherein the operations further comprise:
receiving a user selection of one of the plurality of common-structure heat exchanger network designs satisfying current user-selected economic, switchability, and flexibility criteria to thereby construct a selected physical heat exchanger network satisfying the current user-selected economic, switchability, and flexibility criteria that can be readily retrofitted without extensive modifications; and
determining, responsive to the operation of receiving a user selection of one of the plurality of common-structure heat exchanger network designs satisfying current user-selected economic, switchability, and flexibility criteria, an amount of facility free space required for additional heat exchanger surface area when the selected one of the plurality of common-structure heat exchanger network designs is not the least heat exchanger populated one of the plurality of common-structure heat exchanger designs to thereby account for additional facility surface area needed to retrofit the selected physical heat exchanger network up to an extent of the least heat exchanger populated one of the plurality of common-structure heat exchanger designs to accommodate any future increased load on the selected physical heat exchanger network within a load capacity of the least heat exchanger populated one of the plurality of common-structure heat exchanger designs responsive to anticipated future switchability and flexibility needs.

37. Program product as defined in claim 22, wherein the operations further comprise:
receiving a user selection of one of the plurality of common-structure heat exchanger network designs satisfying current user-selected economic, switchability, and flexibility criteria to thereby construct a selected physical heat exchanger network satisfying the current user-selected economic, switchability, and flexibility criteria that can be readily retrofitted without extensive modifications; and
determining, responsive to the operation of receiving a user selection of one of the plurality of common-structure heat exchanger network designs satisfying current user-selected economic, switchability, and flexibility criteria, an amount of facility free space surrounding each of a plurality of process-to-process heat exchangers identified in both the selected common-structure heat exchanger network design and the least heat exchanger populated one of the plurality of common-structure heat exchanger designs required to accommodate an addition of extra surface area required for retrofitting the physical heat exchanger network to match the at least one other of the plurality of common-structure heat exchanger network designs located in the continuum between the selected one of the plurality of common-structure heat exchanger network designs and the least heat exchanger populated one of the plurality of common-structure heat exchanger designs.

38. Program product as defined in claim 37, wherein the operations further comprise:
determining, responsive to the operation of receiving a user selection of one of the plurality of common-structure heat exchanger network designs satisfying current user-selected economic, switchability, and flexibility criteria, an amount of facility free space required to accommodate an addition of one or more bypass lines to at least partially bypass a corresponding one or more utilities heat exchangers identified in both the selected common-structure heat exchanger network design and the least heat exchanger network populated one of the plurality of common-structure heat exchanger designs, required for retrofitting the physical heat exchanger network to match the at least one other of the plurality of common-structure heat exchanger network designs located in the continuum between the selected one of the plurality of common-structure heat exchanger network designs and the least heat exchanger populated one of the plurality of common-structure heat exchanger designs.

39. Program product as defined in claim 22, wherein the operations further comprise:
receiving a user selection of a first selected one of the plurality of common-structure heat exchanger network designs satisfying current user-selected economic, switchability, and flexibility criteria to thereby construct a selected physical heat exchanger network satisfying the current user-selected economic, switchability, and flexibility criteria that can be readily retrofitted without extensive modifications; and
identifying a second one of the plurality of common-structure heat exchanger network designs from within the continuum between the first selected one of the plurality of common-structure heat exchanger network designs and the least heat exchanger populated one of the plurality of common-structure heat exchanger designs providing a presently optimal design responsive to a substantial change in a range of variation of the stream-specific supply temperature of at least one of the plurality of process streams and a substantial change in a range of variation of the stream-specific target temperature of at least one of the plurality of process streams.

40. Program product as defined in claim 22, wherein the operations further comprise:
receiving a user selection of one of the plurality of common-structure heat exchanger network designs satisfying current user-selected economic, switchability, and flexibility criteria to thereby construct a selected physical heat exchanger network satisfying the current user-selected economic, switchability, and flexibility criteria that can be readily retrofitted without extensive modifications;
determining, responsive to the operation of receiving a user selection of one of the plurality of common-structure heat exchanger network designs satisfying current user-selected economic, switchability, and flexibility criteria, an amount of facility free space required to accommodate connecting one or more utilities heat exchangers identified in the most heat exchanger populated one of the plurality of common-structure heat exchanger designs required for retrofitting the physical heat exchanger network to match the at least one other of the plurality of common-structure heat exchanger network designs located in the continuum between the selected one of the plurality of common-structure heat exchanger network designs and the most heat exchanger populated one of the plurality of common-structure heat exchanger designs; and
determining, responsive to the operation of receiving a user selection of one of the plurality of common-structure heat exchanger network designs satisfying current user-selected economic, switchability, and flexibility criteria, an amount of facility free space required for additional utility access surface area when the selected one of the plurality of common-structure heat exchanger network designs is not the most heat exchanger populated one of the plurality of common-structure heat exchanger designs to thereby account for additional facility surface area needed to employ the one or more utilities heat exchangers and associated access media to retrofit the physical heat exchanger network up to an extent of the most heat exchanger populated one of the plurality of common-structure heat exchanger designs to accommodate any future increased utilities access requirements on the physical heat exchanger network within a network structural configuration of the most heat exchanger populated one of the plurality of common-structure heat exchanger designs, when so required.

41. Program product as defined in claim 22, wherein the operations further comprise:
receiving a user selection of a first selected one of the plurality of common-structure heat exchanger network designs satisfying current user-selected economic, switchability, and flexibility criteria to thereby construct a selected physical heat exchanger network satisfying the current user-selected economic, switchability, and flexibility criteria that can be readily retrofitted without extensive modifications; and
receiving a user selection of a second one of the plurality of common-structure heat exchanger network designs selected from within the continuum between the first selected one of the plurality of common-structure heat exchanger network designs and the most heat exchanger populated one of the plurality of common-structure heat exchanger designs responsive to a substantial change in a range of variation of the stream-specific supply temperature of at least one of the plurality of process streams and a substantial change in a range of variation of the stream-specific target temperature of at least one of the plurality of process streams to thereby retrofit the selected physical heat exchanger network by connecting the one or more utilities heat exchangers identified in the most heat exchanger populated one of the plurality of common-structure heat exchanger designs, required to match the heat exchanger network structure of the selected second one of the plurality of common-structure heat exchanger network designs.

42. Program product to synthesize a grass-roots heat exchanger network for a plurality of hot process streams to be cooled and a plurality of cold process streams to be heated and to identify optimal heat exchanger network topology for future retrofit to accommodate future time-dependent new operating modes, disturbances and uncertainty schemes, the program product (51) comprising a set of instructions, stored on a tangible computer readable medium, that when executed by a computer (31), cause the computer (31) to perform various operations including the operations of:
determining a first heat exchanger network design responsive to a first set of stream-specific supply temperature interval values and a first set of stream-specific target temperature interval values for a plurality of process streams;
determining a plurality of additional heat exchanger network designs responsive to a corresponding plurality of additional sets of stream-specific supply temperature interval values and a corresponding plurality of additional sets of stream-specific target temperature interval values assigned to the plurality of process streams,
at least one interval value of each member of the first set of stream-specific supply temperature interval values being different than a corresponding at least one interval value of a corresponding member of each of the additional sets of stream-specific supply temperature interval values associated with a corresponding same one of the plurality of process streams,
at least one interval value of each member of each one of the additional sets of stream-specific supply temperature interval values being different than a corresponding at least one interval value of a corresponding member of each other of the plurality of additional sets of stream-specific supply temperature interval values associated with a corresponding same one of the plurality of process streams,
at least one interval value of each member of the first set of stream-specific target temperature interval values being different than a corresponding at least one interval value of a corresponding member of each of the additional sets of stream-specific target temperature interval values associated with a corresponding same one of the plurality of process streams,
at least one interval value of each member of each one of the additional sets of stream-specific target temperature interval values being different than a corresponding at least one interval value of a corresponding member of each other of the additional sets of stream-specific target temperature interval values associated with a corresponding same one of the plurality of process streams; and
identifying a set of a plurality of common-structure heat exchanger network designs extracted from the plurality of additional heat exchanger network designs and the first heat exchanger network design to thereby facilitate user selection of a heat exchanger network satisfying both current user-selected economic, switchability, and flexibility criteria and anticipated potential future retrofit requirements,
each of the plurality of common-structure heat exchanger designs having a network structure comprising a common process-to-process heat exchanger structure that is substantially the same as that of each other of the plurality of common-structure heat exchanger designs but collectively different in load allocation therebetween.

43. A system to synthesize a grass-roots heat exchanger network for a process or cluster of processes having a plurality of hot process streams to be cooled and a plurality of cold process streams to be heated and to identify optimal heat exchanger network topology to accommodate future time-dependent new operating modes, disturbances and uncertainty schemes, the system comprising:
a heat exchange network synthesizing computer having a processor and memory in communication with the processor to store software and database records therein;
at least one database stored in memory accessible to the heat exchange network synthesizing computer, comprising a plurality of datasets including stream-specific supply attribute interval values for each of a plurality of heat exchanger network designs associated with a same plurality of process streams, each dataset indicating potential ranges of values for operational attributes for each of a same plurality of hot and cold process streams to include a lower and an upper boundary value for one or more of the following sets of operational supply attributes in interval form: a lower and an upper boundary value for a supply temperature (Ts) of each of the plurality of the process streams and a lower and an upper boundary value for a heat capacity flow rate (FCp) of each of the plurality of the process streams; and heat exchange network synthesizing program product stored in the memory of the heat exchange network synthesizing computer to synthesize a grass-roots heat exchanger network for the plurality of hot process streams to be cooled and the plurality of cold process streams to be heated and to identify optimal heat exchanger network topology for future retrofit, the program product including instructions that when executed by the heat exchange network synthesizing computer cause the computer to perform the operations of:

determining a first heat exchanger network design responsive to a first set of a plurality of stream-specific supply attribute interval values associated with a corresponding plurality of process streams, determining a plurality of additional heat exchanger network designs responsive to a corresponding plurality of additional sets of stream-specific supply attribute interval values associated with the plurality of process streams, at least one interval value of at least one member of the first set of stream-specific supply attribute interval values being different than a corresponding at least one interval value of a corresponding at least one member of each of the additional sets of stream-specific supply attribute interval values associated with a corresponding same one of the plurality of process streams, at least one interval value of at least one member of each one of the additional sets of stream-specific supply attribute interval values being different than a corresponding at least one interval value of a corresponding at least one member of each other of the plurality of additional sets of stream-specific supply attribute interval values associated with a corresponding same one of the plurality of process streams, and identifying a set of a plurality of common-structure heat exchanger network designs extracted from the plurality of additional heat exchanger network designs and the first heat exchanger network design to thereby facilitate user selection of a heat exchanger network satisfying both current user-selected economic, switchability, and flexibility criteria and anticipated potential future retrofit requirements, each of the plurality of common-structure heat exchanger designs having a network structure comprising a common process-to-process heat exchanger structure that is substantially the same as that of each other of the plurality of common-structure heat exchanger designs but collectively different in load allocation therebetween.

44. A system as defined in claim 43, wherein the operation of determining a plurality of additional heat exchanger network designs comprises the operation of:

associating corresponding members of each of the plurality of additional sets of stream-specific supply attribute interval values to the same plurality of process streams to thereby determine the plurality of additional heat exchanger network designs having the common process-to-process heat exchanger network structure.

45. A system as defined in claim 44, wherein the first set of a plurality of stream-specific supply attribute interval values comprises a first set of a plurality of stream-specific supply temperature interval values; and wherein the plurality of additional sets of stream-specific supply attributes interval values comprise a plurality of additional sets of discrete stream-specific supply temperature interval values each containing members having successively lower ranges of temperature values than corresponding members of the first set of stream-specific supply temperature interval values for the corresponding same plurality of process streams.

46. A system as defined in claim 45, wherein the first heat exchanger network design is a most heat exchanger populated one of the plurality of common-structure heat exchanger network designs.

47. A system as defined in claim 43, wherein the first set of a plurality of stream-specific supply attribute interval values comprises a first set of a plurality of stream-specific supply temperature interval values; and wherein each of the plurality of additional sets of stream-specific supply attribute interval values comprise a plurality of discrete stream-specific supply temperature interval values defining a corresponding plurality of members of the respective set, wherein each member of each of the plurality of additional sets of stream-specific supply temperature interval values has a different range of temperature values than each corresponding member of each other of the plurality additional sets of stream-specific supply temperature interval values associated with the corresponding same plurality of process streams, and wherein each corresponding member of each of the plurality of sets of discrete stream-specific supply temperature interval values also has successively lower ranges of temperature values than the corresponding members of the first set of stream-specific supply temperature interval values associated with the corresponding same plurality of process streams.

48. A system as defined in claim 43, wherein the first set of a plurality of stream-specific supply attribute interval values comprises a first set of a plurality of stream-specific heat capacity flow rate interval values; and wherein the plurality of additional sets of stream-specific supply attributes interval values comprise a plurality of additional sets of discrete stream-specific heat capacity flow rate interval values each containing members having successively lower ranges of heat capacity flow rate values than corresponding members of the first set of stream-specific heat capacity flow rate interval values for the corresponding same plurality of process streams.

49. A system as defined in claim 43, wherein the first set of a plurality of stream-specific supply attribute interval values comprises a first set of a plurality of stream-specific heat capacity flow rate interval values; and wherein each of the plurality of additional sets of stream-specific supply attribute interval values comprise a plurality of discrete stream-specific heat capacity flow rate interval values defining a corresponding plurality of members of the respective set, wherein each member of each of the plurality of additional sets of stream-specific heat capacity flow rate interval values has a different range of heat capacity flow rate values than each corresponding member of each other of the plurality additional sets of stream-specific heat capacity flow rate interval values associated with the corresponding same plurality of process streams, and wherein each corresponding member of each of the plurality of sets of discrete stream-specific heat capacity flow rate interval values also has successively lower ranges of heat capacity flow rate values than the corresponding members of the first set of stream-specific heat capacity flow rate interval values associated with the corresponding same plurality of process streams.

50. A system as defined in claim 43,
wherein the operation of determining a first heat exchanger network design is further responsive to a first set of stream-specific target temperature interval values; and
wherein the operation of determining a plurality of additional heat exchanger network designs is further responsive to both the plurality of additional sets of stream-specific supply attribute interval values associated therewith and a corresponding plurality of additional sets of stream-specific target temperature interval values associated with the plurality of process streams.

51. A system as defined in claim 50, wherein the operation of determining a plurality of additional heat exchanger network designs comprises the operation of:
separately associating corresponding members of each of the plurality of additional sets of stream-specific target temperature interval values to the same plurality of process streams to thereby determine the plurality of additional heat exchanger network designs having the common process-to-process heat exchanger network structure.

52. A system as defined in claim 51, wherein the plurality of additional sets of stream-specific target temperature interval values comprise a plurality of sets of discrete stream-specific target temperature interval values each containing members having successively lower ranges of temperature values than corresponding members of the first set of stream-specific target temperature interval values for the corresponding same plurality of process streams.

53. A system as defined in claim 51,
wherein each of the plurality of additional sets of stream-specific target temperature interval values comprise a plurality of discrete stream-specific target temperature interval values defining a corresponding plurality of members of the respective set,
wherein each member of each of the plurality of additional sets of stream-specific target temperature interval values has a different range of temperature values than each corresponding member of each other of the plurality additional sets of stream-specific target temperature interval values associated with the corresponding same plurality of process streams, and
wherein each corresponding member of each of the plurality of sets of discrete stream-specific target temperature interval values also has successively lower ranges of temperature values than the corresponding members of the first set of stream-specific target temperature interval values associated with the corresponding same plurality of process streams.

54. A system as defined in claim 43, wherein the operations of determining a first heat exchanger network design and determining a plurality of additional heat exchanger network designs each include the operations of matching the plurality of hot process streams and the plurality of cold process streams to attain one or more utilities energy consumption targets, the matching including a matching scheme comprising the operation of:
matching each hot process stream of the plurality of hot process streams having a higher starting temperature to a cooler stream prior to matching each other hot process stream of the plurality of hot process streams having a cooler starting temperature.

55. A system as defined in claim 43,
wherein each of the plurality of common-structure heat exchanger network designs account for at least one non-thermodynamic constraint between process streams; and
wherein the operations of determining a first heat exchanger network design and determining a plurality of additional heat exchanger network designs each include the operation of matching the plurality of hot process streams and the plurality of cold process streams to attain one or more utilities energy consumption targets, the matching including a matching scheme comprising one or more of the following operations:
employing homogeneous matching to account for the one or more non-thermodynamic stream matching constraints to thereby reduce one or more utility consumption requirements, and
employing streams designation switching to account for the one or more non-thermodynamic stream matching constraints to thereby reduce one or more utility consumption requirements.

56. A system as defined in claim 43, wherein the operations further comprise:
receiving a user selection of one of the plurality of common-structure heat exchanger network designs satisfying current user-selected economic, switchability, and flexibility criteria to thereby construct a selected physical heat exchanger network satisfying the current user-selected economic, switchability, and flexibility criteria that can be readily retrofitted without extensive modifications; and
providing data identifying parameters to construct the selected physical heat exchanger network to include performing one or more of the following:
identifying an extra heat exchanger surface area requirement for one or more process-to-process heat exchangers identified in both the selected common-structure heat exchanger network design and a least heat exchanger populated one of the plurality of common-structure heat exchanger designs,
providing configuration data to connect one or more bypass lines to at least partially bypass a corresponding one or more utilities heat exchangers identified in both the selected common-structure heat exchanger network design and the least heat exchanger network populated one of the plurality of common-structure heat exchanger designs to match at least one other of the plurality of common-structure heat exchanger network designs located in a continuum between the selected one of the plurality of common-structure heat exchanger network designs and the least heat exchanger populated one of the plurality of common-structure heat exchanger designs, and
providing configuration data to connect one or more utilities heat exchangers identified in a most heat exchanger populated one of the plurality of common-structure heat exchanger designs to match at least one other of the plurality of common-structure heat exchanger network designs located in a continuum between the selected one of the plurality of common-structure heat exchanger network designs and the most heat exchanger populated one of the plurality of common-structure heat exchanger designs.

57. A system as defined in claim 43, wherein the operations further comprise:
- receiving a user selection of one of the plurality of common-structure heat exchanger network designs satisfying current user-selected economic, switchability, and flexibility criteria to thereby construct a selected physical heat exchanger network satisfying the current user-selected economic, switchability, and flexibility criteria that can be readily retrofitted without extensive modifications; and
- determining, responsive to the operation of receiving a user selection of one of the plurality of common-structure heat exchanger network designs satisfying current user-selected economic, switchability, and flexibility criteria, an amount of facility free space required for additional heat exchanger surface area when the selected one of the plurality of common-structure heat exchanger network designs is not the least heat exchanger populated one of the plurality of common-structure heat exchanger designs to thereby account for additional facility surface area needed to retrofit the selected physical heat exchanger network up to an extent of the least heat exchanger populated one of the plurality of common-structure heat exchanger designs to accommodate any future increased load on the selected physical heat exchanger network within a load capacity of the least heat exchanger populated one of the plurality of common-structure heat exchanger designs responsive to anticipated future switchability and flexibility needs.

58. A system as defined in claim 43, wherein the operations further comprise:
- receiving a user selection of one of the plurality of common-structure heat exchanger network designs satisfying current user-selected economic, switchability, and flexibility criteria to thereby construct a selected physical heat exchanger network satisfying the current user-selected economic, switchability, and flexibility criteria that can be readily retrofitted without extensive modifications; and
- determining, responsive to the operation of receiving a user selection of one of the plurality of common-structure heat exchanger network designs satisfying current user-selected economic, switchability, and flexibility criteria, an amount of facility free space surrounding each of a plurality of process-to-process heat exchangers identified in both the selected common-structure heat exchanger network design and the least heat exchanger populated one of the plurality of common-structure heat exchanger designs required to accommodate an addition of extra surface area required for retrofitting the physical heat exchanger network to match the at least one other of the plurality of common-structure heat exchanger network designs located in the continuum between the selected one of the plurality of common-structure heat exchanger network designs and the least heat exchanger populated one of the plurality of common-structure heat exchanger designs.

59. A system as defined in claim 58, wherein the operations further comprise:
- determining, responsive to the operation of receiving a user selection of one of the plurality of common-structure heat exchanger network designs satisfying current user-selected economic, switchability, and flexibility criteria, an amount of facility free space required to accommodate an addition of one or more bypass lines to at least partially bypass a corresponding one or more utilities heat exchangers identified in both the selected common-structure heat exchanger network design and the least heat exchanger network populated one of the plurality of common-structure heat exchanger designs, required for retrofitting the physical heat exchanger network to match the at least one other of the plurality of common-structure heat exchanger network designs located in the continuum between the selected one of the plurality of common-structure heat exchanger network designs and the least heat exchanger populated one of the plurality of common-structure heat exchanger designs.

60. A system as defined in claim 43, wherein the operations further comprise:
- receiving a user selection of a first selected one of the plurality of common-structure heat exchanger network designs satisfying current user-selected economic, switchability, and flexibility criteria to thereby construct a selected physical heat exchanger network satisfying the current user-selected economic, switchability, and flexibility criteria that can be readily retrofitted without extensive modifications; and
- identifying a second one of the plurality of common-structure heat exchanger network designs from within the continuum between the first selected one of the plurality of common-structure heat exchanger network designs and the least heat exchanger populated one of the plurality of common-structure heat exchanger designs providing a presently optimal design responsive to a substantial change in a range of variation of the stream-specific supply temperature of at least one of the plurality of process streams and a substantial change in a range of variation of the stream-specific target temperature of at least one of the plurality of process streams.

61. A system as defined in claim 43, wherein the operations further comprise:
- receiving a user selection of one of the plurality of common-structure heat exchanger network designs satisfying current user-selected economic, switchability, and flexibility criteria to thereby construct a selected physical heat exchanger network satisfying the current user-selected economic, switchability, and flexibility criteria that can be readily retrofitted without extensive modifications;
- determining, responsive to the operation of receiving a user selection of one of the plurality of common-structure heat exchanger network designs satisfying current user-selected economic, switchability, and flexibility criteria, an amount of facility free space required to accommodate connecting one or more utilities heat exchangers identified in the most heat exchanger populated one of the plurality of common-structure heat exchanger designs required for retrofitting the physical heat exchanger network to match the at least one other of the plurality of common-structure heat exchanger network designs located in the continuum between the selected one of the plurality of common-structure heat exchanger network designs and the most heat exchanger populated one of the plurality of common-structure heat exchanger designs; and
- determining, responsive to the operation of receiving a user selection of one of the plurality of common-structure heat exchanger network designs satisfying current user-selected economic, switchability, and flexibility criteria, an amount of facility free space required for additional utility access surface area when the selected one of the plurality of common-structure heat exchanger network designs is not the most heat exchanger populated one of the plurality of common-structure heat exchanger designs to thereby account for additional facility surface area needed to employ the one or more utilities heat exchangers and associated access media to retrofit the physical heat exchanger network up to an extent of the most heat exchanger populated one of the plurality of common-structure heat exchanger designs to accommodate any future increased utilities access requirements on the physical heat exchanger network within a network structural configuration of the most heat exchanger populated one of the plurality of common-structure heat exchanger designs, when so required.

62. A system as defined in claim 43, wherein the operations further comprise:

receiving a user selection of a first selected one of the plurality of common-structure heat exchanger network designs satisfying current user-selected economic, switchability, and flexibility criteria to thereby construct a selected physical heat exchanger network satisfying the current user-selected economic, switchability and flexibility criteria that can be readily retrofitted without extensive modifications; and receiving a user selection of a second one of the plurality of common-structure heat exchanger network designs selected from within the continuum between the first selected one of the plurality of common-structure heat exchanger network designs and the most heat exchanger populated one of the plurality of common-structure heat exchanger designs responsive to a substantial change in a range of variation of the stream-specific supply temperature of at least one of the plurality of process streams and a substantial change in a range of variation of the stream-specific target temperature of at least one of the plurality of process streams to thereby retrofit the selected physical heat exchanger network by connecting the one or more utilities heat exchangers identified in the most heat exchanger populated one of the plurality of common-structure heat exchanger designs, required to match the heat exchanger network structure of the second selected one of the plurality of common-structure heat exchanger network designs.

63. A system to synthesize a grass-roots heat exchanger network for a process or cluster of processes having a plurality of hot process streams to be cooled and a plurality of cold process streams to be heated and to identify optimal heat exchanger network topology to accommodate future time-dependent new operating modes, disturbances and uncertainty schemes, the system comprising:

a heat exchange network synthesizing computer having a processor and memory in communication with the processor to store software and database records therein; and heat exchange network synthesizing program product stored in the memory of the heat exchange network synthesizing computer to synthesize a grass-roots heat exchanger network for the plurality of hot process streams to be cooled and the plurality of cold process streams to be heated and to identify optimal heat exchanger network topology for future retrofit, the program product including instructions that when executed by the heat exchange network synthesizing computer cause the computer to perform the operations of:

determining a first heat exchanger network design responsive to a first set of stream-specific supply temperature interval values and a first set of stream-specific target temperature interval values for a plurality of process streams, determining a plurality of additional heat exchanger network designs responsive to a corresponding plurality of additional sets of stream-specific supply temperature interval values and a corresponding plurality of additional sets of stream-specific target temperature interval values assigned to the plurality of process streams, at least one interval value of each member of the first set of stream-specific supply temperature interval values being different than a corresponding at least one interval value of a corresponding member of each of the additional sets of stream-specific supply temperature interval values associated with a corresponding same one of the plurality of process streams, at least one interval value of each member of each one of the additional sets of stream-specific supply temperature interval values being different than a corresponding at least one interval value of a corresponding member of each other of the plurality of additional sets of stream-specific supply temperature interval values associated with a corresponding same one of the plurality of process streams, at least one interval value of each member of the first set of stream-specific target temperature interval values being different than a corresponding at least one interval value of a corresponding member of each of the additional sets of stream-specific target temperature interval values associated with a corresponding same one of the plurality of process streams, and at least one interval value of each member of each one of the additional sets of stream-specific target temperature interval values being different than a corresponding at least one interval value of a corresponding member of each other of the additional sets of stream-specific target temperature interval values associated with a corresponding same one of the plurality of process streams, and identifying a set of a plurality of common-structure heat exchanger network designs extracted from the plurality of additional heat exchanger network designs and the first heat exchanger network design to thereby facilitate user selection of a heat exchanger network satisfying both current user-selected economic, switchability, and flexibility criteria and anticipated potential future retrofit requirements, each of the plurality of common-structure heat exchanger designs having a network structure comprising a common process-to-process heat exchanger structure that is substantially the same as that of each other of the plurality of common-structure heat exchanger designs but collectively different in load allocation therebetween.

* * * * *

UNITED STATES PATENT AND TRADEMARK OFFICE
CERTIFICATE OF CORRECTION

PATENT NO. : 8,311,682 B2
APPLICATION NO. : 12/898475
DATED : November 13, 2012
INVENTOR(S) : Mahmoud Bahy Noureldin et al.

It is certified that error appears in the above-identified patent and that said Letters Patent is hereby corrected as shown below:

Column 44, lines 55 and 59, "heat exchanger designs" should read --heat exchanger network designs--.
Column 47, lines 47, 53, 60, and 64, "heat exchanger designs" should read --heat exchanger network designs--.
Column 48, lines 3, 10, 15, 19, 29, 37, 49, and 56, "heat exchanger designs" should read --heat exchanger network designs--.
Column 49, lines 15, 21, 32, 40, 51, and 58, "heat exchanger designs" should read --heat exchanger network designs--.
Column 50, lines 1, 12, and 60, "heat exchanger designs" should read --heat exchanger network designs--.
Column 51, lines 7, 11, 55, and 59, "heat exchanger designs" should read --heat exchanger network designs--.
Column 54, lines 49, 57, 62, and 66, "heat exchanger designs" should read --heat exchanger network designs--.
Column 55, lines 5, 25, 29, 33, 54, and 62, "heat exchanger designs" should read --heat exchanger network designs--.
Column 56, lines 8, 15, 31, 57, and 84, "heat exchanger designs" should read --heat exchanger network designs--.
Column 57, lines 7, 12, 17, 34, and 43, "heat exchanger designs" should read --heat exchanger network designs--.
Column 58, lines 40 and 44, "heat exchanger designs" should read --heat exchanger network designs--.
Column 59, lines 47 and 52, "heat exchanger designs" should read --heat exchanger network designs--.
Column 62, lines 44, 51, 58, 61, and 67, "heat exchanger designs" should read --heat exchanger network designs--.
Column 63, lines 20, 24, 28, 49, and 57, "heat exchanger designs" should read --heat exchanger network designs--.

Signed and Sealed this
Twenty-sixth Day of March, 2013

Teresa Stanek Rea
*Acting Director of the United States Patent and Trademark Office*

Column 64, lines 3, 10, 26, 52, and 59, "heat exchanger designs" should read --heat exchanger network designs--.
Column 65, lines 2, 12, 29, and 38, "heat exchanger designs" should read --heat exchanger network designs--.
Column 68, lines 54 and 58, "heat exchanger designs" should read --heat exchanger network designs--.